(12) United States Patent
Okazono et al.

(10) Patent No.: US 9,328,704 B2
(45) Date of Patent: May 3, 2016

(54) FUEL SUPPLY APPARATUS

(71) Applicants: DENSO CORPORATION, Kariya, Aichi-pref. (JP); KYOSAN DENKI CO., LTD., Koga, Ibaraki-pref. (JP)

(72) Inventors: Tetsuro Okazono, Okazaki (JP); Kouji Maruyama, Aichi-gun (JP); Masato Inoue, Kariya (JP)

(73) Assignees: DENSO CORPORATION, Kariya (JP); KYOSAN DENKI CO., LTD., Koga (JP)

( * ) Notice: Subject to any disclaimer, the term of this patent is extended or adjusted under 35 U.S.C. 154(b) by 240 days.

(21) Appl. No.: 14/100,353

(22) Filed: Dec. 9, 2013

(65) Prior Publication Data

US 2014/0166136 A1  Jun. 19, 2014

Related U.S. Application Data

(62) Division of application No. 13/230,027, filed on Sep. 12, 2011, now Pat. No. 8,689,827.

(30) Foreign Application Priority Data

Sep. 13, 2010 (JP) .................................. 2010-204621
Mar. 23, 2011 (JP) .................................. 2011-64730
Mar. 23, 2011 (JP) .................................. 2011-64731

(51) Int. Cl.
*F02M 37/10* (2006.01)
*B01D 35/26* (2006.01)
(Continued)

(52) U.S. Cl.
CPC .......... *F02M 37/106* (2013.01); *B01D 35/027* (2013.01); *B01D 35/26* (2013.01);
(Continued)

(58) Field of Classification Search
CPC . F02M 37/106; F02M 37/025; F02M 37/103; B01D 35/26; B01D 35/027; Y10T 137/86035; Y10T 137/86043; Y10T 137/86067; Y10T 137/86091
See application file for complete search history.

(56) References Cited

U.S. PATENT DOCUMENTS 4,780,063 A  10/1988  Tuckey
4,869,225 A  9/1989  Nagata et al.
(Continued)

FOREIGN PATENT DOCUMENTS

EP  0 903 255  3/1999
JP  2002-029272  1/2002
(Continued)

OTHER PUBLICATIONS

First Office Action issued for Chinese Patent Application No. 201110276884.X, dated Nov. 1, 2013 (10 pages) (with partial English translation).
(Continued)

*Primary Examiner* — Atif Chaudry
(74) *Attorney, Agent, or Firm* — Nixon & Vanderhye P.C.

(57) ABSTRACT

A support shaft connects between a flange and a pump unit. An intermediate member, which connects between the support shaft and pump unit, enables a relative positional change between the support shaft and the pump unit in an axial direction of the support shaft. The intermediate member limits a relative positional change between the support shaft and the pump unit in a circumferential direction of the support shaft. A resilient member is received in the support shaft and exerts a restoring force in an axial direction of the support shaft to urge the pump unit, which is movable relative to the support shaft in the axial direction, toward a bottom portion of the fuel tank.

10 Claims, 74 Drawing Sheets

(51) Int. Cl.
  *B01D 35/027* (2006.01)
  *F02M 37/02* (2006.01)
  *B60K 15/077* (2006.01)
  *F02M 37/00* (2006.01)
  *F04B 23/02* (2006.01)

(52) U.S. Cl.
  CPC ......... *B60K 15/077* (2013.01); *F02M 37/0017* (2013.01); *F02M 37/025* (2013.01); *F02M 37/103* (2013.01); *F04B 23/021* (2013.01); *Y10T 29/49826* (2015.01); *Y10T 137/86035* (2015.04); *Y10T 137/86043* (2015.04); *Y10T 137/86067* (2015.04); *Y10T 137/86091* (2015.04)

(56) References Cited

U.S. PATENT DOCUMENTS

| | | | |
|---|---|---|---|
| 6,439,205 | B2 | 8/2002 | Ushigome |
| 7,124,748 | B2 | 10/2006 | Gaffield et al. |
| 7,306,715 | B2 | 12/2007 | Kato et al. |
| 2001/0050107 | A1 | 12/2001 | Walter |
| 2003/0188786 | A1 | 10/2003 | Toki et al. |
| 2005/0155583 | A1 | 7/2005 | Mitsudou et al. |
| 2006/0260696 | A1 | 11/2006 | Leymarie et al. |

FOREIGN PATENT DOCUMENTS

| | | | |
|---|---|---|---|
| JP | 2006-152992 | | 6/2006 |
| JP | 2006-307858 | | 11/2006 |
| JP | 2008-174230 | | 7/2008 |
| JP | 2008174230 A | * | 7/2008 |
| JP | 2008-184954 | | 8/2008 |
| JP | 2008-248801 | | 10/2008 |

OTHER PUBLICATIONS

U.S. Appl. No. 13/230,076, of Okazono, filed Sep. 12, 2011.
U.S. Appl. No. 13/230,049 of Okazono filed Sep. 12, 2011.
U.S. Appl. No. 13/229,995, of Okazono filed Sep. 12, 2011.
Office Action (1 page) dated Feb. 26, 2013, issued in corresponding Japanese Application No. 2011-064730 and English translation (2 pages).
Chinese Office Action issued in App. No. 201410096453.9 dated Sep. 6, 2015 (w/ translation).

* cited by examiner

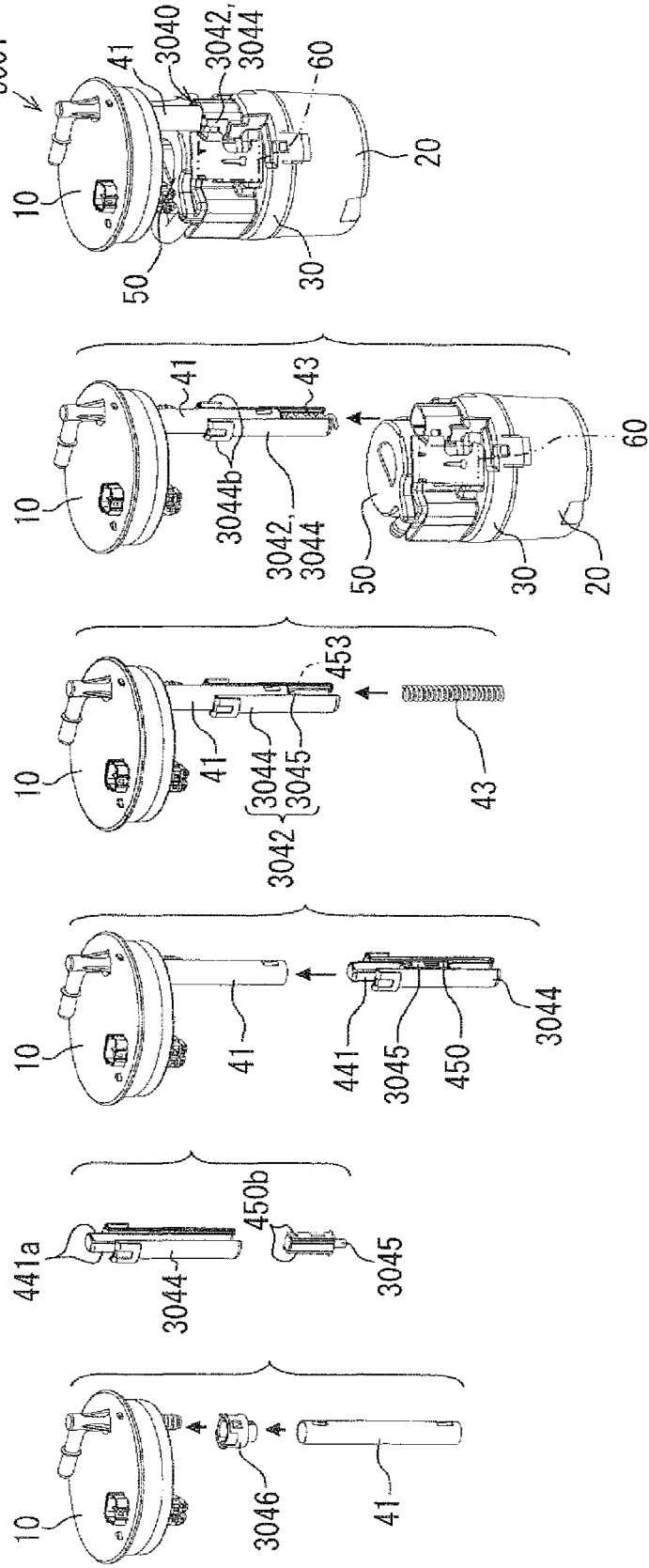

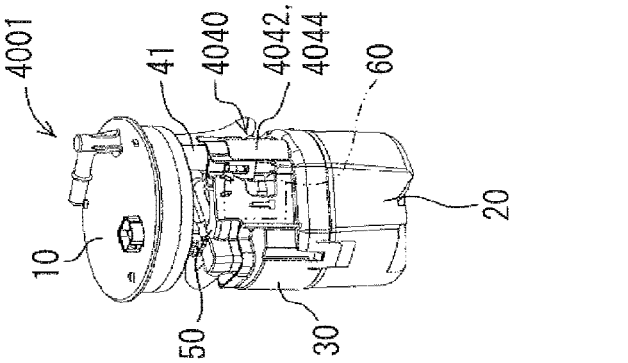
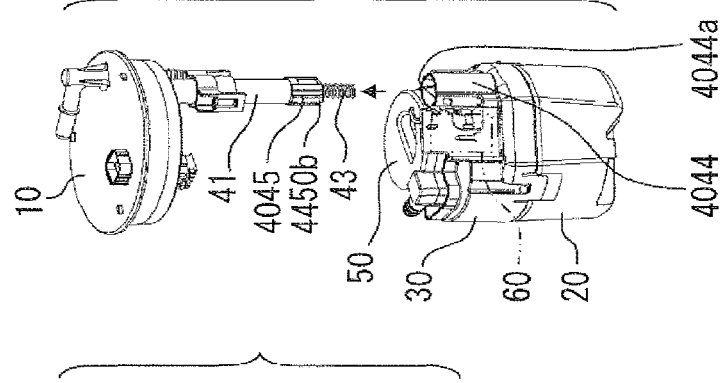
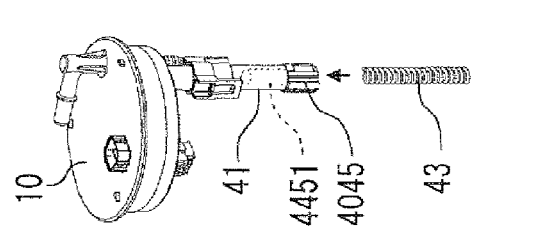
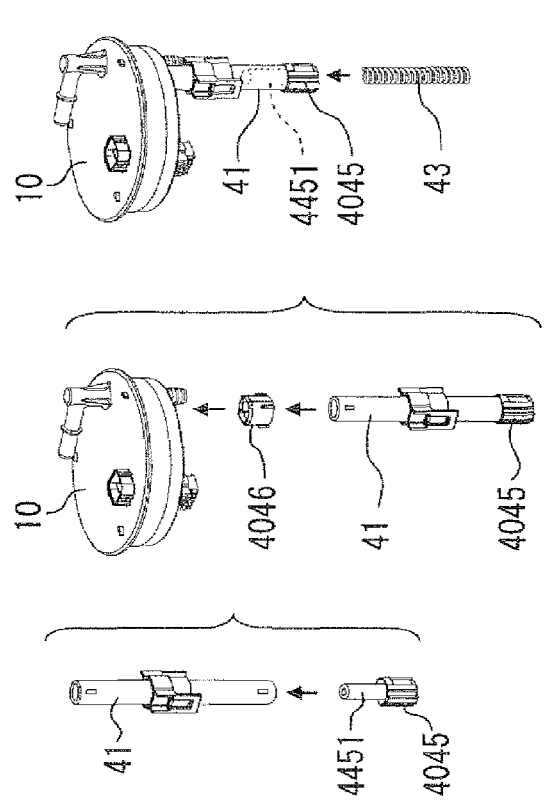
FIG. 39A  FIG. 39B  FIG. 39C  FIG. 39D  FIG. 39E

FUEL SUPPLY APPARATUS

CROSS REFERENCE TO RELATED APPLICATION

This application is a divisional of U.S. patent application Ser. No. 13/230,027, filed Sep. 12, 2011, which is incorporated by reference herein, and is based on and incorporates herein by reference Japanese Patent Application No. 2010-204621 filed on Sep. 13, 2010, Japanese Patent Application No. 2011-64730 filed on Mar. 23, 2011 and Japanese Patent Application No. 2011-64731 filed on Mar. 23, 2011.

BACKGROUND OF THE INVENTION

1. Field of the Invention

The present invention relates to a fuel supply apparatus.

2. Description of Related Art

In a known fuel supply apparatus, a flange, which is installed to a fuel tank of a vehicle (e.g., an automobile), is connected to a pump unit, which is placed in the fuel tank and pumps fuel out of the fuel tank, through support shafts.

For instance, Japanese unexamined Patent Publication No. 2008-248801A teaches a fuel supply apparatus, in which a flange is connected to a pump unit through multiple support shafts. When the flange is connected to the pump unit through the multiple support shafts at multiple locations, respectively, it is possible to limit a deviation (positional deviation) in an installation position of the pump unit in the fuel tank upon application of vibrations. Such vibrations include, for example, vibrations generated from the pump unit at the time of pumping the fuel and/or vibrations generated at the time of driving the vehicle, to which the fuel supply apparatus is installed. The positional deviation of the pump unit may possibly cause deterioration in a fuel processing performance, such as a fuel delivery performance of the pump unit. Therefore, in order to ensure the required product quality, it is important to limit the positional deviation of the pump unit.

The installation position of the flange relative to the fuel tank is determined based on, for example, locations of fuel conduits and electrical wires on the vehicle. The installation position of the pump unit in the inside of the fuel tank is determined based on, for example, a configurations of the fuel tank and of the pump unit. Thereby, the installation position of the flange and the installation position of the pump unit are determined to satisfy the different requirements. Therefore, for example, in the case of the fuel supply apparatus of Japanese unexamined Patent Publication No. 2008-248801A, the installation position of each support shaft needs to be changed every time one of the installation position of the flange and the installation position of the pump unit is changed. Therefore, it will deteriorate a versatility of the fuel supply apparatus, i.e., a capability of the fuel supply apparatus to be used in various applications (e.g., various types of fuel tanks).

Furthermore, in the fuel supply apparatus of Japanese unexamined Patent Publication No. 2008-248801A, a resilient member, which urges the pump unit, is exposed in the inside of the fuel tank. Therefore, when the pump unit is moved relative to the support shaft due to, for example, the deformation of the fuel tank, the resilient member may possibly interfere with other components (e.g., an electrical line, which supplies an electric power to the pump unit, and/or a tube, which conducts fuel from the pump unit to the outside of the fuel tank) of the fuel supply apparatus. The above interference may possibly disadvantageously cause generation of noises due to, for example, a collision between the resilient member and the other components.

SUMMARY OF THE INVENTION

The present invention addresses the above disadvantages. According to the present invention, there is provided fuel supply apparatus, which includes a flange, a pump unit, a single support shaft and an intermediate member. The flange is configured to be installed to a fuel tank. The pump unit is configured to be installed in an inside of the fuel tank to pump fuel received in the inside of the fuel tank to an outside of the fuel tank. The support shaft connects between the flange and the pump unit. The intermediate member connects between the support shaft and the pump unit. The intermediate member enables a relative positional change between the support shaft and the pump unit in an axial direction of the support shaft. The intermediate member limits a relative positional change between the support shaft and the pump unit in a circumferential direction of the support shaft.

The fuel supply apparatus may further include a holding member that holds the pump unit in the fuel tank. The intermediate member may include at least one coupling portion, which is engaged with or formed integrally with the holding member and is thereby coupled to the holding member. The intermediate member may be received in the support shaft. The intermediate member may include a first bracket and a second bracket. The first bracket may receive the support shaft and may include the at least one coupling portion. The second bracket may be connected to the support shaft in an inserted state, in which the second bracket is inserted into the support shaft, such that relative rotation between the second bracket and the support shaft in the circumferential direction of the support shaft is limited. Alternatively or additionally, the first bracket may include the at least one coupling portion, and the second bracket may be connected to the support shaft in a positioned state, in which the second bracket is positioned relative to the support shaft, such that relative rotation between the second bracket and the support shaft in the circumferential direction of the support shaft is limited. The first bracket and the second bracket may be placed between the support shaft and the pump unit. The fuel supply apparatus may further include a third bracket, which is placed between the support shaft and the flange such that the third bracket is connected to the support shaft and the flange in a state where the third bracket is positioned relative to the support shaft and the flange. The intermediate member and the support shaft may be connected together in a press fitted state, in which the intermediate member and the support shaft are press fitted together. The holding member may include at least one planar portion, which extends in the axial direction of the support shaft, and the at least one coupling portion may be engaged with the at least one planar portion in a state where the coupling portion makes a surface-to-surface contact with the at least one planar portion. The at least one planar portion of the holding member may include two planar portions, which are provided in an inner peripheral surface of the holding member to form an opening that is configured as an elongated hole. The intermediate member may be formed integrally with the support shaft. The at least one coupling portion of the intermediate member may include two coupling portions, which are engaged with the two planar portions, respectively, of the holding member. The support shaft may include a plurality of longitudinal grooves, which are arranged one after another in the circumferential direction of the support shaft, and at least one of the plurality of longitudinal grooves may be engaged with a corresponding portion of the intermediate member from both of two diametrically opposed circumferential sides of the corresponding portion of the intermediate member, which are diametrically opposed to each other, so that the support shaft is connected to the intermediate member.

According to the present invention, there may be also provided a fuel supply apparatus, which includes a flange, a pump unit, a support shaft and a resilient member. The flange is configured to be installed to a fuel tank. The pump unit is configured to be installed in an inside of the fuel tank to pump fuel received in the inside of the fuel tank to an outside of the fuel tank. The support shaft is configured into a tubular body and connects between the flange and the pump unit. The resilient member is received in the support shaft and exerts a restoring force in an axial direction of the support shaft to urge the pump unit, which is movable relative to the support shaft in the axial direction, toward a bottom portion of the fuel tank.

According to the present invention, there may be provided a manufacturing method of any of the above fuel supply apparatuses. According to the manufacturing method, the second bracket of the intermediate member is connected to the support shaft in the inserted state, in which the second bracket is inserted into the support shaft. Then, the at least one coupling portion of the first bracket of the intermediate member is coupled to the holding member. Thereafter, the flange, which is connected to the support shaft, is installed to the fuel tank, so that the pump unit, which is held by the holding member, is placed in the inside of the fuel tank.

According to the present invention, there may be provided a manufacturing method of any of the above fuel supply apparatuses. According to the manufacturing method, the at least one coupling portion of the first bracket of the intermediate member is coupled to the holding member. Then, the support shaft is connected to the second bracket of the intermediate member in the positioned state, in which the second bracket is positioned relative to the support shaft. Thereafter, the support shaft and the flange are connected to the third bracket of the intermediate member after positioning the support shaft and the flange relative to the third bracket. Then, the flange is installed to the fuel tank, so that the pump unit, which is held by the holding member, is placed in the inside of the fuel tank.

According to the present invention, there may be provided a manufacturing method of any of the above fuel supply apparatuses. According to the manufacturing method, the intermediate member and the support shaft are connected together in a press fitted state, in which the intermediate member and the support shaft are press fitted together. Then, the at least one coupling portion of the intermediate member is coupled to the holding member. The flange, which is connected to the support shaft, is installed to the fuel tank, so that the pump unit, which is held by the holding member, is placed in the inside of the fuel tank.

According to the present invention, there may be provided a manufacturing method of any of the above fuel supply apparatuses. According to the manufacturing method, the two coupling portions of the intermediate member, which is formed integrally with the support shaft, are coupled to the two planar portions, respectively, of the holding member. Then, the flange, which is coupled to the support shaft, is installed to the fuel tank, so that the pump unit, which is held by the holding member, is placed in the inside of the fuel tank.

According to the present invention, there may be provided a manufacturing method of any of the above fuel supply apparatuses. According to the manufacturing method, the intermediate member is fitted to the at least one of the plurality of longitudinal grooves. Then, the flange, which is connected to the support shaft, is installed to the fuel tank, so that the pump unit, which is held by the holding member, is placed in the inside of the fuel tank.

BRIEF DESCRIPTION OF THE DRAWINGS

The invention, together with additional objectives, features and advantages thereof, will be best understood from the following description, the appended claims and the accompanying drawings in which:

FIGS. 32A to 32F are schematic diagrams for describing a manufacturing method of the fuel supply apparatus of the sixth embodiment;

FIGS. 39A to 39E are schematic diagrams for describing a manufacturing method of the fuel supply apparatus of the seventh embodiment;

DETAILED DESCRIPTION OF THE INVENTION

Figure 1:
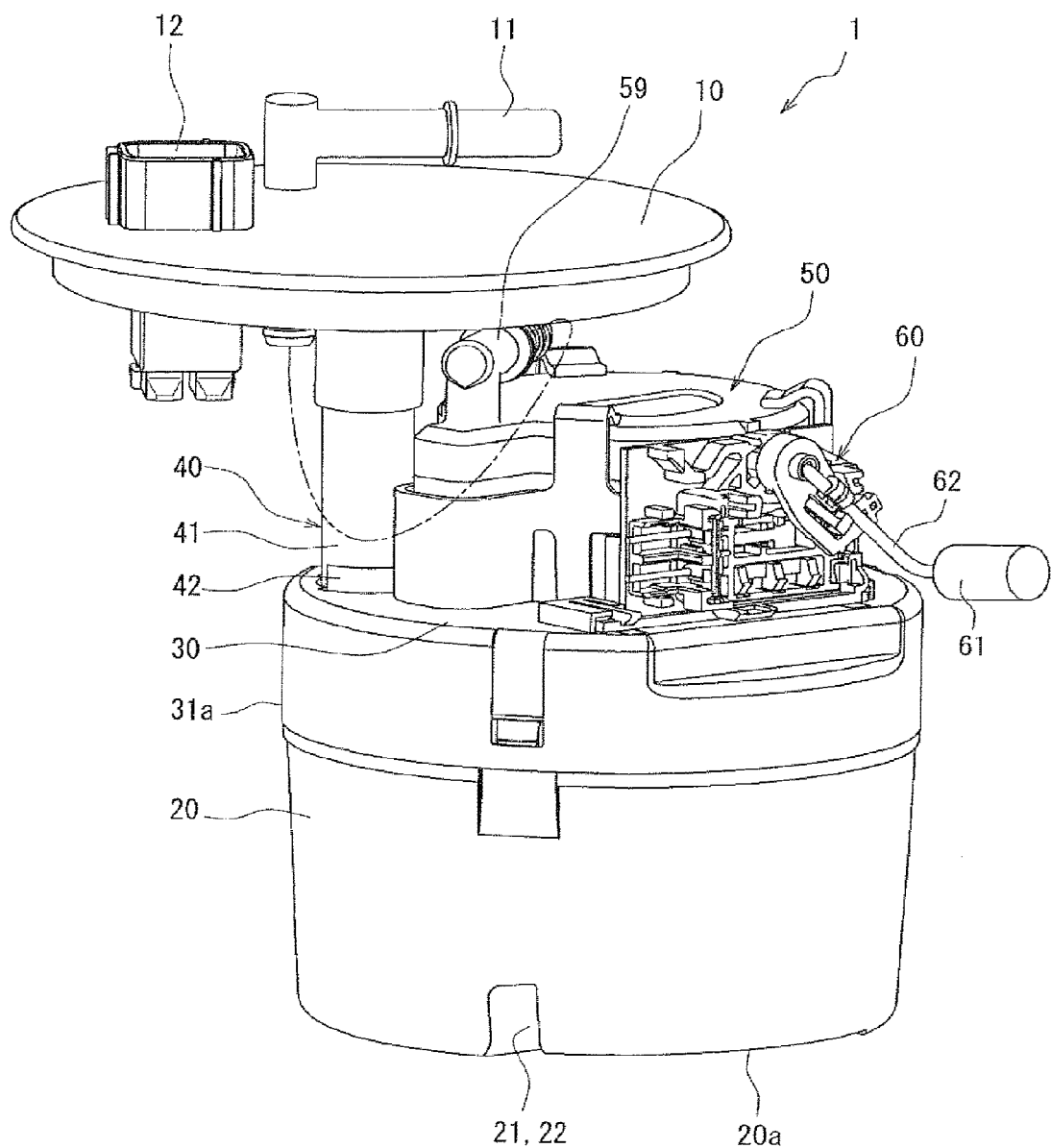
FIG. 1 is a perspective view of a fuel supply apparatus according to a first embodiment of the present invention.

Various embodiments of the present invention will be described with reference to the accompanying drawings. In the following respective embodiments, similar components will be indicated by the same reference numerals and may not be redundantly descried for the sake of simplicity. In each of the following embodiments, if only a part of a structure is described, the remaining part is the same as that of the previously described embodiment(s). Furthermore, one or more of the components of any one of the following embodiments may be combined with any components of another one or more of the following embodiments as long as there is no problem with respect to such a combination of the components.

First Embodiment

Now, a basic structure of a fuel supply apparatus according to a first embodiment of the present invention will be described with reference to the accompanying drawings.

Figure 2:
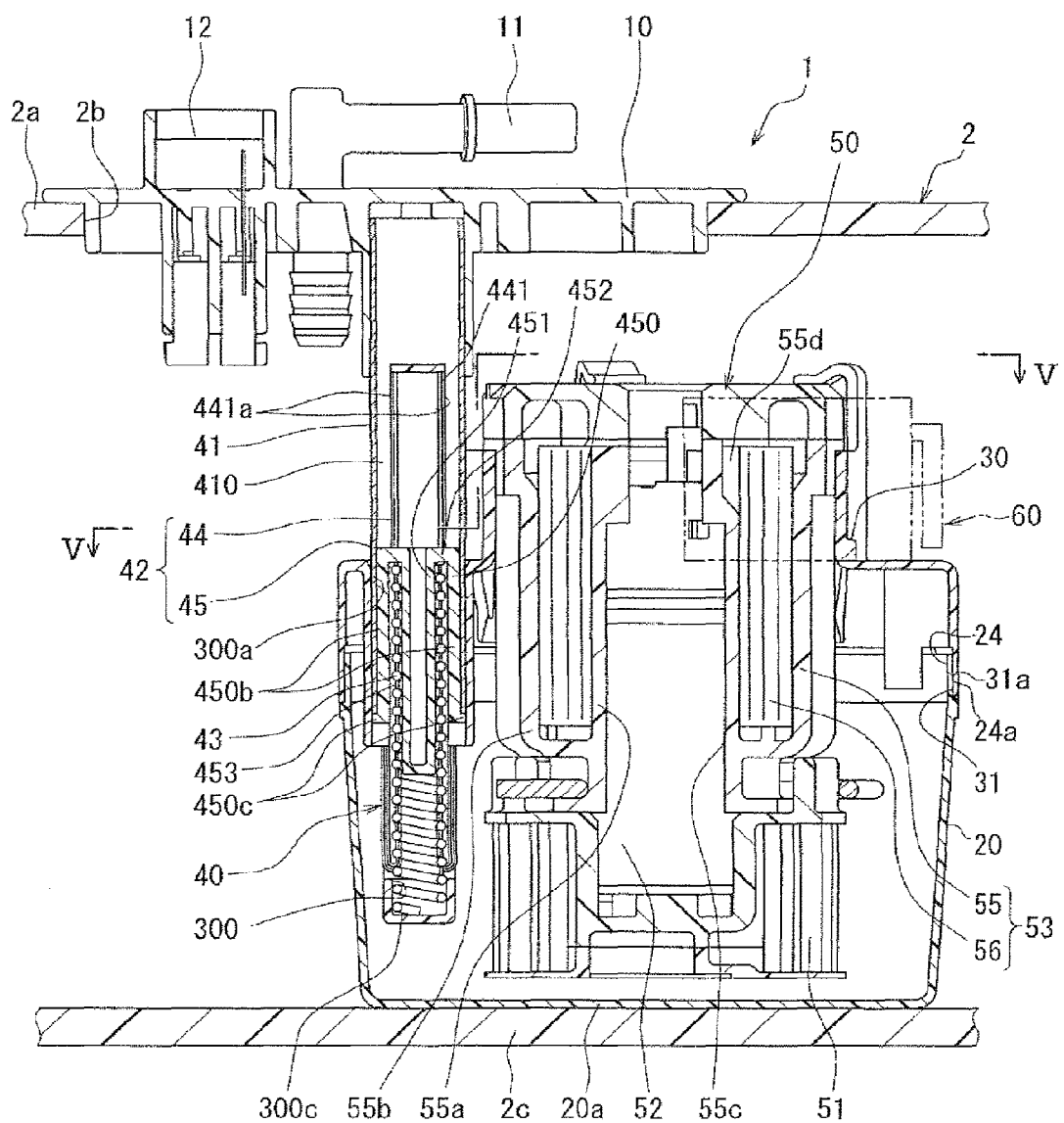
FIG. 2 is a cross-sectional view taken along line II-II in FIG. 3, showing a structure of the fuel supply apparatus of the first embodiment.

FIGS. 1 and 2 show the fuel supply apparatus 1 of the first embodiment. The fuel supply apparatus 1 is installed to a fuel tank 2 of a vehicle (e.g., an automobile) and supplies fuel out of the fuel tank 2. The fuel supply apparatus 1 includes a flange 10, a sub-tank 20, a cover member 30, an adjusting mechanism 40, a pump unit 50 and a remaining fuel quantity sensing device 60. As shown in FIG. 2, the above-described components 20, 30, 40, 50, 60 of the fuel supply apparatus 1 other than the flange 10 are placed in a predetermined location in the fuel tank 2. A top-to-bottom direction of FIG. 2 substantially coincides with a vertical direction of the vehicle, which is parked on a horizontal ground (horizontal plane).

Figure 3:
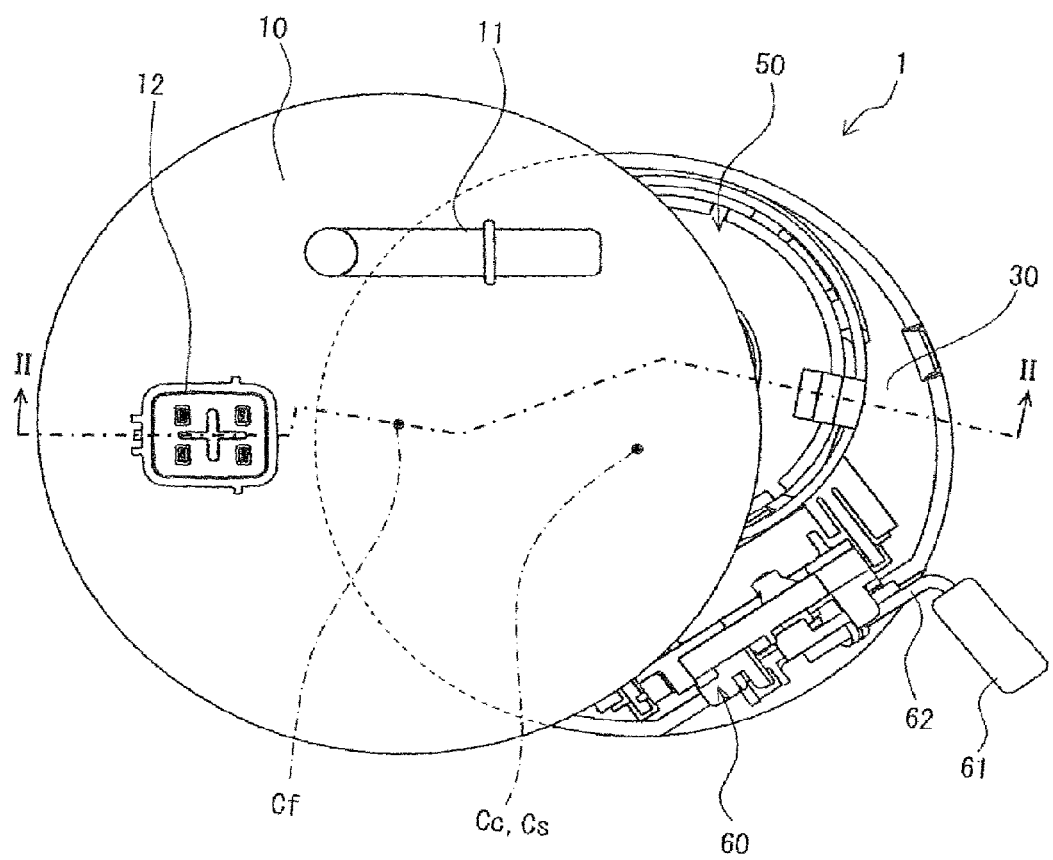
FIG. 3 is a top view of the fuel supply apparatus of the first embodiment.

As shown in FIGS. 1 to 3, the flange 10 is made of a resin material and is configured into a circular disk body. The flange 10 is fitted to and closes a through-hole 2b, which extends through a top plate portion 2a of the fuel tank 2. A fuel supply conduit 11 and an electric connector 12 are formed in the flange 10. The fuel supply conduit 11 supplies the fuel, which is discharged from the pump unit 50, to the outside of the fuel tank 2. The electric connector 12 is electrically connected to the pump unit 50 and the remaining fuel quantity sensing device 60. In this way, an electric power is supplied to a fuel pump 52 of the pump unit 50 through the electric connector 12 to drive the fuel pump 52, and a remaining fuel quantity measurement signal, which indicates a remaining fuel quantity of the fuel tank 2, is outputted from the remaining fuel quantity sensing device 60 through the electric connector 12.

Figure 4:
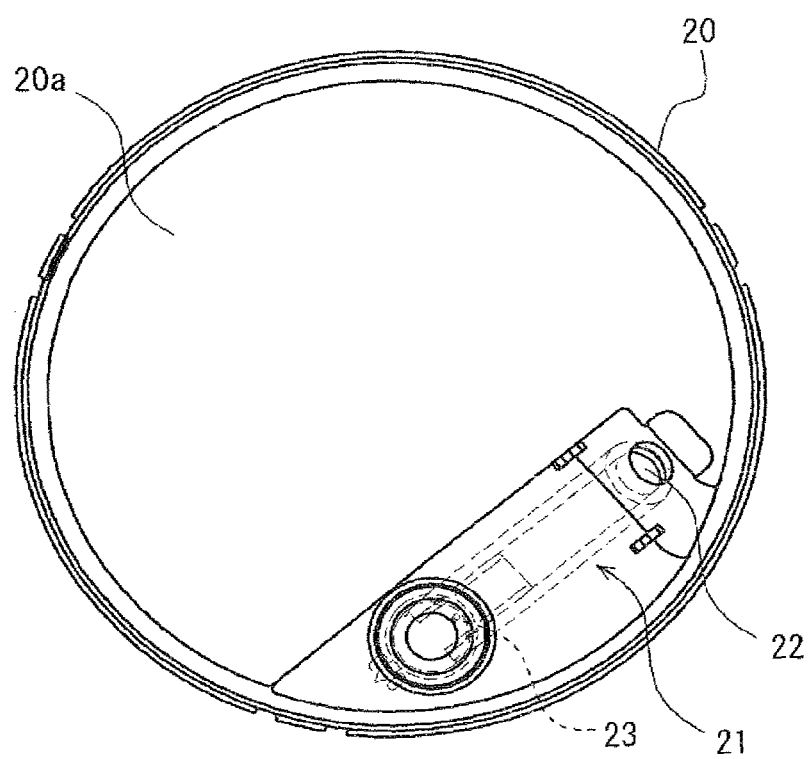
FIG. 4 is a top view of a sub-tank of the fuel supply apparatus of the first embodiment.

With reference to FIGS. 1 and 2, the sub-tank 20 is made of a resin material and is configured into cup-shaped body (a cylindrical tubular body with a closed bottom). The sub-tank 20 is received in the fuel tank 2 at a corresponding location (see FIGS. 3 and 5), at which a central axis Cs of the sub-tank 20 is offset from a central axis Cf of the flange 10, and the sub-tank 20 is placed on a bottom portion 2c of the fuel tank 2. As shown in FIGS. 1 and 4, a jet pump 21 is provided at a bottom portion 20a of the sub-tank 20. The jet pump 21 includes an inlet passage 22 and a jet nozzle 23. The inlet passage 22 communicates between the inside of the fuel tank 2 and the inside of the sub-tank 20. The jet nozzle 23 injects excessive fuel, which is outputted from a pressure regulator 54 (see FIG. 6) of the pump unit 50, into the inlet passage 22. A negative pressure, which is lower than the atmospheric pressure, is generated in the inlet passage 22 by the fuel injection from the jet nozzle 23, so that the fuel in the fuel tank 2 is drawn into the inlet passage 22 and is then conducted to the sub-tank 20. The sub-tank 20 stores the fuel, which is supplied to the sub-tank 20 in the above-described manner.

Figure 5:
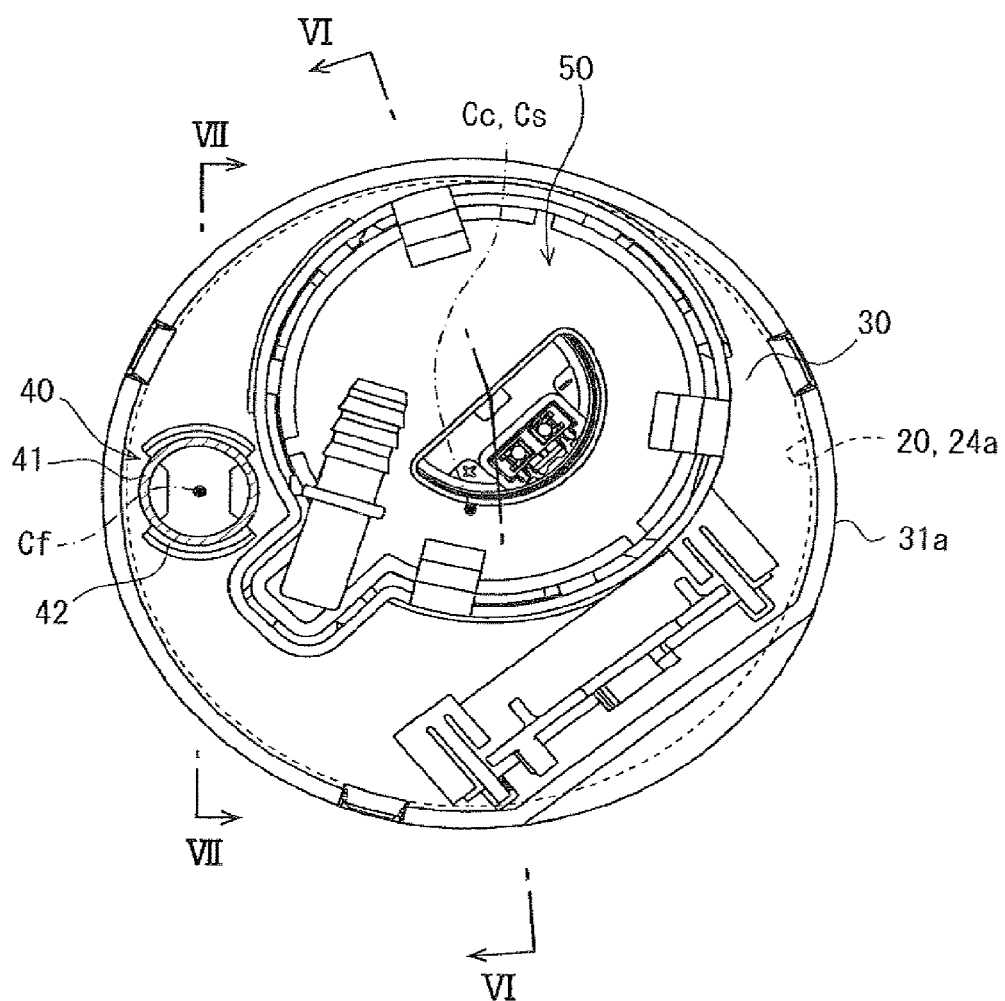
FIG. 5 is a cross-sectional view taken along line V-V in FIG. 2.

With reference to FIGS. 1, 2 and 5, the cover member 30 is made of a resin material and is configured into an inverted cup-shaped body (an inverted cylindrical tubular body with a closed bottom). A peripheral portion 31a of a lower opening 31 of the cover member 30 is fitted to a peripheral portion 24a of an upper opening 24 of the sub-tank 20. In this way, the cover member 30 is received in the fuel tank 2 at a corresponding location (see FIGS. 3 and 5), at which a central axis Cc of the cover member 30 is offset from the central axis Cf of the flange 10, and the cover member 30 closes the opening 24 of the sub-tank 20. The cover member 30 holds the remaining fuel quantity sensing device 60 and the pump unit 50 in the inside of the fuel tank 2.

The adjusting mechanism 40 includes a support shaft 41, an intermediate member 42 and a resilient member 43. The support shaft 41 is made of a metal material and is configured into a cylindrical tubular body. The support shaft 41 is coaxially and securely press fitted into the flange 10 and is connected to the sub-tank 20, the cover member 30, the pump unit 50 and the remaining fuel quantity sensing device 60, which are integrated together and will be hereinafter simply referred to as integrated components 20, 30, 50, 60, through the intermediate member 42. In this way, the flange 10 is connected to the integrated components 20, 30, 50, 60 through the single support shaft 41.

As shown in FIG. 2, the intermediate member 42 includes two brackets, i.e., first and second brackets 44, 45, which are made of a resin material. The first bracket 44 and the second bracket 45 are connected to each other such that the first bracket 44 and the second bracket 45 are displaceable relative to each other in an axial direction of the support shaft 41 but are not displaceable relative to each other in a circumferential direction of the support shaft 41. When the first and second brackets 44, 45 of the intermediate member 42 are installed to the cover member 30 and the support shaft 41, the intermediate member 42 enables a relative positional change between the support shaft 41 and the integrated components 20, 30, 50, 60 in the axial direction of the support shaft 41 and limits a relative positional change between the support shaft 41 and the integrated components 20, 30, 50, 60 in the circumferential direction of the support shaft 41.

The resilient member 43 is a coil spring in this embodiment and is interposed between the second bracket 45 and the cover member 30. The resilient member 43 exerts a restoring force (urging force) in the axial direction of the support shaft 41 to urge the integrated components 20, 30, 50, 60 toward the bottom portion 2c of the fuel tank 2, so that the bottom portion 20a of the sub-tank 20 is always urged against the bottom portion 2c of the fuel tank 2. In the present embodiment, the above-described functions of the resilient member 43 and of the intermediate member 42 enable the stabilization of the positioning of the integrated components 20, 30, 50, 60 in the fuel tank 2.

Figure 6:
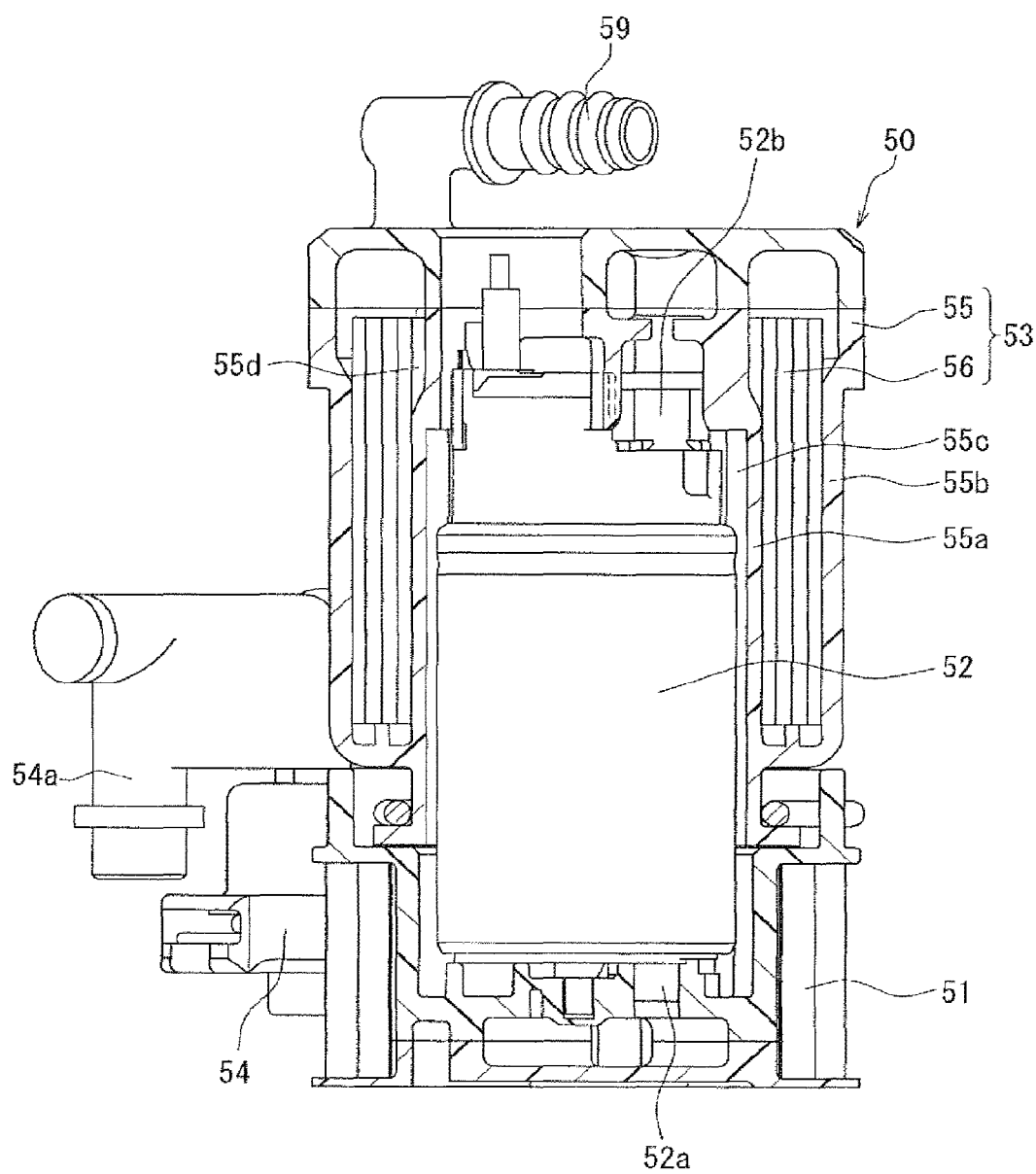
FIG. 6 is a cross-sectional view taken along line VI-VI in FIG. 5.

A lower portion of the pump unit 50 is received in the sub-tank 20, and an upper portion of the pump unit 50 projects upward from the cover member 30. As shown in FIGS. 2 and 6, the pump unit 50 includes a suction filter 51, the fuel pump 52, a fuel filter 53 and the pressure regulator 54.

The suction filter 51 is placed at a lowermost portion of the pump unit 50. The suction filter 51 is connected to a fuel inlet 52a of the fuel pump 52 and filters relatively large foreign objects (debris) contained in the fuel, which is drawn by the fuel pump 52 from the sub-tank 20. The fuel pump 52 is placed on an upper side of the suction filter 51 of the pump unit 50 and has the fuel inlet 52a and a fuel outlet 52b, which are directed downward and upward, respectively. The fuel pump 52 draws the fuel from the sub-tank 20 through the suction filter 51 and the fuel inlet 52a of the fuel pump 52 in response to rotation of an electric motor (not shown) of the fuel pump 52, which is received in a housing of the fuel pump 52. Then, the fuel pump 52 pressurizes the drawn fuel and discharges the pressurized fuel through the fuel outlet 52b.

The fuel filter 53 is placed to cover an outer peripheral side and an upper side of the fuel pump 52 in the pump unit 50. A filter case 55 of the fuel filter 53 includes two cylindrical portions, i.e., inner and outer tubular portions 55a, 55b, which are coaxially placed and are made of a resin material. The fuel pump 52 is coaxially placed in a space 55c, which is located radially inward of the inner tubular portion 55a. A filter element 56 of the fuel filter 53 is made of a filter material, which is configured into, for instance, a honeycomb body and is received in a space 55d, which is radially located between the inner tubular portion 55a and the outer tubular portion 55b. The space 55d, which is radially located between the inner and outer tubular portions 55a, 55b, is communicated with the fuel outlet 52b of the fuel pump 52 and a fuel outlet 59 of the fuel filter 53 on an upstream side and a downstream side, respectively, of the filter element 56. In this way, the fuel, which is supplied from the fuel outlet 52b of the fuel pump 52 into the space 55d, is filtered through the filter element 56 to filter fine foreign objects (debris) and is then discharged through the fuel outlet 59 of the fuel filter 53 toward the fuel supply conduit 11, which is communicated with the fuel outlet 59, as indicated by a dot-dash line in FIG. 1.

As shown in FIG. 6, the pressure regulator 54 is placed adjacent to the fuel filter 53 on a lateral side of the fuel filter 53 in the pump unit 50. A portion of the fuel, which is directed toward the fuel supply conduit 11, is supplied to the pressure regulator 54, which is connected to the fuel outlet 59 of the fuel filter 53. In this way, the pressure regulator 54 adjusts the pressure of the fuel to be discharged toward the fuel supply conduit 11 located outside of the fuel tank 2. Excessive fuel, which becomes excessive at the time of adjusting the pressure of the fuel at the pressure regulator 54, is discharged to the jet nozzle 23 (see FIG. 4) of the jet pump 21 through a drain conduit 54a.

As shown in FIGS. 1 and 3, the remaining fuel quantity sensing device 60 is held on the cover member 30 and is placed at the outside of the sub-tank 20. The remaining fuel quantity sensing device 60 is a sender gauge. Specifically, the remaining fuel quantity sensing device 60 senses a quantity of the remaining fuel in the fuel tank 2 based on a measured rotational angle of an arm 62, which holds a float 61 that floats on a top of the fuel in the fuel tank 2.

Now a characteristic structure of the fuel supply apparatus 1 will be described. In the following description, the circumferential direction of the support shaft 41 will be also simply referred to as the circumferential direction, and the axial direction of the support shaft 41 will be also simply referred to as the axial direction.

Figure 7:
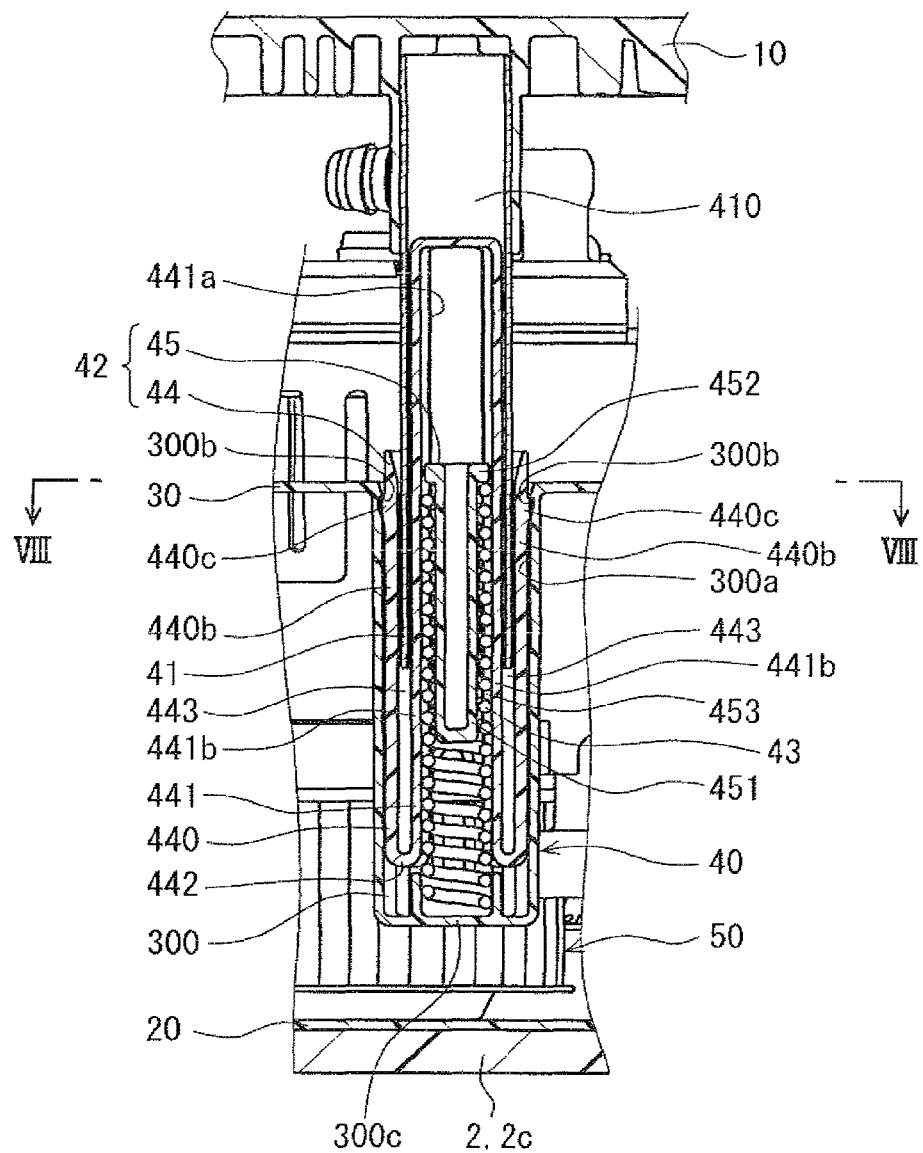
FIG. 7 is a cross-sectional view taken along line VII-VII in FIG. 5.
Figure 8:
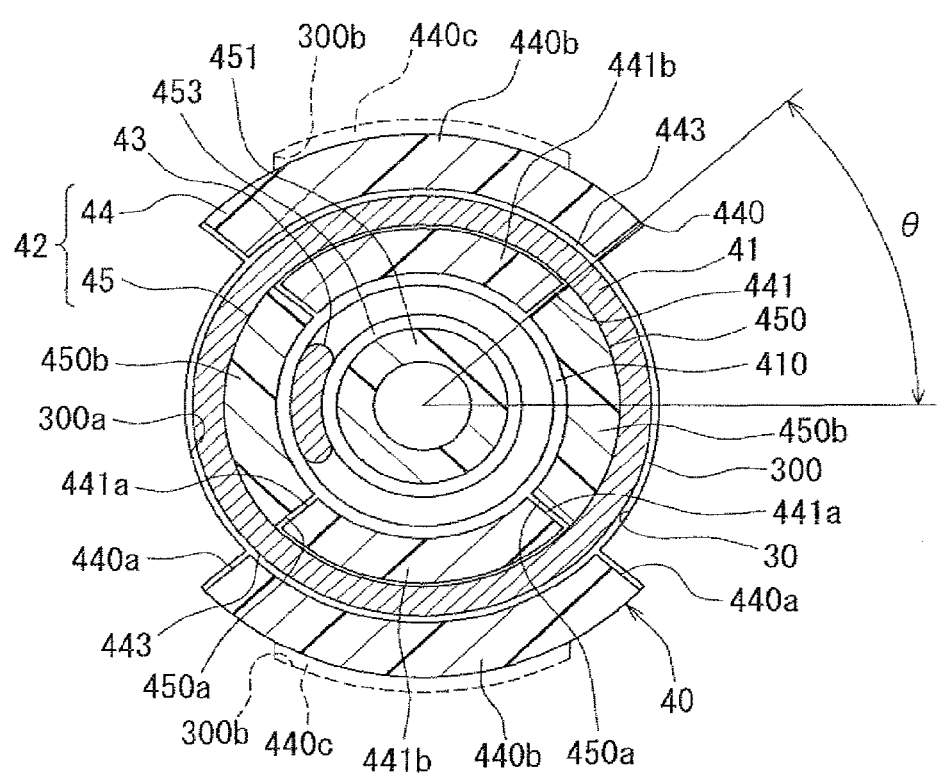
FIG. 8 is a cross-sectional view taken along line VIII-VIII in FIG. 7.
Figure 9:
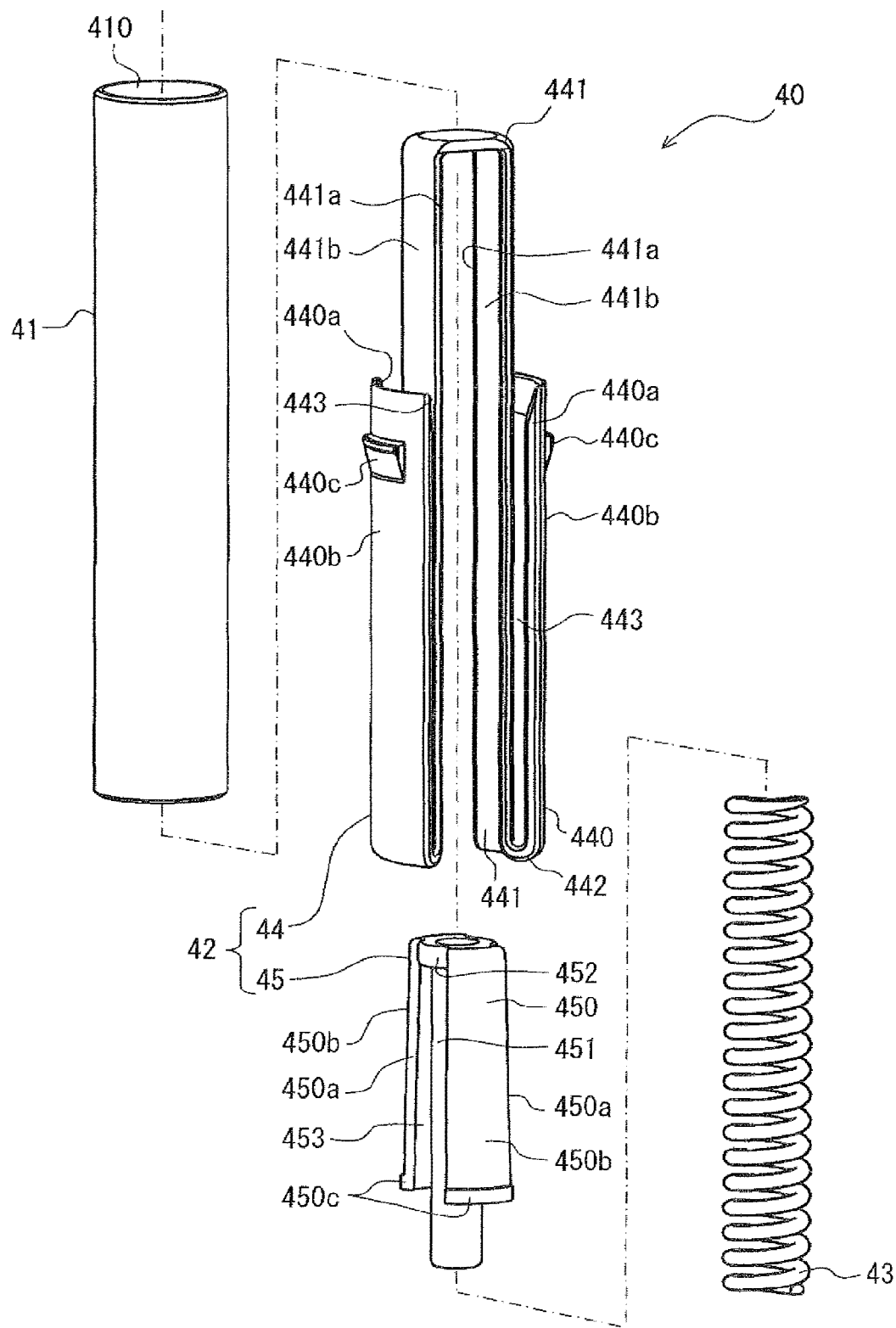
FIG. 9 is an exploded perspective view showing an adjusting mechanism of the fuel supply apparatus of the first embodiment.

As shown in FIGS. 7 to 9, in the adjusting mechanism 40, the first bracket 44 of the intermediate member 42 is configured into a double cylindrical tubular body (i.e., a body having two cylindrical tubular portions, which are arranged one after another in a radial direction thereof), which is placed coaxially with the support shaft 41. Specifically, the first bracket 44 includes two tubular portions, i.e., outer and inner tubular portions 440, 441 which are connected together by a connecting portion 442 placed at lower ends of the outer and inner tubular portions 440, 441, and two longitudinal grooves 440a, 441a respectively interrupt the outer and inner tubular portions 440, 441 at two circumferential locations, respectively.

The outer tubular portion 440 of the first bracket 44 has two coupling portions 440b, which are diametrically opposed to each other and each of which is placed between the longitudinal grooves 440a in the circumferential direction. Each coupling portion 440b engaged with an inner peripheral surface 300a of an opening (also referred to as a receiver) 300 of the cover member 30, which serves as a holding member, so that each coupling portion 440b is coupled to the cover member 30. In the present embodiment, two recesses 300b are formed at two circumferential locations, respectively, in the inner peripheral surface 300a of the opening 300, and each of the coupling portions 440b has an engaging claw (engaging protrusion) 440c, which is engaged with a corresponding one of the recesses 300b. Through the engagement between the recess and the protrusion, i.e., between the recess 300b and the engaging claw 440c, the cover member 30 limits relative positional changes between the first bracket 44 and the cover member 30, specifically, relative axial displacement between the first bracket 44 and the cover member 30 and relative circumferential rotation between the first bracket 44 and the cover member 30.

The inner tubular portion 441 of the first bracket 44 has two rotation limiting portions 441b, which are diametrically opposed to each other and each of which is placed between the longitudinal grooves 440a in the circumferential direction. Each rotation limiting portion 441b is placed radially inward of a corresponding one of the coupling portions 440b to form a gap 443 having an arcuate cross section at a radial location between the rotation limiting portion 441b and the corresponding coupling portion 440b. The inner tubular portion 441 of the first bracket 44 is loosely received in a cylindrical inner space 410 of the support shaft 41, so that the support shaft 41 is received in the gaps 443 of the first bracket 44 in a manner that enables relative rotation between the support shaft 41 and the first bracket 44.

The second bracket 45, which forms the intermediate member 42 in corporation with the first bracket 44, is configured into a double cylindrical tubular body, which is placed coaxially with the support shaft 41, as shown in FIGS. 2, 8 and 9. Specifically, the second bracket 45 includes two tubular portions, i.e., outer and inner tubular portions 450, 451 which are connected together by a connecting portion 452 placed at upper ends of the outer and inner tubular portions 450, 451, and two longitudinal grooves 450a respectively interrupt the outer and inner tubular portions 450, 451 at two circumferential locations, respectively.

The outer tubular portion 450 of the second bracket 45 has two fitting portions 450b, which are diametrically opposed to each other and each of which is placed between the longitudinal grooves 450a in the circumferential direction. As shown in FIG. 8, each filling portion 450b is axially slidably fitted into a corresponding one of the longitudinal grooves 441a, each of which is circumferentially formed between the rotation limiting portions 441b of the inner tubular portion 441 that has an outer diameter, which is substantially the same as that of the outer tubular portion 450. With the axial slide fitting of the fitting portions 450b into the longitudinal grooves 441a, respectively, the second bracket 45 is connected to the first bracket 44 such that the first bracket 44 and the second bracket 45 are displaceable relative to each other in the axial direction, along which each longitudinal groove 441a extends, but are not displaceable relative to each other in the circumferential direction, in which each of the fitting portions 450h of the second bracket 45 contacts the opposed circumferential side walls of the corresponding one of the longitudinal grooves 441a.

The outer tubular portion 450 of the second bracket 45 is inserted into the inner space 410 of the support shaft 41 together with the inner tubular portion 441 of the first bracket 44, which is fitted to the outer tubular portion 450 of the second bracket 45. Here, the fitting portions 450b of the outer tubular portion 450 of the present embodiment achieve a high connecting strength by press-fitting the fitting portions 450b of the outer tubular portion 450 into the support shaft 41, so that the relative rotation of the support shaft 41 relative to the second bracket 45 in the circumferential direction is limited. An engaging claw 450c is formed in a projecting part of each fitting portion 450b, which projects from a lower end portion of the support shaft 41. The engaging claw 450c engages the lower end portion of the support shaft 41 to limit upward displacement of the second bracket 45 relative to the support shaft 41.

With the above described structure, the second bracket 45 enables the relative displacement between the press fitted support shaft 41 and the first bracket 44 in the axial direction through a change in the fitting position of the second bracket 45 relative to the longitudinal grooves 441a of the first bracket 44, which is engaged to the inner peripheral surface 300a of the opening 300 of the cover member 30. Thereby, the relative positional change of the integrated components 20, 30, 50, 60 relative to the support shaft 41 in the axial direction is reliably enabled.

The second bracket 45 limits the relative rotation between the press fitted support shaft 41 and the first bracket 44 in the circumferential direction through the circumferential contact between the second bracket 45 and the longitudinal grooves 441a of the first bracket 44, which is engaged to the cover member 30. Thereby, the relative positional change of the integrated components 20, 30, 50, 60 relative to the support shaft 41 in the circumferential direction is reliably limited.

As shown in FIGS. 2 and 7 to 9, the inner tubular portion 451 of the second bracket 45, which is inserted into the inner space 410 of the support shaft 41 from the lower side of the support shaft 41, radially forms a gap 453 having an annular cross section in corporation with the fitting portions 450b of the second bracket 45 and the rotation limiting portions 441b of the first bracket 44, which are located on a radially outer side of the inner tubular portion 451. The resilient member 43, which is the coil spring, is coaxially received in the gap 453. An upper end portion of the resilient member 43 is engaged to the connecting portion 452 of the second bracket 45, and a lower end portion of the resilient member 43 is engaged to a bottom portion 300c of the opening 300 of the cover member 30, which is configured into the cup-shaped body, at an outside of the support shaft 41. In this way, the resilient member 43, which is axially interposed between the second bracket 45 and the cover member 30, exerts the restoring force such that the resilient member 43 not only urges the integrated components 20, 30, 50, 60 toward the bottom portion 2c of the fuel tank 2 (i.e., in the downward direction) but also urges the second bracket 45 in the inserting direction of the second bracket 45 toward the inside of the support shaft 41 (i.e., in the upward direction).

Figure 10:
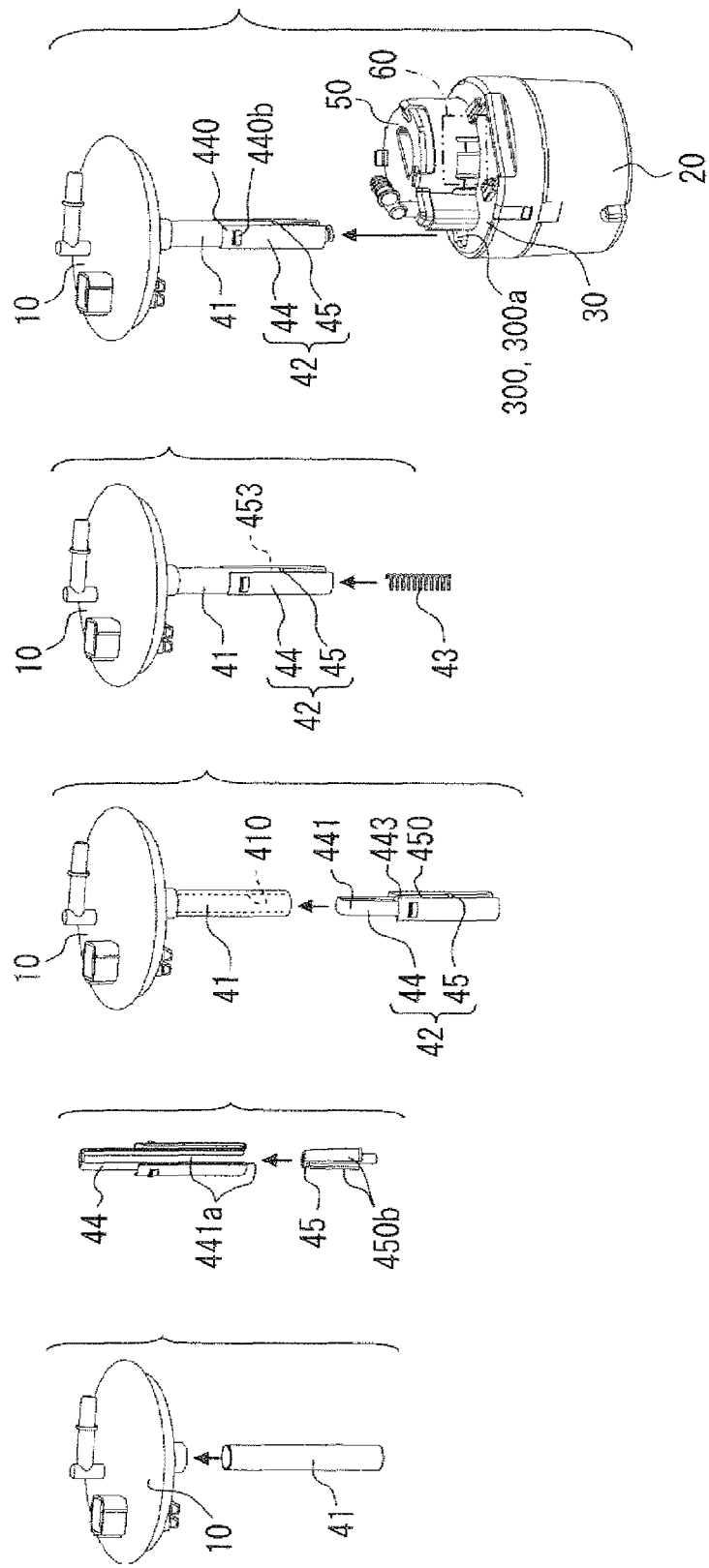
FIGS. 10A to 10E are schematic diagrams for describing a manufacturing method of the fuel supply apparatus of the first embodiment.

The manufacturing of the fuel supply apparatus 1 is performed as follows. First of all, as shown in FIG. 10A, the support shaft 41 is securely press fitted into the flange 10. Next, as shown in FIG. 10B, the fitting portions 450b of the second bracket 45 are axially slidably fitted into the longitudinal grooves 441a, respectively, of the first bracket 44, so that there is formed the intermediate member 42, which is the assembly of the first and second brackets 44, 45.

Then, as shown in FIG. 10C, the inner tubular portion 441 of the first bracket 44 and the outer tubular portion 450 of the second bracket 45 are inserted into the inner space 410 of the support shaft 41, so that the outer tubular portion 450 of the second bracket 45 is connected to the support shaft 41 (connecting step). At this time, the support shaft 41 is rotated in the gaps 443 of the first bracket 44, so that a connecting angle θ (see FIG. 8) of each of the fitting portions 450b relative to the support shaft 41 is freely adjusted in the circumferential direction, and the outer tubular portion 450 of the second bracket 45 is press fitted into the support shaft 41 at this adjusted angle θ.

Then, as shown in FIG. 10D, the resilient member 43 is inserted into the gap 453, which is formed by the second bracket 45 of the intermediate member 42 in the support shaft 41. Thereafter, as shown in FIG. 10E, the coupling portions 440b of the outer tubular portion 440 of the first bracket 44 are coupled to the inner peripheral surface 300a of the opening 300 of the cover member 30 among the integrated components 20, 30, 50, 60 described above, so that the assembling of the adjusting mechanism 40 is completed (coupling step).

Then, as shown in FIG. 2, the integrated components 20, 30, 50, 60 and the adjusting mechanism 40 are inserted into the inside of the fuel tank 2, and the flange 10, which is connected to the support shaft 41, is installed to the fuel tank 2, so that the assembling of the fuel supply apparatus 1 is completed (installing step). At this time, a relative position of the integrated components 20, 30, 50, 60, which is urged by the resilient member 43, relative to the flange 10 in the axial direction changes until the sub-tank 20 contacts the bottom portion 2c of the fuel tank 2. Therefore, the installation position of the integrated components 20, 30, 50, 60 in the inside of the fuel tank 2 can be freely determined regardless of the installation position of the flange 10 by the adjustment of the connecting angle θ in the circumferential direction and by the positional change of the resilient member 43 in the axial direction toward the restoring force application side (i.e., the side toward which the restoring force of the resilient member 43 is applied, i.e., exerted). Furthermore, in the case where the amount of press-fitting of the second bracket 45 into the support shaft 41 is kept constant through the engagement of the engaging claws 450c to the support shaft 41 regardless of the depth of the fuel tank 2, the length of the resilient member 43 can be kept constant by changing only the length of the support shaft 41. In this way, the versatility of the fuel supply apparatus 1 can be further improved.

Furthermore, in the fuel supply apparatus 1, which is constructed in the above-described manner, the relative positional change of the integrated components 20, 30, 50 60 relative to the single support shaft 41 in the circumferential direction is limited by the intermediate member 42. Therefore, the installation position of the integrated components 20, 30, 50, 60 in the inside of the fuel tank 2 is less likely deviated in the circumferential direction. Particularly, in the fuel supply apparatus 1, the restoring force of the resilient member 43, which urges the second bracket 45 in the press-fitting direction thereof toward the inside of the support shaft 41, can always keep the press-fitted state of the second bracket 45 and the support shaft 41, which limits the relative rotation between the second bracket 45 and the support shaft 41. Thereby, in addition to advantage of the slidably fitting of the first and second brackets 44, 45, the relative positional change of the integrated components 20, 30, 50, 60 relative to the support shaft 41 in the circumferential direction can be reliably limited. Furthermore, in the fuel supply apparatus 1, the outer tubular portion 450 of the second bracket 45 of the intermediate member 42 is press fitted into the support shaft 41, so that it is possible to limit the tilting of the support shaft 41, which is guided by the intermediate member 42. In this way, the installation position of the integrated components 20, 30, 50, 60, which are connected to the support shaft 41, is stabilized, and thereby it is possible to ensure the required fuel delivery performance of the pump unit 50 and the required sensing performance of the remaining fuel quantity sensing device 60 in addition to the implementation of the versatility of the fuel supply apparatus 1 discussed above.

Furthermore, in the fuel supply apparatus 1, when the support shaft 41, which is connected to the second bracket 45, is axially displaced relative to the first bracket 44, the support shaft 41 slides in the gaps 443, which are formed in the first bracket 44. At this time, a slide resistance between the support shaft 41, which is made of the metal material, and the first bracket 44, which is made of the resin material, is small, so that it is possible to limit generation of noises, which would be caused by the slide movement between the support shaft 41 and the first bracket 44. Furthermore, the second bracket 45, the material of which is different from that of the support shaft 41, less likely conducts the vibrations from the pump unit 50, which is urged by the resilient member 43, to the support shaft 41. Thereby, it is possible to limit the generation of annoying noises, which would be caused by conduction of the vibrations of the pump unit 50 to the fuel tank 2 through the second bracket 45, the support shaft 41 and the flange 10.

Second Embodiment

A basic structure of a fuel supply apparatus according to a second embodiment of the present invention will be described.

Figure 11:
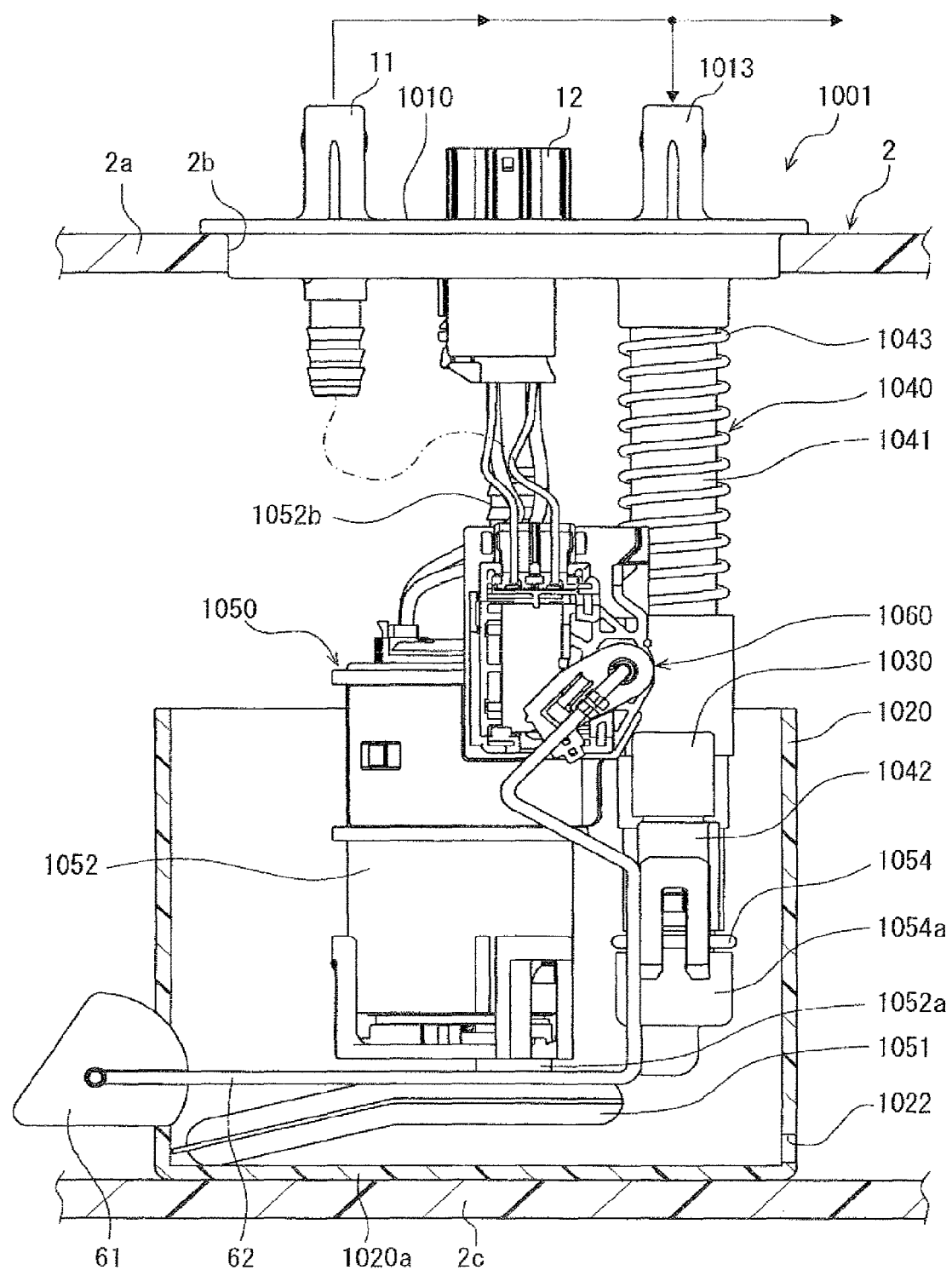
FIG. 11 is a longitudinal cross-sectional view of a fuel supply apparatus according to a second embodiment of the present invention.

With reference to FIG. 11, the second embodiment is a modification of the first embodiment. The fuel supply apparatus 1001 of the second embodiment includes a flange 1010, a sub-tank 1020, a pump bracket 1030, an adjusting mechanism 1040, a pump unit 1050, a pressure regulator 1054 and a remaining fuel quantity sensing device 1060. The above-described components 1020, 1030, 1040, 1050, 1054, 1060 of the fuel supply apparatus 1001 other than the flange 1010 are placed in a predetermined location in the fuel tank 2. A top-to-bottom direction of FIG. 11 substantially coincides with a vertical direction of the vehicle, which is parked on the horizontal ground (horizontal plane).

Figure 12:
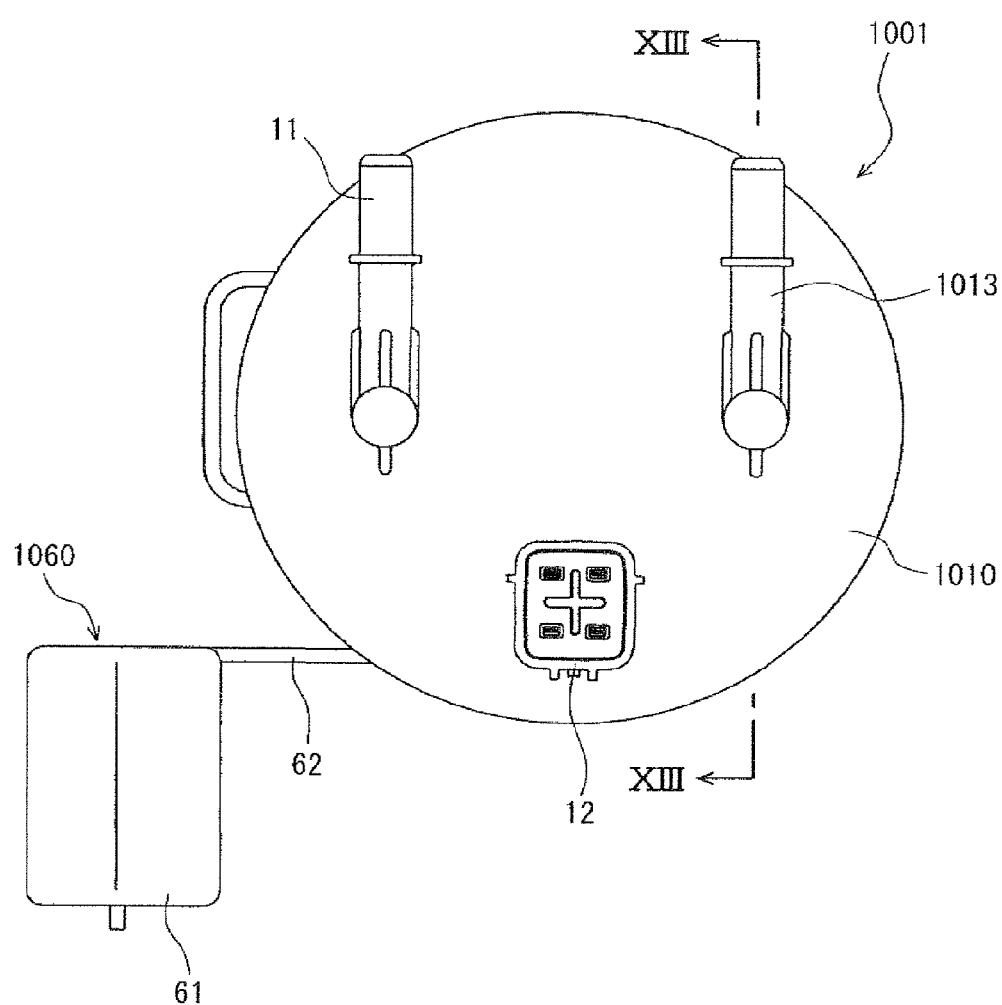
FIG. 12 is a top view of the fuel supply apparatus of the second embodiment.
Figure 13:
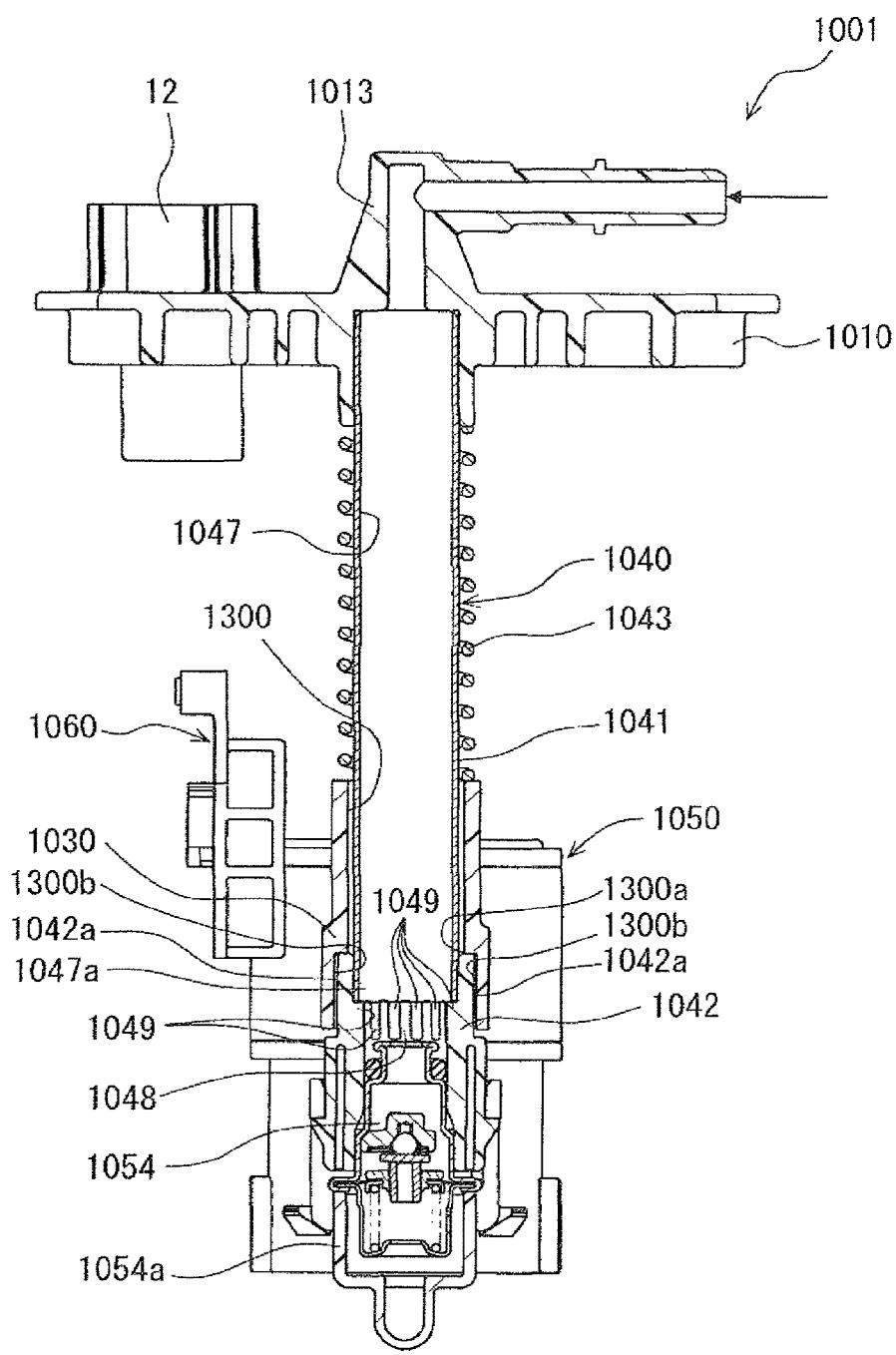
FIG. 13 is a cross-sectional view taken along line XIII-XIII in FIG. 12, showing a structure of the fuel supply apparatus of the second embodiment.

With reference to FIGS. 11 to 13, the flange 1010, which is made of the resin material and is configured into a circular disk body, has a return conduit 1013 in addition to the fuel supply conduit 11 and the electric connector 12 discussed in the first embodiment. The return conduit 1013 returns a branched flow of fuel. Specifically, the fuel, which is discharged from the pump unit 1050 and is supplied to the outside of the fuel tank 2 through the fuel supply conduit 11, is branched through a fuel filter placed at the outside of the fuel tank 2, and this branched flow of the fuel is returned to the inside of the fuel tank 2 through the return conduit 1013.

As shown in FIG. 11, the sub-tank 1020, which is made of a resin material and is configured into a cup-shaped body (a cylindrical tubular body with a closed bottom), is not integrated with the pump unit 1050 and is fixed on the bottom portion 2c of the fuel tank 2. In place of the jet pump 21 of the first embodiment, a fuel passage 1022 is formed at a bottom portion 1020a of the sub-tank 1020 to permit a flow of the fuel from the inside of the fuel tank 2 into the sub-tank 1020 through the fuel passage 1022. The sub-tank 1020 stores the fuel, which is supplied to the sub-tank 1020 in the above-described manner.

As shown in FIGS. 11 and 13, the pump bracket 1030, which is made of a resin material, is connected to the flange 1010 through the adjusting mechanism 1040. In this connected state, the pump bracket 1030 holds the remaining fuel quantity sensing device 1060 and the pump unit 1050 in the inside of the fuel tank 2.

The adjusting mechanism 1040 includes a support shaft 1041, an intermediate member 1042 and a resilient member 1043. As shown in FIG. 13, the support shaft 1041, which is made of a metal material and is configured into a cylindrical tubular body, defines a return passage 1047 therein to conduct the fuel therethrough. The support shaft 1041 is securely press fitted into the flange 1010 such that the support shaft 1041 is generally coaxial with a downstream end portion of the return conduit 1013. In this way, the branched flow of the fuel, which is divided at the outside of the fuel tank 2, flows into the return passage 1047 through the return conduit 1013. The support shaft 1041 is connected to the pump bracket 1030, the pump unit 1050 and the remaining fuel quantity sensing device 1060, which are integrated together and will be hereinafter simply referred to as integrated components 1030, 1050, 1060, through the intermediate member 1042. Thereby, even in the second embodiment, the flange 1010 is connected to the integrated components 1030, 1050, 100 through the single support shaft 1041.

The intermediate member 1042, which is made of a resin material and is configured into a cylindrical tubular body, defines a communication passage 1048 therein. The intermediate member 1042 is installed to the support shaft 1041 such that the intermediate member 1042 is generally coaxial with the support shaft 1041. In this way, the branched flow of the fuel, which is divided at the outside of the fuel tank 2, flows through the return passage 1047 and then the communication passage 1048 that is placed at an outlet 1047a of the return passage 1047. The intermediate member 1042 is also installed to the pump bracket 1030, so that the intermediate member 1042 enables a relative positional change between the support shaft 1041 and the integrated components 1030, 1050, 1060 in the axial direction of the support shaft 1041 and limits a relative positional change between the support shaft 1041 and the integrated components 1030, 1050, 1060 in the circumferential direction of the support shaft 1041.

As shown in FIGS. 11 and 13, the resilient member 1043, which is a coil spring in this embodiment, is placed radially outward of the support shaft 1041 such that the resilient member 1043 is generally coaxial with the support shaft 1041 and is interposed between the flange 1010 and the pump bracket 1030. The resilient member 1043 exerts a restoring force in the axial direction of the support shaft 1041 to urge the integrated components 1030, 1050, 1060 toward the bottom portion 2c of the fuel tank 2, so that a suction filter 1051 of the pump unit 1050 always contacts the bottom portion 2c of the fuel tank 2. In the second embodiment, the functions of the resilient member 1043 and of the intermediate member 1042 enable the stabilization of the positioning of the integrated components 1030, 1050, 1060 in the fuel tank 2.

As shown in FIG. 11, a lower portion of the pump unit 1050, which is connected to the pump bracket 1030 through snap-fitting, is received in the inside of the sub-tank 1020, and an upper portion of the pump unit 1050 projects to the outside of the sub-tank 1020. The pump unit 1050 includes the suction filter 1051 and a fuel pump 1052.

The suction filter 1051, which is located at a lowermost portion of the pump unit 1050, is placed on the bottom portion 1020a of the sub-tank 1020. The suction filter 1051 is connected to a fuel inlet 1052a of the fuel pump 1052 and filters relatively large foreign objects (debris) contained in the fuel, which is drawn by the fuel pump 1052 from the sub-tank 1020. The fuel pump 1052 is placed on an upper side of the suction filter 1051 and has the fuel inlet 1052a and a fuel outlet 1052b, which are directed downward and upward, respectively. The fuel pump 1052 draws the fuel from the sub-tank 1020 through the suction filter 1051 and the fuel inlet 1052a of the fuel pump 1052 upon rotation of an electric motor (not shown) of the fuel pump 1052, which is received in a housing of the fuel pump 1052. Then, the fuel pump 1052 pressurizes the drawn fuel and discharges the pressurized fuel toward the fuel supply conduit 11, which is connected to the fuel outlet 1052b of the fuel pump 1052.

In the second embodiment, as shown in FIGS. 11 and 13, the pressure regulator 1054 is provided separately from the pump unit 1050, and the pressure regulator 1054 is installed to the intermediate member 1042 by using a fixture member 1054a. When the pressure regulator 1054 is received in the communication passage 1048; which is formed as an inside space by the intermediate member 1042, the pressure regulator 1054 is placed at the outlet 1047a of the return passage 1047. The pressure regulator 1054 adjusts the pressure of the branched flow of the fuel, which flows from the return passage 1047 to the communication passage 1048, so that the pressure of the main flow of the fuel, i.e., the pressure of the fuel discharged from the pump unit 1050 to the fuel supply conduit 11 located at the outside of the fuel tank 2, is adjusted. The pressure regulator 1054 of the second embodiment outputs excessive fuel, which becomes excessive at the time of adjusting the pressure in the pressure regulator 1054, to the inside of the sub-tank 1020.

As shown in FIGS. 11 and 13, the remaining fuel quantity sensing device 160 is held on the pump bracket 1030 and is placed at the outside of the sub-tank 1020. The remaining fuel quantity sensing device 1060 is also formed as a sender gauge, which senses a quantity of the remaining fuel in the fuel tank 2 with the float 61 and the arm 62 in a manner similar to that of the first embodiment.

Now, a characteristic structure of the fuel supply apparatus 1001 of the second embodiment will be described. In the following description, the circumferential direction of the support shaft 1041 will be also simply referred to as the circumferential direction, and the axial direction of the support shaft 1041 will be also simply referred to as the axial direction.

Figure 14:
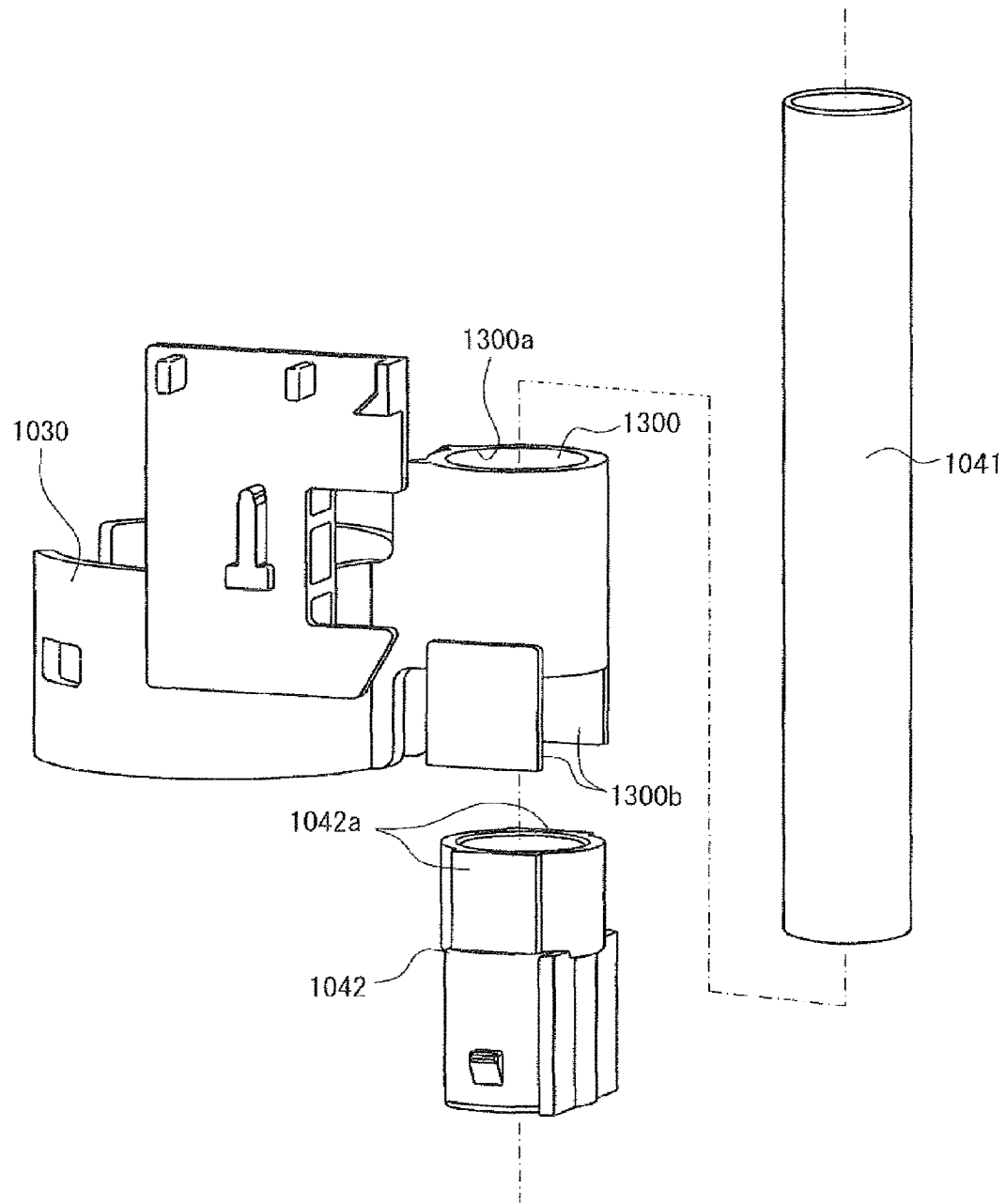
FIG. 14 is an exploded perspective view showing an adjusting mechanism of the fuel supply apparatus of the second embodiment.

As shown in FIGS. 13 and 14, the intermediate member 1042 of the adjusting mechanism 1040 includes two coupling portions 1042a at two circumferential locations, respectively. The coupling portions 1042a are engaged to and are thereby coupled to an inner peripheral surface 1300a of an opening 1300 of the pump bracket 1030 (serving as a holding member), in which the support shaft 1041 is loosely inserted in a generally coaxial manner. In the present embodiment, the coupling portions 1042a are configured to be planar portions, which are generally parallel to each other and extend in the axial direction of the support shaft 1041. Thereby, the coupling portions 1042a form a double sided portion, in which two planar sections are diametrically opposed each other. Two planar portions 1300b are formed in the inner peripheral surface 1300a of the opening 1300 such that the planar portions 1300b are generally parallel to each other and extend in the axial direction of the support shaft 1041. The planar portions 1300b are engaged with the coupling portions 1042a, respectively, to make a surface-to-surface contact with the coupling portions 1042a, respectively. Through the surface-to-surface contact between each planar portion 1300*b* and the corresponding coupling portion 1042*a*, the relative axial displacement between the pump bracket 1030 and the intermediate member 1042 is enabled, and the relative circumferential rotation between the pump bracket 1030 and the intermediate member 1042 is limited.

As shown in FIG. 13, the support shaft 1041 is inserted into the intermediate member 1042 such that the support shaft 1041 is generally coaxial with the intermediate member 1042. The support shaft 1041 is press fitted into and is thereby connected to the intermediate member 1042, and thereby the intermediate member 1042 achieves a high connecting strength relative to the support shaft 1041. Thus, the relative rotation of the support shaft 1041 relative to the intermediate member 1042 in the circumferential direction is limited. Furthermore, a plurality of axial ridges 1049 is formed in an inner peripheral surface of the intermediate member 1042 such that the axial ridges 1049 are arranged one after another in the circumferential direction and project radially inwardly. When the ridges 1049 of the intermediate member 1042 are engaged with a lower end portion of the support shaft 1041, a relative displacement between the intermediate member 1042 and the support shaft 41 in the axial direction is limited.

Thereby, the intermediate member 1042 enables the axial relative displacement between the press fitted support shaft 1041 and the pump bracket 1030 by axially changing the engaging position of the coupling portions 1042*a* of the intermediate member 1042 relative to the planar portions 1300*b* of the pump bracket 1030. Thereby, the relative positional change of the integrated components 1030, 1050, 1060 relative to the support shaft 1041 in the axial direction is reliably enabled.

Furthermore, the coupling portions 1042*a* of the intermediate member 1042 make the surface-to-surface contact relative to the planar portions 1300*b* of the pump bracket 1030 in the circumferential direction, so that the relative rotation between the press fitted support shaft 1041 and the pump bracket 1030 in the circumferential direction is limited. Thereby, the relative positional change of the integrated components 1030, 1050, 1060 relative to the support shaft 1041 in the circumferential direction is reliably limited.

Figure 15:
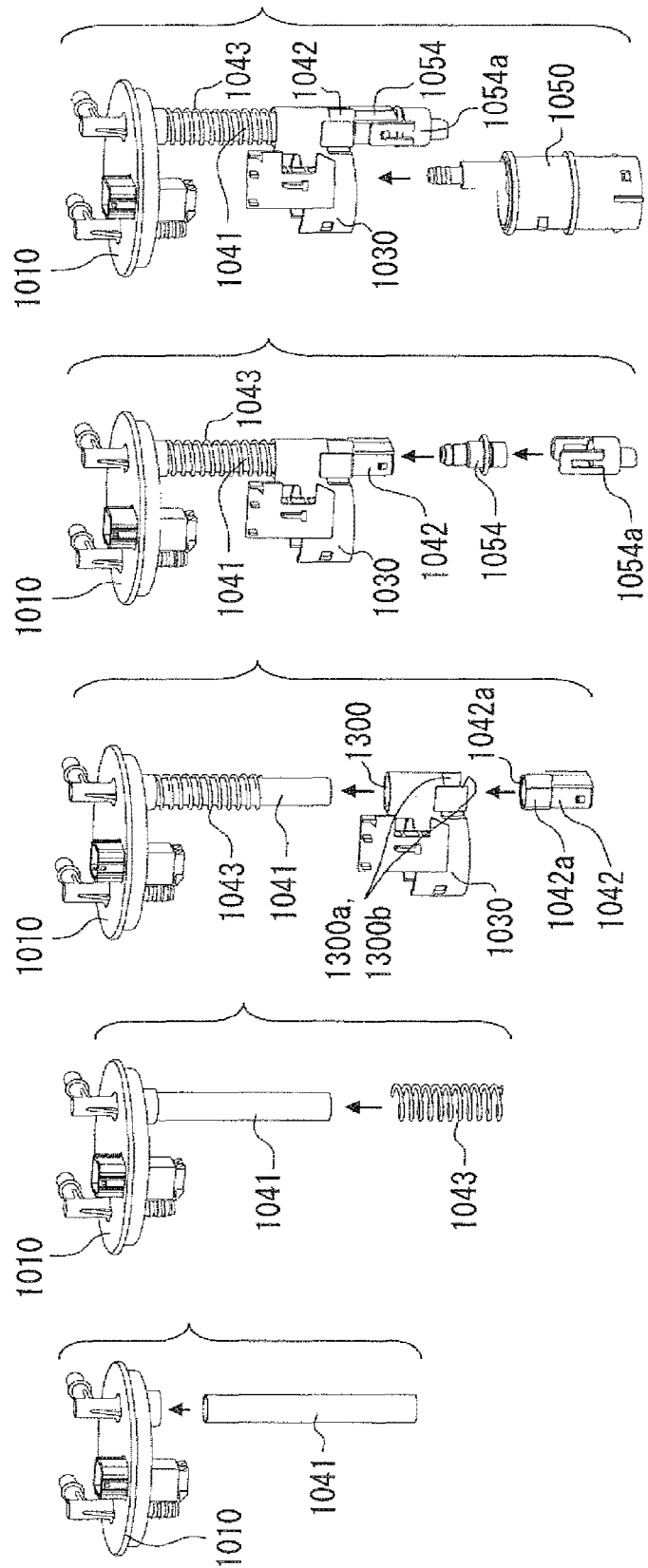
FIGS. 15A to 15E are schematic diagrams for describing a manufacturing method of the fuel supply apparatus of the second embodiment.

The manufacturing of the fuel supply apparatus 1001 is performed as follows. First of all, as shown in FIG. 15A, the support shaft 1041 is securely press fitted into the flange 1010. Next, as shown in FIG. 15B, the support shaft 1041 is inserted into the radially inner space of the resilient member 1043.

Thereafter, as shown in FIG. 15C, the support shaft 1041 is inserted into the opening 1300 of the pump bracket 1030. Then, the support shaft 1041 is inserted into and is thereby connected to the intermediate member 1042 (connecting step). At this time, the support shaft 1041, which is loosely received in the opening 1300 of the pump bracket 1030, is rotated, so that the connecting angle θ (not shown) between the intermediate member 1042 and the support shaft 41 in the circumferential direction is freely adjusted to a desired angle. Then, at this adjusted connecting angle θ, the support shaft 1041 is press fitted into the intermediate member 1042. Also, as shown in FIG. 15C, the coupling portions 1042*a* of the intermediate member 1042 are coupled to the planar portions 1300*b* of the inner peripheral surface 1300*a* of the opening 1300 of the pump bracket 1030 (coupling step). Through the connecting step and the coupling step, the assembling of the adjusting mechanism 1040 is completed. Here, for example, when the connecting step and the coupling step are simultaneously executed, the support shaft 1041 can be easily press fitted into the intermediate member 1042, to which the pump bracket 1030 is engaged upon engaging the coupling portions 1042*a* to the inner peripheral surface 1300*a*, more specifically the planar portions 1300*b*.

Then, as shown in FIG. 15D, the pressure regulator 1054 is inserted into the intermediate member 1042, and the fixture member 1054*a* is installed over pressure regulator 1054 to fix the pressure regulator 1054 to the intermediate member 1042. Thereafter, as shown in FIG. 15E, the pump unit 1050 is installed to the pump bracket 1030, and the remaining fuel quantity sensing device 1060 (not depicted in FIG. 15E) is installed to the pump bracket 1030.

Then, as shown in FIG. 11, the integrated components 1030, 1050, 1060 and the adjusting mechanism 1040 are inserted into the inside of the fuel tank 2, to which the sub-tank 1020 is fixed, and the flange 1010, which is connected to the support shaft 1041, is installed to the fuel tank 2, so that the assembling of the fuel supply apparatus 1001 is completed (installing step). At this time, a relative position of the integrated components 1030, 1050, 1060, which are urged downward by the resilient member 1043, relative to the flange 1010 in the axial direction changes until the suction filter 1051 contacts the sub-tank 1020 placed on the bottom portion 2*c* of the fuel tank 2. Therefore, the installation position of the integrated components 1030, 1050, 1060 in the inside of the fuel tank 2 can be freely determined regardless of the installation position of the flange 10 by the adjustment of the connecting angle θ in the circumferential direction and by the positional change of the resilient member 1043 in the axial direction toward the restoring force application side. In this way, the versatility of the fuel supply apparatus 1001 can be further improved.

Furthermore, in the fuel supply apparatus 1001, which is constructed in the above-described manner, the relative positional change of the integrated components 1030, 1050, 1060 relative to the single support shaft 1041 in the circumferential direction is limited by the intermediate member 1042. Therefore, the installation position of the integrated components 1030, 1050, 1060 in the inside of the fuel tank 2 is less likely deviated in the circumferential direction after the installation thereof. Particularly, in the fuel supply apparatus 1001, due to the surface-to-surface contact of the intermediate member 1042 discussed above, the relative positional change of the integrated components 1030, 1050, 1060 relative to the support shaft 1041 in the circumferential direction is reliably limited. Thus, in the fuel supply apparatus 1001, the installation position of the integrated components 1030, 1050, 1060 is stabilized, and thereby it is possible to ensure the required fuel delivery performance of the pump unit 1050 and the required sensing performance of the remaining fuel quantity sensing device 1060 in addition to the implementation of the versatility of the fuel supply apparatus 1001.

In addition, in the fuel supply apparatus 1001, the intermediate member 1042 is configured into the hollow cylindrical tubular body, and the pressure regulator 1054 is received in the inside of the intermediate member 1042. In this way, the fuel storage space in the fuel tank 2 can be further increased by the amount, which corresponds to the installation volume of the pressure regulator 1054 in the intermediate member 1042.

Third Embodiment

Now, a characteristic structure of a fuel supply apparatus according to a third embodiment of the present invention will be described with reference to the accompanying drawings.

Figure 16:
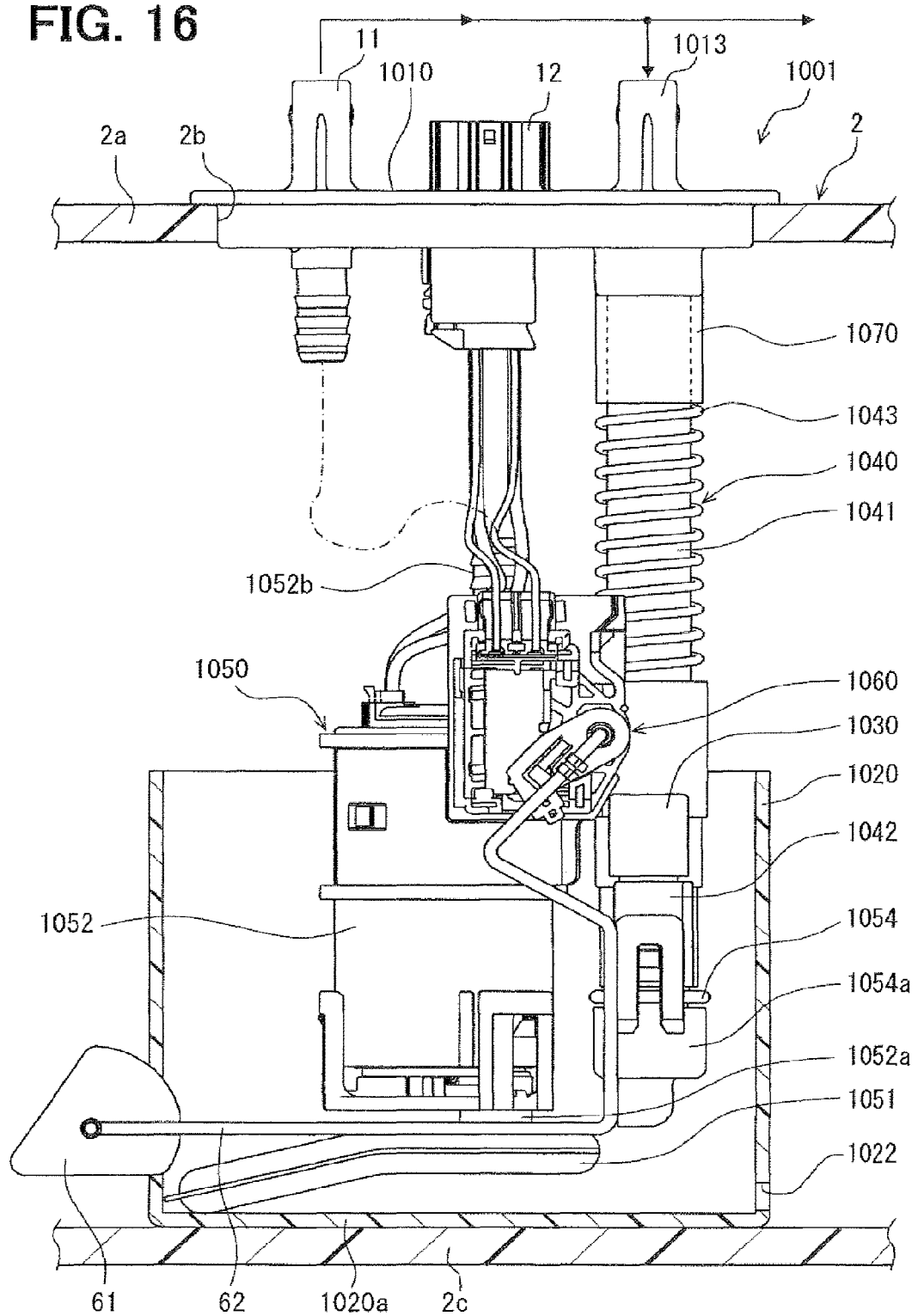
FIG. 16 is a longitudinal cross-sectional view of a fuel supply apparatus according to a third embodiment of the present invention.
Figure 17:
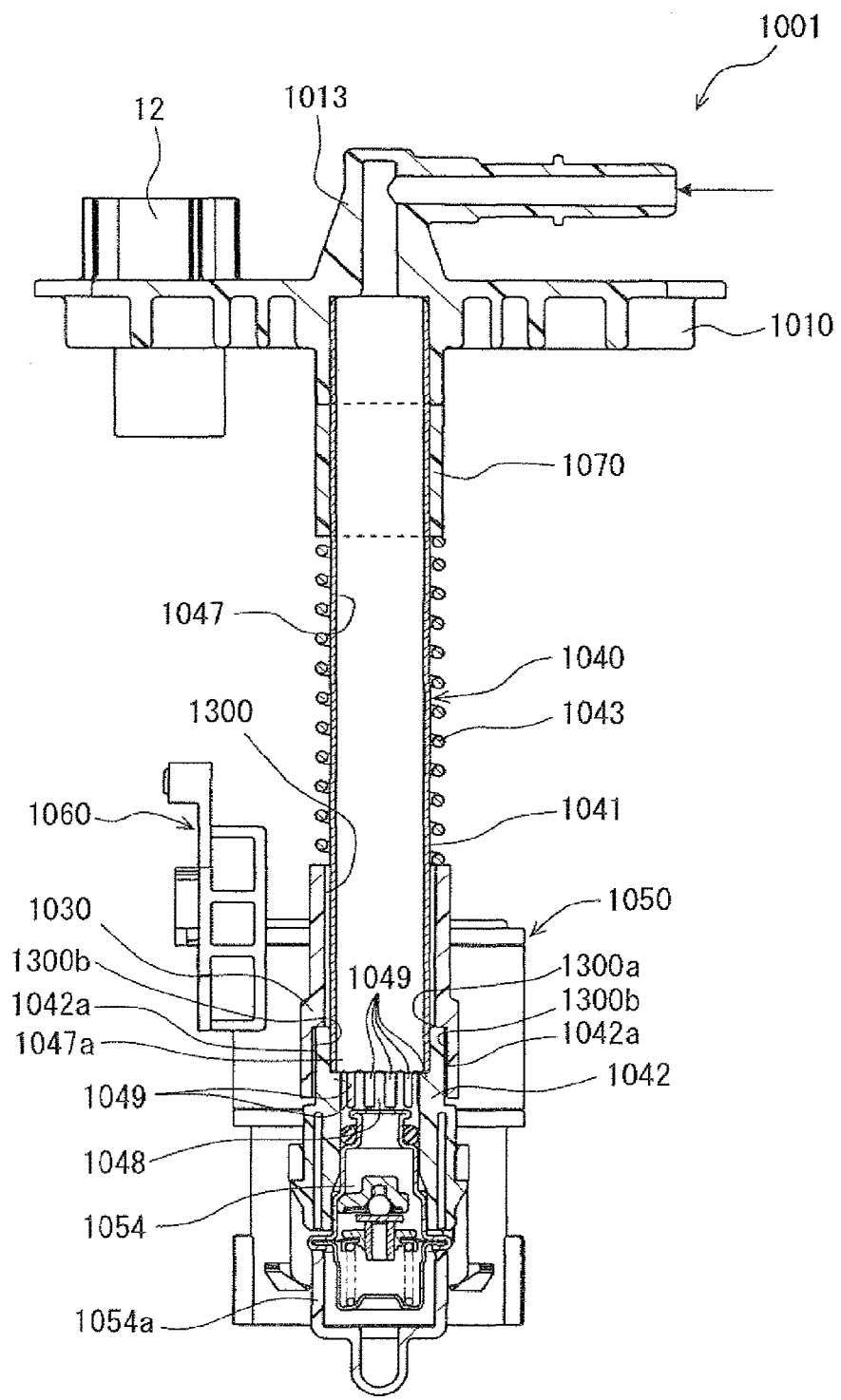
FIG. 17 is a cross-sectional view similar to that of FIG. 13, showing the fuel supply apparatus of third embodiment.

As shown in FIGS. 16 and 17, the third embodiment is a modification of the second embodiment. That is, according to the third embodiment, a ring spacer 1070 is added to the fuel supply apparatus of the second embodiment.

Specifically, the support shaft 1041 of the third embodiment is lengthened in the axial direction in comparison to that of the second embodiment to correspond with a change in the depth of the fuel tank 2. Because of this change, the ring spacer 1070, which is made of a resin material and is configured into a cylindrical tubular body, is interposed between the flange 1010 and the resilient member 1043 in the axial direction, which coincides with the installation direction of the support shaft 1041 to the flange 1010. Thereby, when the axial thickness (axial extent) of the ring spacer 1070 is adjusted based on the depth of the fuel tank 2, it is only required to change the length of the support shaft 1041 based on the depth of the fuel tank 2, and thereby it is possible to use the resilient member 1043 of the same length (common length). Thus, the versatility of the fuel supply apparatus can be further improved.

Fourth Embodiment

Now, a characteristic structure of a fuel supply apparatus according to a fourth embodiment of the present invention will be described with reference to the accompanying drawings.

With reference to FIGS. 18 to 21, the fourth embodiment is a modification of the first embodiment. In an adjusting mechanism 2040 of the fourth embodiment, a support shaft 2041, which is made of a metal material and is securely press fitted into the flange 10, has a center hole 2411 that has a polygonal cross section (polygonal shape), more specifically a hexagonal cross section (hexagonal shape) in an axial view thereof, and the center hole 2411 forms the inner space 410. In the following description, the circumferential direction of the support shaft 2041 will be also simply referred to as the circumferential direction, and the axial direction of the support shaft 2041 will be also simply referred to as the axial direction.

Figure 18:
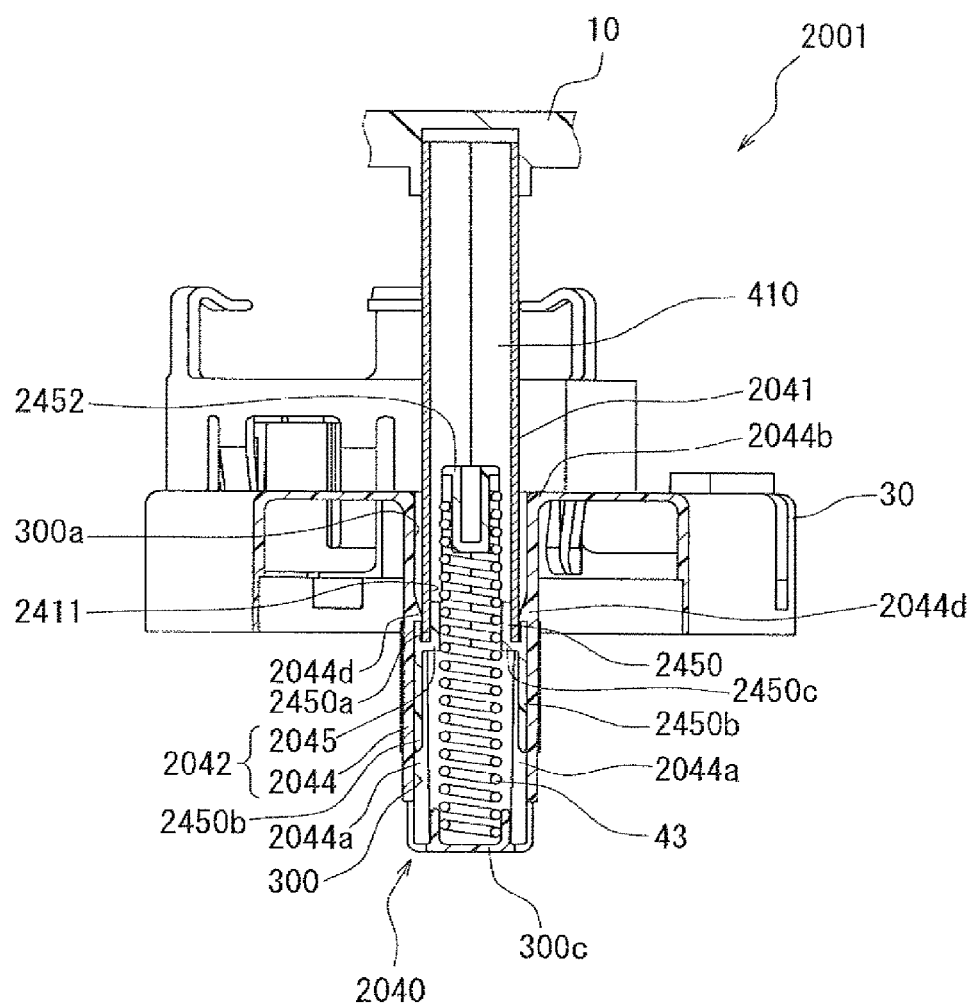
FIG. 18 is a cross-sectional view similar to that of FIG. 7, showing a fuel supply apparatus according to a fourth embodiment of the present invention.
Figure 21:
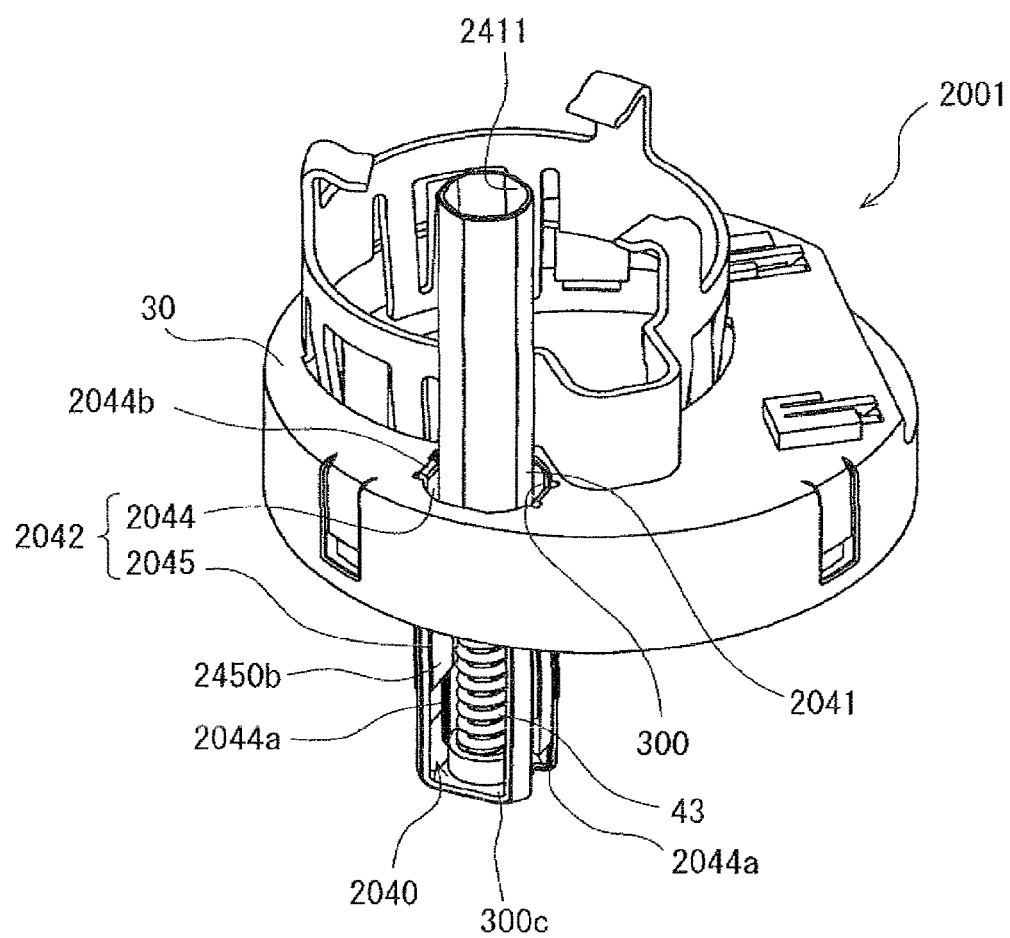
FIG. 21 is a perspective view showing a main feature of the fuel supply apparatus of the fourth embodiment.

In the adjusting mechanism 2040, as shown in FIGS. 18 and 21, a first bracket 2044, which is made of a resin material and is a component of an intermediate member 2042, is configured as a cup-shaped body and is formed integrally as one piece with a corresponding portion of the cover member 30, which forms the opening 300. Thereby, the first bracket 2044 has a coupling portion 2044b, which is formed integrally with and is thereby coupled to the upper portion of the cover member 30. Thus, the cover member 30, which is formed integrally with the first bracket 2044, limits a relative positional change between the first bracket 2044 and the cover member 30 in both of the axial direction and the circumferential direction, i.e., limits both of relative axial displacement between the first bracket 2044 and the cover member 30 and the relative circumferential rotation between the first bracket 2044 and the cover member 30.

The first bracket 2044 receives the support shaft 2041, which is placed coaxially with the support shaft 2041, such that the support shaft 2041 is rotatable relative to the first bracket 2044 in the circumferential direction. The first bracket 2044, which surrounds the support shaft 2041, has two longitudinal grooves 2044a, which are formed at two circumferential locations, respectively, of the first bracket 2044 and extend in the axial direction.

Figure 19:
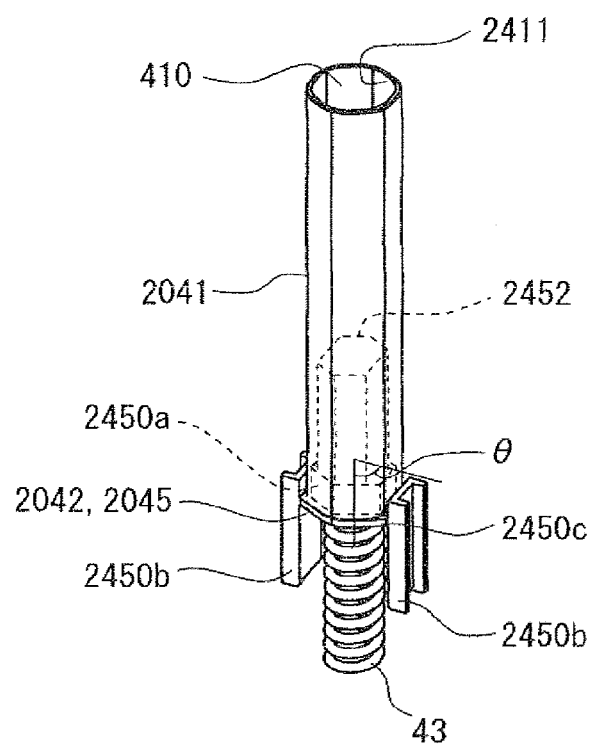
FIG. 19 is a perspective view showing an adjusting mechanism of the fuel supply apparatus of the fourth embodiment.
Figure 20:
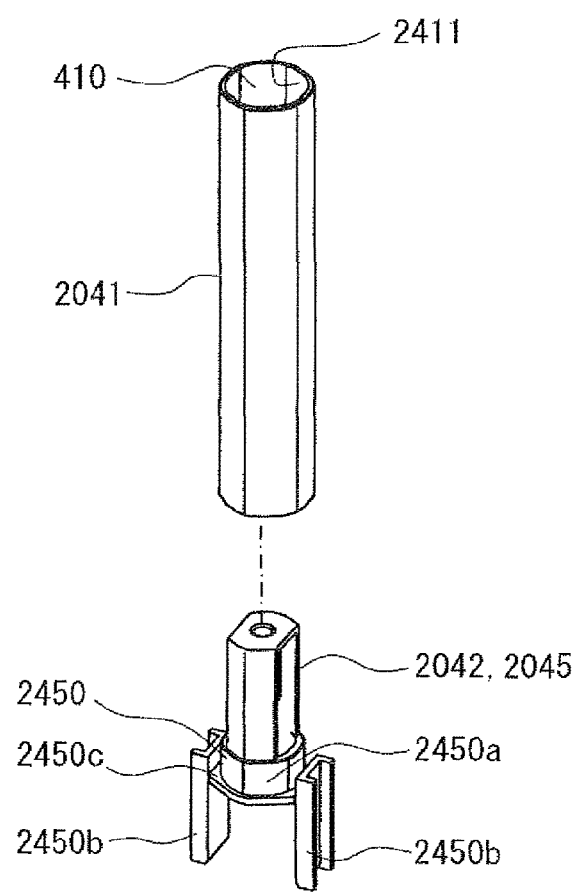
FIG. 20 is an exploded perspective view showing the adjusting mechanism of the fuel supply apparatus of the fourth embodiment.

In the adjusting mechanism 2040, a second bracket 2045, which is made of a resin material and cooperates with the first bracket 2044 to form the intermediate member 2042, is placed radially inward of the first bracket 2044. As shown in FIGS. 18 to 20, a main body 2450 of the second bracket 2045, which is placed coaxially with the support shaft 2041, has an outer peripheral surface 2450a, which has a polygonal cross section (polygonal shape), more specifically a hexagonal cross section (hexagonal shape) in the axial view. When the outer peripheral surface 2450a of the main body 2450 of the second bracket 2045 is fitted into the center hole 2411 from the lower side thereof, relative rotation of the support shaft 2041 in the circumferential direction is limited by the second bracket 2045. An engaging portion 2450c, which is configured as a flange, is formed in a lower end portion of the main body 2450 of the second bracket 2045. The engaging portion 2450c is engaged with a lower end portion of the support shaft 2041 from a lower side thereof to limit upward displacement of the second bracket 2045 relative to the support shaft 2041.

Two fitting portions 2450b are formed in the second bracket 2045 at two circumferential locations, respectively, which are diametrically opposed to each other. Each fitting portion 2450b has a U-shaped cross section and projects from the lower end portion of the main body 2450 in the downward direction. As shown in FIGS. 18 and 21, each fitting portion 2450b is axially slidably fitted into a corresponding one of the longitudinal grooves 2044a of the first bracket 2044. With the axial slide fitting of the fitting portions 2450b into the longitudinal grooves 2044a, respectively, the second bracket 2045 is connected to the first bracket 2044 such that the first bracket 2044 and the second bracket 2045 are displaceable relative to each other in the axial direction, along which each longitudinal groove 2044a extends, but are not displaceable relative to each other in the circumferential direction, in which each of the fitting portions 2450b of the second bracket 2045 contacts circumferentially opposed sides of the corresponding one of the longitudinal grooves 2044a. Furthermore, in the present embodiment, the first bracket 2044 has two removal limiting portions 2044d, which radially inwardly project from two circumferential locations, respectively, of the first bracket 2044. Upper ends of the fitting portions 2450b contact the removal limiting portions 2044d, so that the removal of the second bracket 2045 from the first bracket 2044 is limited.

With the above described construction, it is possible to make a change in the fitting position between the longitudinal grooves 2044a of the first bracket 2044, which is formed integrally with the cover member 30, and the fitting portions 2450b of the second bracket 2045, which is connected to the support shaft 2041, and thereby it is possible to make relative displacement between the first bracket 2044 and the support shaft 2041 in the axial direction. Thereby, the relative positional change of the integrated components 20, 30, 50, 60 relative to the support shaft 2041 in the axial direction is reliably enabled.

In contrast, the circumferential contact between each of the longitudinal grooves 2044a of the first bracket 2044, which is formed integrally with the cover member 30, and the corresponding one of the fitting portions 2450b of the second bracket 2045, which is connected to the support shaft 2041, limits the relative rotation between the first bracket 2044 and the support shaft 2041. Thereby, the relative positional change of the integrated components 20, 30, 50, 60 relative to the support shaft 2041 in the circumferential direction is reliably limited.

Furthermore, in the fourth embodiment, as shown in FIGS. 18, 19 and 21, the resilient member 43 is coaxially received in the main body 2450 of the second bracket 2045 at radially inward of the main body 2450 of the second bracket 2045 such that the resilient member 43 projects downward through a gap between the fitting portions 2450b of the second bracket 2045. An upper end portion of the resilient member 43 is engaged with a top wall portion 2452 of the main body 2450 of the second bracket 2045. A lower end portion of the resilient member 43 is engage with a bottom portion 300c of the cover member 3D, which is formed by the first bracket 2044 at the outside of the support shaft 2041. In this way, the resilient member 43, which is axially interposed between the second bracket 2045 and the cover member 30, exerts the restoring force such that the resilient member 43 not only urges the integrated components 20, 30, 50, 60 toward the bottom portion 2c of the fuel tank 2 (i.e., in the downward direction) but also urges the second bracket 2045 in the inserting direction of the second bracket 2045 toward the inside of the support shaft 2041 (i.e., in the upward direction).

Figure 22:
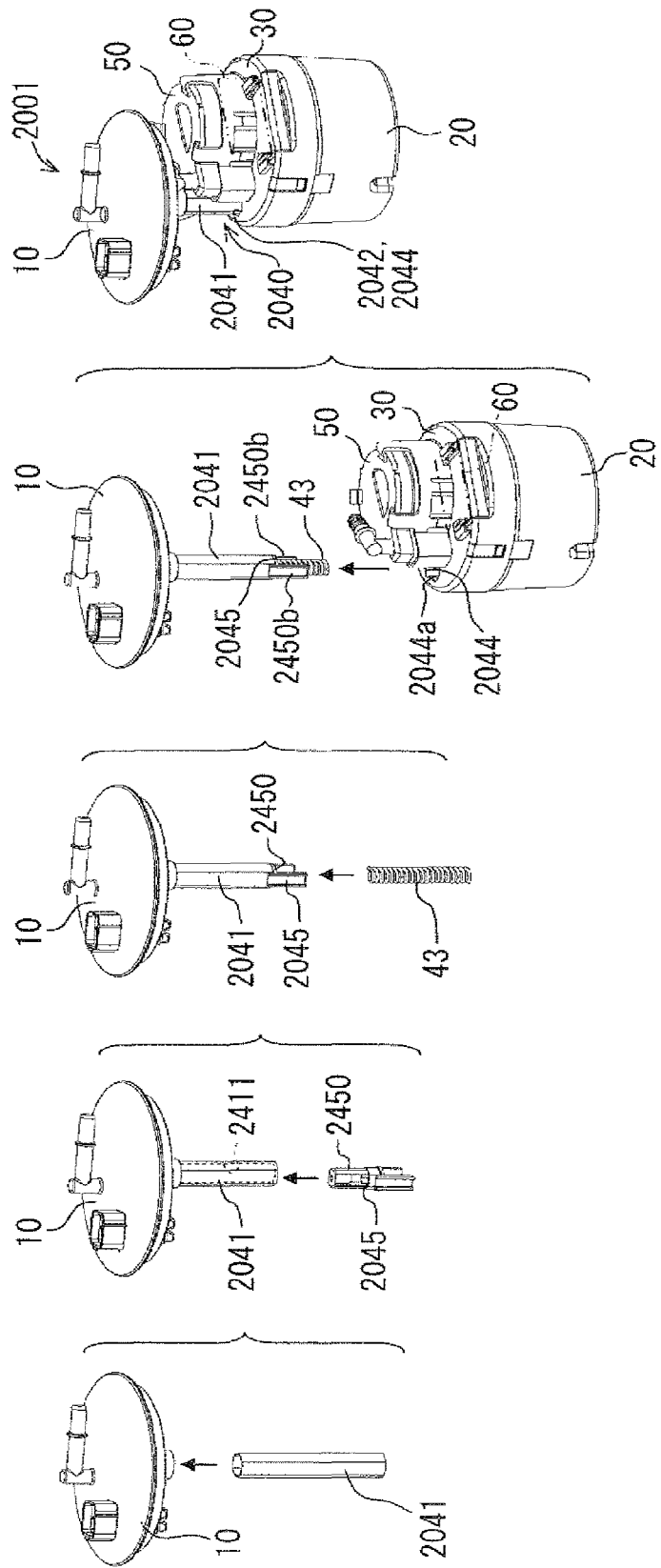
FIGS. 22A to 22E are schematic diagrams for describing a manufacturing method of the fuel supply apparatus of the fourth embodiment.

The manufacturing of the fuel supply apparatus 2001 of the fourth embodiment is performed as follows. First of all, as shown in FIG. 22A, the support shaft 2041 is securely press fitted into the flange 10. Next, as shown in FIG. 22B, the main body 2450 of the second bracket 2045 is fitted into and is connected to the center hole 2411 of the support shaft 2041 (connecting step). At this time, the second bracket 2045, which is placed coaxially with the support shaft 2041, is rotated relative to the support shaft 2041 to adjust the connecting angle θ (see FIG. 19) of the main body 2450 relative to the center hole 2411 by 60 degree span, i.e., by 60 degree increment/decrement (one of first to sixth 60 degree increments/decrements) in the circumferential direction, and then the main body 2450 is fitted into the center hole 2411 at the adjusted angle θ.

Next, as shown in FIG. 22C, the resilient member 43 is inserted into the main body 2450 of the second bracket 2045. Then, as shown in FIG. 22D, the fitting portions 2450b of the second bracket 2045 are axially slidably fitted into the longitudinal grooves 2044a, respectively, of the first bracket 2044, so that there is formed the intermediate member 2042, which is the assembly of the first and second brackets 2044, 2045. The first bracket 2044 of the present embodiment is coupled to the cover member 30 at an integrally molding step (coupling step), which is executed prior to the step of FIG. 22A to integrally mold the first bracket 2044 with the cover member 30, so that the manufacturing of the adjusting mechanism 2040 is completed upon the assembling of the intermediate member 2042, as shown in FIG. 22E.

Then, the integrated components 20, 30, 50, 60 and the adjusting mechanism 2040 are inserted into the fuel tank 2, and the flange 10, which is connected to the support shaft 2041, is installed to the fuel tank 2, so that the manufacturing of the fuel supply apparatus 2001 is completed (installing step). At this time, a relative position of the integrated components 20, 30, 50, 60, which is urged by the resilient member 43, relative to the flange 10 in the axial direction changes until the sub-tank 20 contacts the bottom portion 2c of the fuel tank 2. Therefore, the installation position of the integrated components 20, 30, 50, 60 in the inside of the fuel tank 2 can be determined regardless of the installation position of the flange 10 by the adjustment of the connecting angle θ in the circumferential direction and by the positional change of the resilient member 43 in the axial direction toward the restoring force application side. Furthermore, in the case where the amount of fitting of the second bracket 2045 to the support shaft 2041 is kept constant by the engagement of the engaging portion 2450c to the support shaft 2041, the length of the resilient member 43 can be kept constant by changing only the length of the support shaft 2041. In this way, the versatility of the fuel supply apparatus 2001 can be further improved.

Furthermore, in the fuel supply apparatus 2001, which is constructed in the above-described manner, the relative positional change of the integrated components 20, 30, 50, 60 relative to the single support shaft 2041 in the circumferential direction is limited by the intermediate member 2042. Therefore, the installation position of the integrated components 30, 50, 60 in the inside of the fuel tank 2 is less likely deviated in the circumferential direction after the installation thereof. Particularly, in the fuel supply apparatus 2001, the restoring force of the resilient member 43, which urges the second bracket 2045 in the press-fitting direction thereof toward the inside of the support shaft 2041, can always keep the fitted state of the second bracket 2045 and the support shaft 2041, which limits the relative rotation between the second bracket 2045 and the support shaft 2041. Thereby, in addition to the advantage of the slidably filling of the first and second brackets 2044, 2045, the relative positional change of the integrated components 20, 30, 50, 60 relative to the support shaft 2041 in the circumferential direction can be reliably limited. Furthermore, in the fuel supply apparatus 2001, the main body 2450 of the second bracket 2045 of the intermediate member 2042 is fitted into the center hole 2411 of the support shaft 2041, so that it is possible to limit the tilting of the support shaft 2041, which is guided by the intermediate member 2042. In this way, the installation position of the integrated components 20, 30, 50, 60, which are connected to the support shaft 2041, is stabilized, and thereby it is possible to ensure the required fuel delivery performance of the pump unit 50 and the required sensing performance of the remaining fuel quantity sensing delive 60 in addition to the implementation of the versatility of the fuel supply apparatus 2001 discussed above.

Furthermore, even in the fuel supply apparatus 2001, the support shaft 2041, which is made of the metal material, and the intermediate member 2042, which includes the second bracket 2045 made of the resin material, are provided. Therefore, in a manner similar to that of the first embodiment, it is possible to limit generation of noises.

Fifth Embodiment

Now, a characteristic structure of a fuel supply apparatus according to a fifth embodiment of the present invention will be described with reference to the accompanying drawings.

Figure 23:
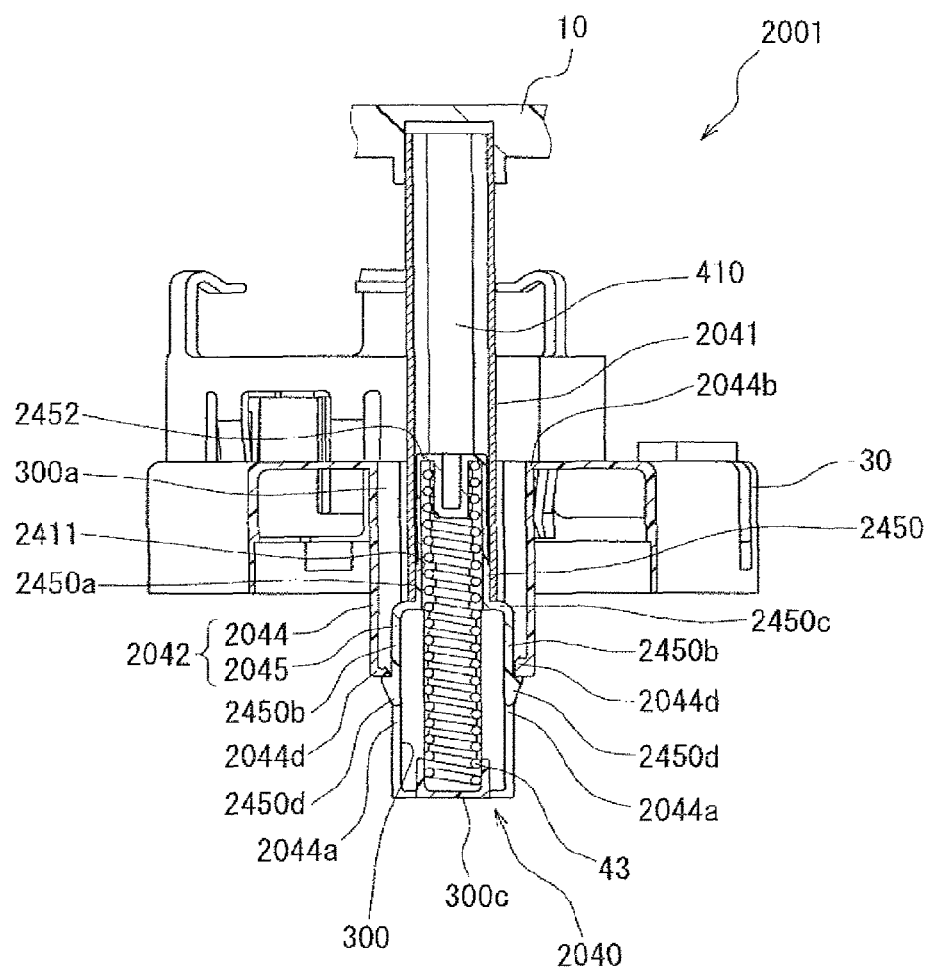
FIG. 23 is a cross-sectional view similar to that of FIG. 7, showing a fuel supply apparatus according to a fifth embodiment of the present invention.
Figure 24:
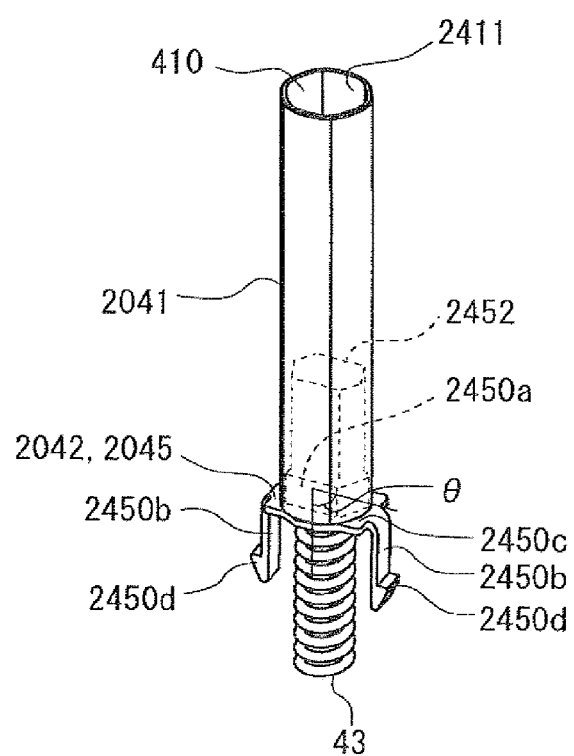
FIG. 24 is a perspective view showing an adjusting mechanism of the fuel supply apparatus of the fifth embodiment.
Figure 25:
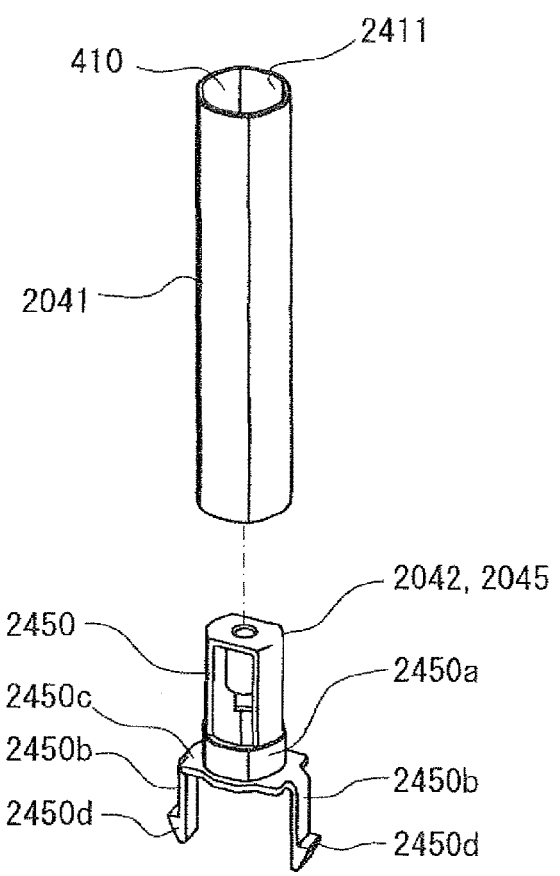
FIG. 25 is an exploded perspective view showing the adjusting mechanism of the fuel supply apparatus of the fifth embodiment.

With reference to FIGS. 23 to 25, the fifth embodiment is a modification of the fourth embodiment. A second bracket 2045 of the fifth embodiment includes two projecting claws 2450d, which radially outwardly project from the fitting portions 2450b, respectively. The projecting claws 2450d of the second bracket 2045 contact the removal limiting portions 2044d, respectively, of the first bracket 2044, so that removal of the second bracket 2045 from the first bracket 2044 is limited. Even in the fifth embodiment, the fuel supply apparatus 200t which is formed in a manner similar to that of the fourth embodiment, can achieve the advantages similar to those of the fourth embodiment.

Sixth Embodiment

Now, a characteristic structure of a fuel supply apparatus according to a sixth embodiment of the present invention will be described with reference to the accompanying drawings.

Figure 26:
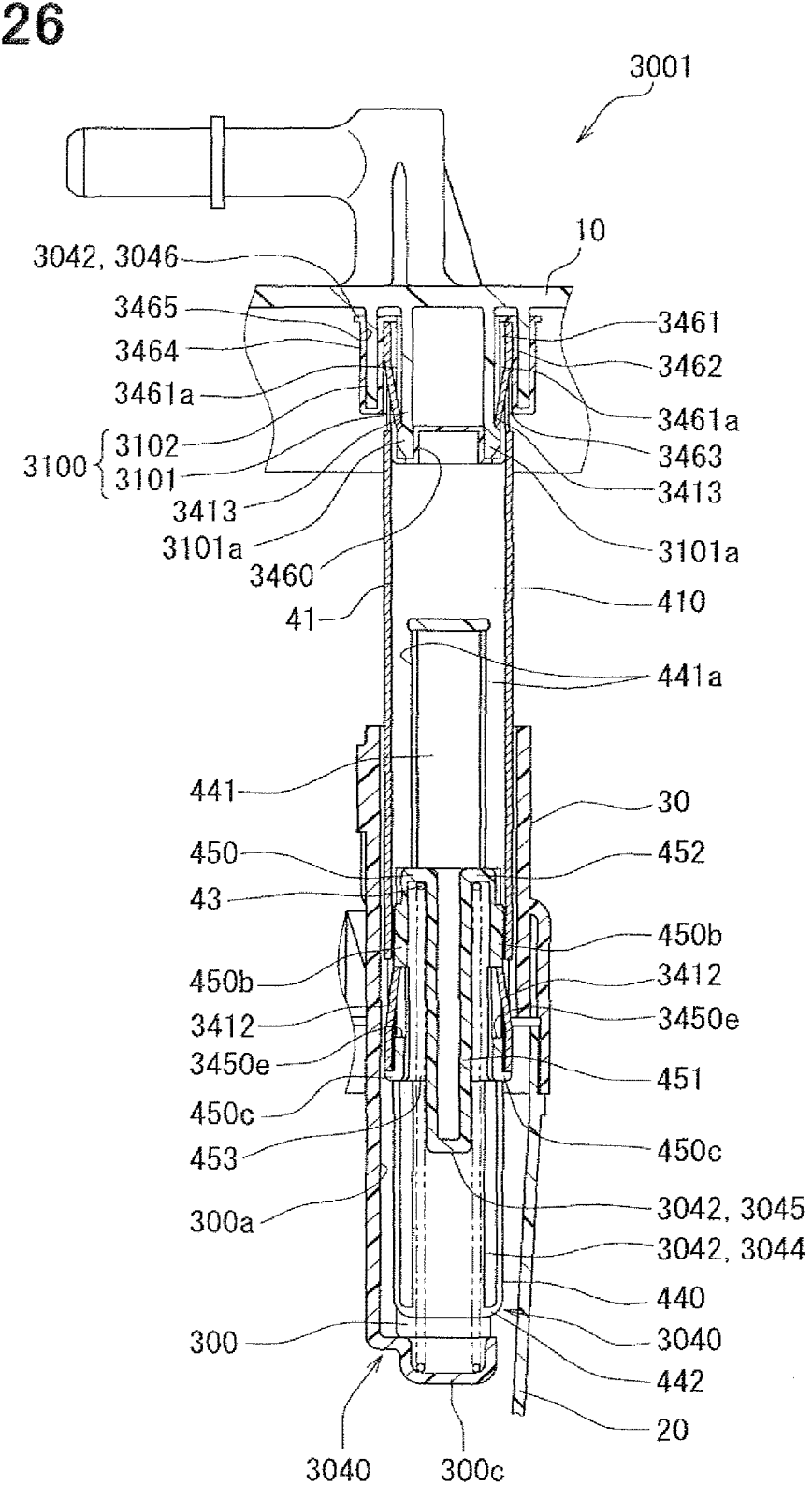
FIG. 26 is a cross-sectional view taken along line XXVI-XXVI in FIG. 29, showing a structure of a fuel supply apparatus according to a sixth embodiment of the present invention.
Figure 27:
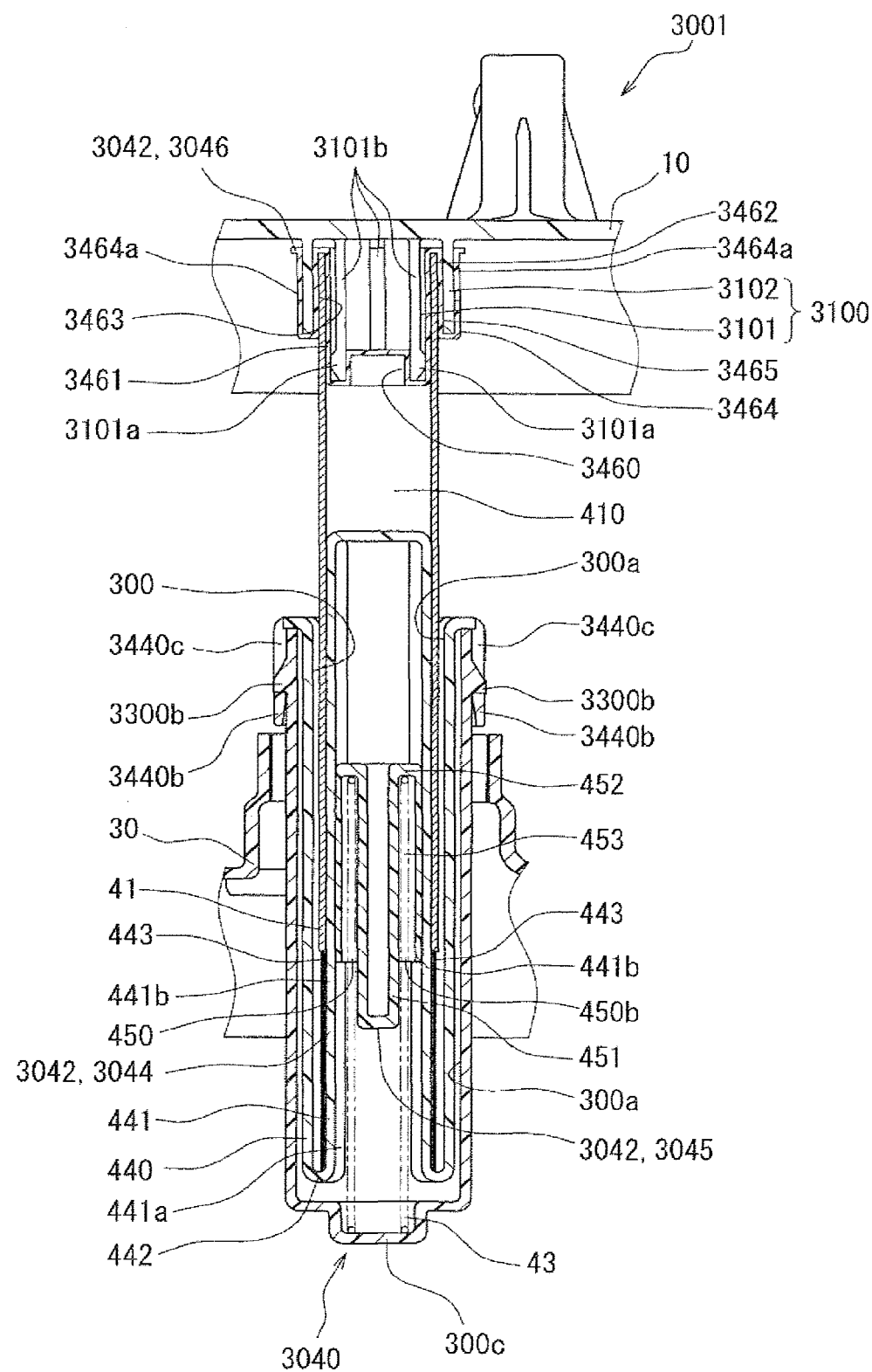
FIG. 27 is a cross-sectional view taken along line XXVII-XXVII in FIG. 29, showing a structure of the fuel supply apparatus of the sixth embodiment.
Figure 28:
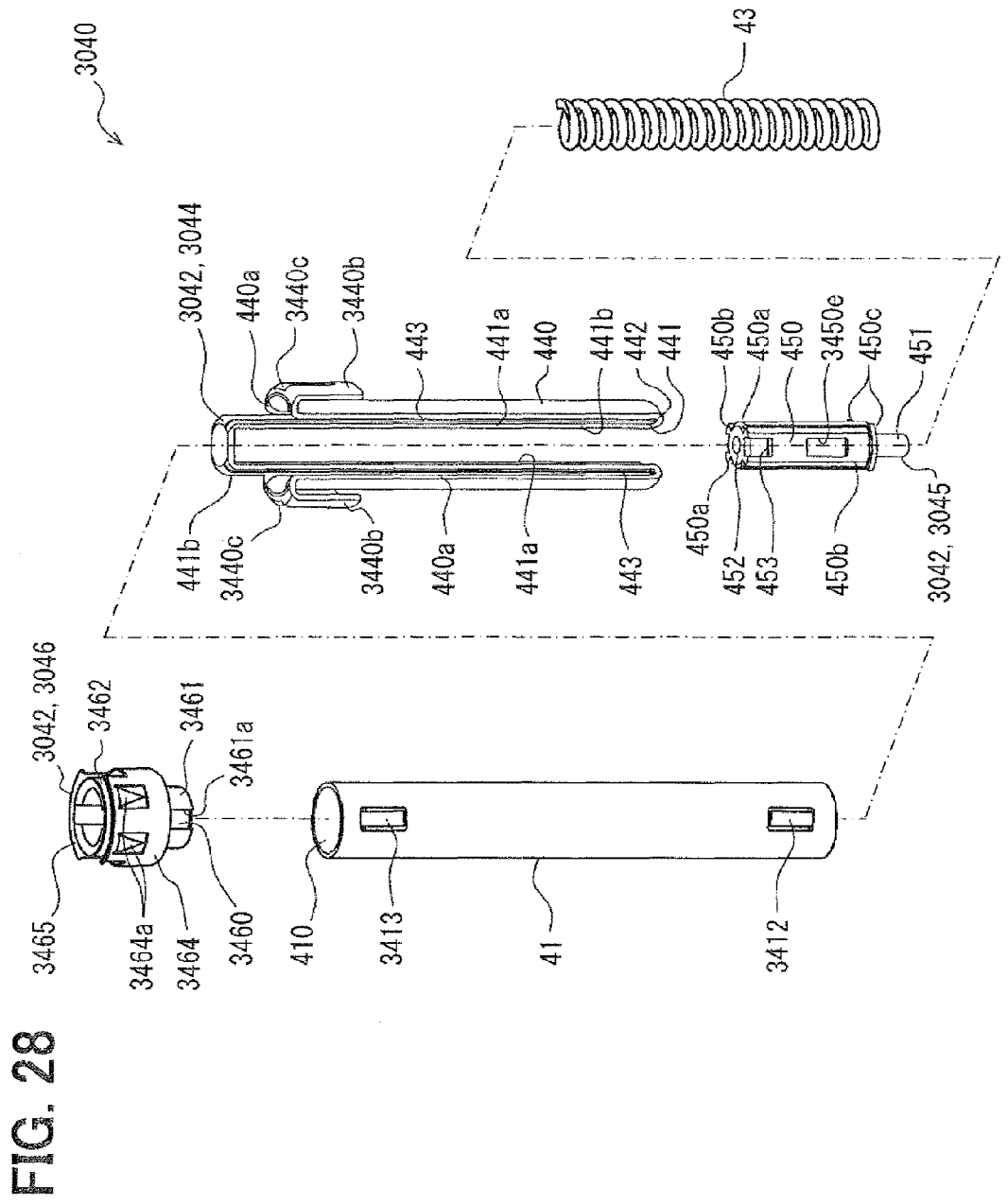
FIG. 28 is an exploded perspective view showing an adjusting mechanism of the fuel supply apparatus of the sixth embodiment.

With reference to FIGS. 26 to 28, the sixth embodiment is a modification of the first embodiment. In the adjusting mechanism 3040 of the sixth embodiment, an intermediate member 3042 includes three brackets, i.e., a first bracket 3044, a second bracket 3045 and a third bracket 3046.

Figure 29:
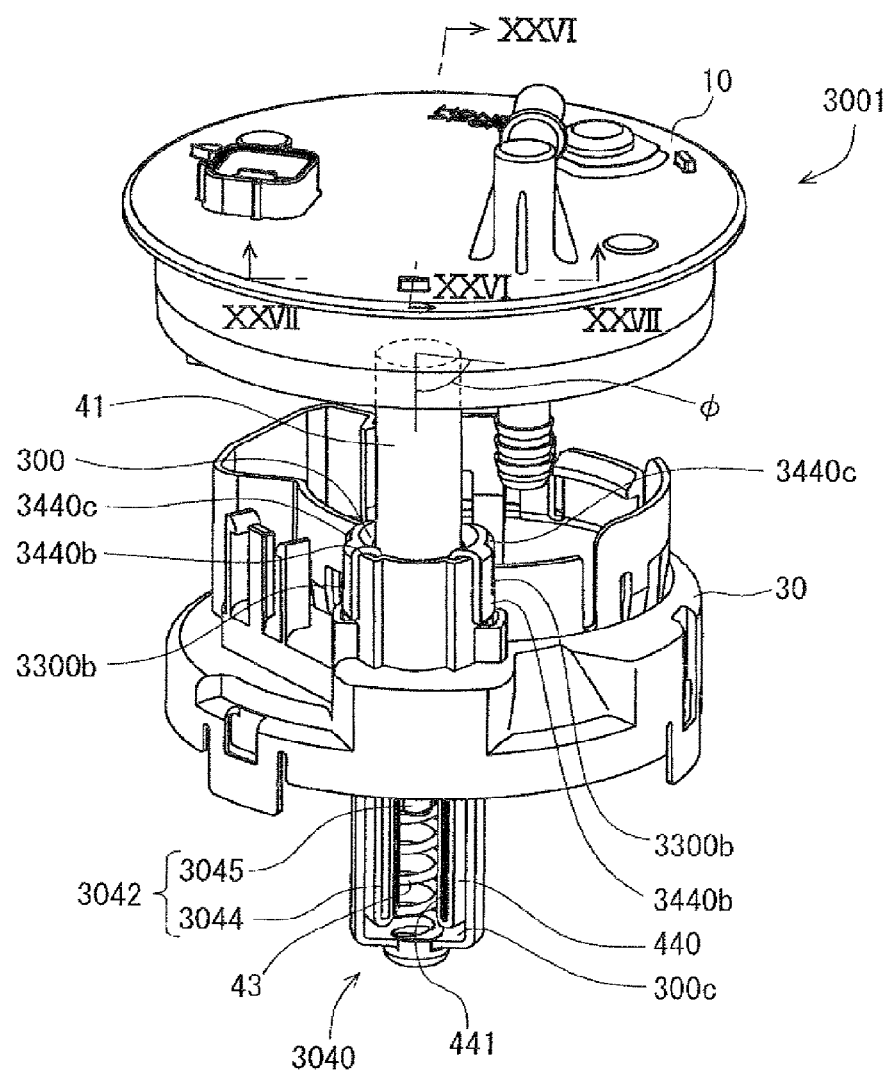
FIG. 29 is a perspective view showing a main feature of the fuel supply apparatus of the sixth embodiment.

The first bracket 3044, which connects between the support shaft 41 and the integrated components 20, 30, 50, 60, includes two coupling portions 3440b that are provided at two circumferential locations, respectively, each of which is circumferentially placed between the longitudinal grooves 440a of the outer tubular portion 440 of the first bracket 3044 shown in FIGS. 27-30. Two engaging claws 3300b are provided at two circumferential locations, respectively, of the corresponding portion of the cover member 30, which surrounds the opening 300 of the cover member 30. As shown in FIGS. 27 and 29, the engaging claws 3300b of the cover member 30 are press fitted into and are thereby engaged with the engaging holes 3440c, respectively, of the coupling portions 3440b of the first bracket 3044, so that the coupling portions 3440b are coupled to the cover member 30. Thus, the cover member 30 limits a relative positional change between the first bracket 3044 and the cover member 30 in both of the axial direction and the circumferential direction, i.e., limits both of the relative axial displacement between the first bracket 3044 and the cover member 30 and the relative circumferential rotation between the first bracket 3044 and the cover member 30. The structure of the first bracket 3044 of the sixth embodiment is similar to that of the first bracket 44 of the first embodiment except the above described points.

Figure 30:
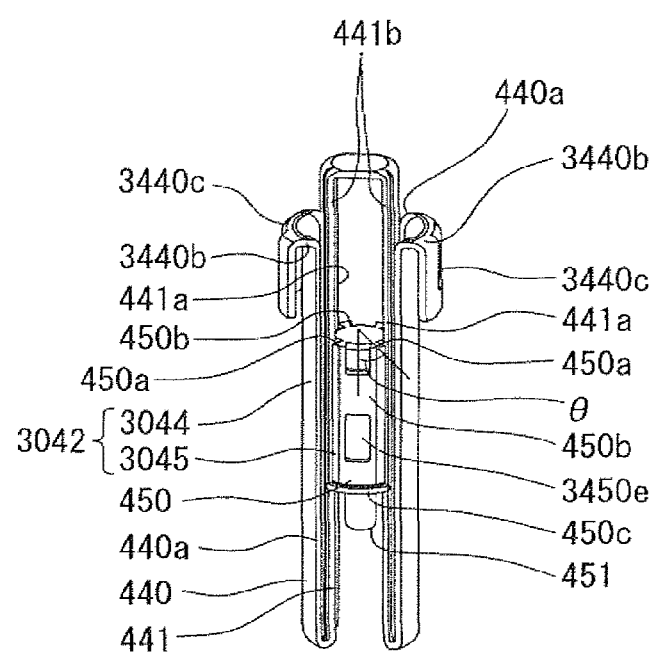
FIG. 30 is a perspective view showing the adjusting mechanism of the fuel supply apparatus of the sixth embodiment.

In the second bracket 3045, which connects between the support shaft 41 and the integrated components 20, 30, 50, 60 in corporation with the first bracket 3044, as shown in FIGS. 26, 28 and 30, the outer tubular portion 450, which is fitted into the support shaft 41, has the fitting portions 450b, which are placed one after another at the equal intervals in the circumferential direction, and each of the fitting portions 450b has a connecting hole 3450e. As shown in FIGS. 26 and 28, the support shaft 41 includes two connecting claws 3412, which are provided at two circumferential locations, respectively, of the support shaft 41 and project radially inward. The connecting claws 3412 of the support shaft 41 are snap fitted into the connecting holes 3450e, respectively, of the fitting portions 450b of the second bracket 3045, so that the fitting portions 450b are connected to the support shaft 41. Thus, the support shaft 41 is positioned relative to the second bracket 3045, and the relative circumferential rotation between the second bracket 3045 and the support shaft 41 and the relative axial displacement between the second bracket 3045 and the support shaft 41 are both limited. The structure of the second bracket 3045 of the sixth embodiment is similar to that of the second bracket 45 of the first embodiment except the above described points.

In contrast to the first and second brackets 3044, 3045, with reference to FIGS. 26 and 27, the third bracket 3046, which connects between the support shaft 41 and the flange 10, is configured into a quadruple cylindrical tubular body (i.e., a body having four cylindrical tubular portions, which are arranged one after another in a radial direction thereof), which is placed coaxially with the support shaft 41 and the flange 10. A radially innermost connecting tubular portion 3460 of the third bracket 3046 is fitted coaxially into an inner tubular portion 3101 of a connecting portion 3100 that is formed as a double cylindrical tubular body (i.e., a body having two cylindrical tubular portions, which are arranged one after another in a radial direction thereof) and projects downwardly from the flange 10.

Figure 31A:
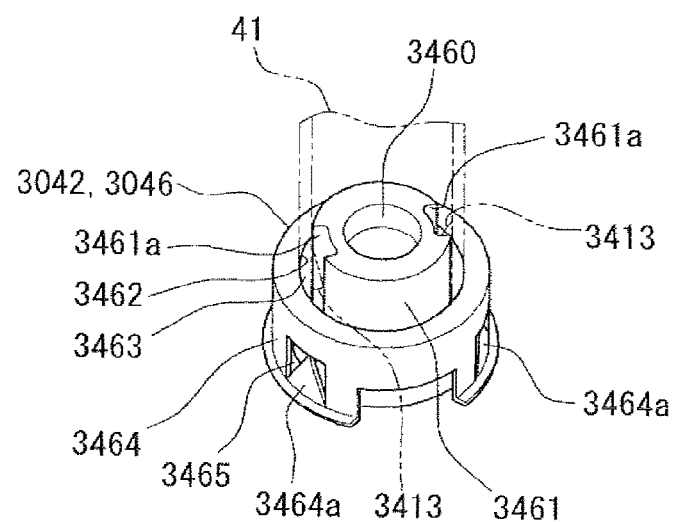
FIG. 31A is a perspective view showing a third bracket of the fuel supply apparatus of the sixth embodiment.
Figure 31B:
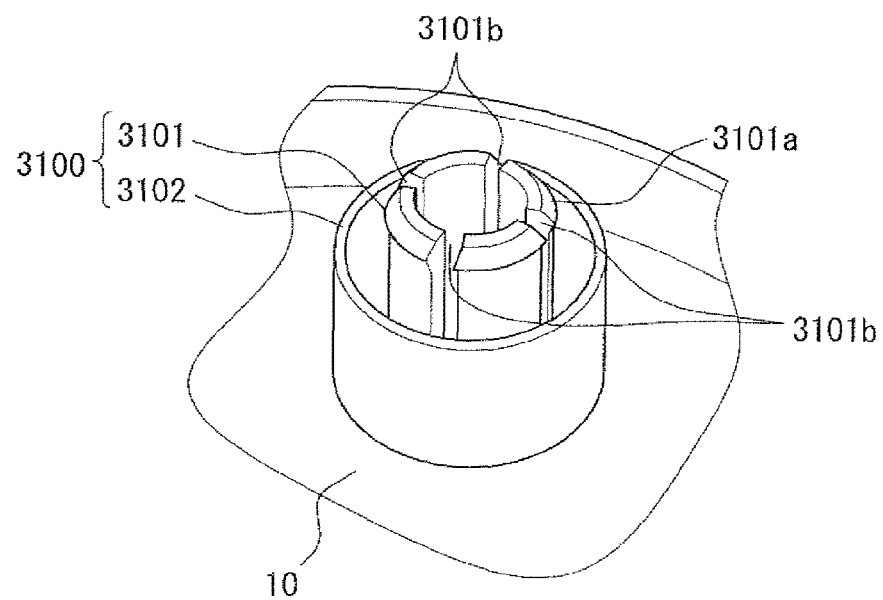
FIG. 31B is a perspective view showing a connecting portion of the fuel supply apparatus of the sixth embodiment.

As shown in FIGS. 26, 28 and 31A, a rotation-limiting inner tubular portion 3461 of the third bracket 3046, which is placed on a radially outer side of the connecting tubular portion 3460, has two connecting grooves 3461a, which are provided at two circumferential locations, respectively, and extend in the axial direction. A gap 3463 is formed in the third bracket 3046 at a radial location between the rotation-limiting inner tubular portion 3461 and a connecting outer tubular portion 3462, which is located on a radially outer side of the rotation-limiting tubular portion 3461, and the upper end portion of the support shaft 41 is received in the gap 3463. The connecting claws 3413, which radially inwardly project, are formed at two circumferential locations, respectively, in the upper end portion of the support shaft 41. These connecting claws 3413 are engaged with the inner tubular portion 3101 of the flange 10 through the connecting grooves 3461a, respectively. Furthermore, as shown in FIGS. 26, 27 and 31B, a plurality of slits 3101b, which are arranged one after another at generally equal intervals in the circumferential direction, is formed in the inner tubular portion 3101 to divided the inner tubular portion 3101 into a plurality of sections, each of which is provided with a hook portion 3101a at a distal end portion thereof. The connecting claws 3413 are snap fitted to corresponding two, respectively, of the hook portions 3101a to implement engagement therebetween (as best seen in FIG. 26). Thus, the support shaft 41 is positioned relative to the third bracket 3046, and the relative circumferential rotation between the third bracket 3046 and the support shaft 41 and the relative axial displacement between the third bracket 3046 and the support shaft 41 are both limited.

An outer tubular portion 3102 of the connecting portion 3100 configured into the double tubular body in the flange 10 is fitted coaxially into a gap 3465 between the connecting outer tubular portion 3462 and a rotation-limiting outer tubular portion 3464, which is located on a radially outer side of the connecting outer tubular portion 3462 in the third bracket 3046. Furthermore, as shown in FIGS. 27, 28 and 31A, four connecting claws 3464a are formed at four circumferential locations, respectively, of the rotation-limiting outer tubular portion 3464 to radially inwardly project. These connecting against claws 3464a are urged against and contact the outer tubular portion 3102 of the flange 10. Through this urged contact between the connecting claws 3464a and the outer tubular portion 3102 of the flange 10 and the engagement of the connecting claws 3413 to the hook portions 3101a through the connecting grooves 3461a, the flange 10 is positioned relative to the third bracket 3046, so that the relative circumferential rotation between the third bracket 3046 and the flange 10 and the relative axial displacement between the third bracket 3046 and the flange 10 are limited.

With the above described construction, it is possible to make a change in the fitting position between the longitudinal grooves 441a of the first bracket 3044, which is engaged with the cover member 30, and the fitting portions 450b of the second bracket 3045, which is positioned relative to the support shaft 41, and thereby it is possible to make relative displacement between the first bracket 3044 and the support shaft 41 in the axial direction. Here, the support shaft 41 and the flange 10 are positioned relative to the third bracket 3046 in the axial direction. Thereby, the relative positional change of the integrated components 20, 30, 50, 60 relative to the support shaft 41 and the flange 10 in the axial direction is reliably enabled.

In contrast, the circumferential contact between each of the longitudinal grooves 441a of the first bracket 3044, which is engaged with the cover member 30, and the corresponding one of the fitting portions 450b of the second bracket 3045, which is positioned relative to the support shaft 41, limits the relative rotation between the first bracket 3044 and the support shaft 41. Here, the support shaft 41 and the flange 10 are positioned relative to the third bracket 3046 in the circumferential direction. Thereby, the relative positional change of the integrated components 20, 30, 50, 60 relative to the support shaft 41 and the flange 10 in the circumferential direction is reliably limited.

The manufacturing of the fuel supply apparatus 3001 is performed as follows. First of all, as shown in FIG. 32A, the flange 10 and the support shaft 41 are positioned relative to and are connected to the third bracket 3046 (connecting step). At this time, the third bracket 3046, which is connected to the support shaft 41, is rotated relative to the flange 10, so that a coupling angle φ (see FIG. 29) between the flange 10 and the support shaft 41 through the third bracket 3046 is freely adjusted in the circumferential direction, and then the flange 10 and the support shaft 41 are connected together at this adjusted angle φ through the third bracket 3046.

Next, as shown in FIG. 32B, the fitting portions 450b of the second bracket 3045 are axially slidably fitted into the longitudinal grooves 441a, respectively, of the first bracket 3044. Then, as shown in FIG. 32C, the inner tubular portion 441 of the first bracket 3044 and the outer tubular portion 450 of the second bracket 3045 are inserted into the support shaft 41, so that the outer tubular portion 450 of the second bracket 3045 is connected to the support shaft 41 (connecting step). At this time, the support shaft 41 is rotated to adjust the connecting angle θ (see FIG. 30) of the second bracket 3045, which is connected to the first bracket 3044, relative to the support shaft 41 by 180 degree span, i.e., by 180 degree increment/decrement in the circumferential direction, and then the second bracket 3045 is connected to the support shaft 41 at this adjusted angle θ.

Then, as shown in FIG. 32O, the resilient member 43 is inserted into the gap 453, which is formed by the second bracket 3045 in the inside of the support shaft 41. Thereafter, as shown in FIG. 32E, the coupling portions 3440b, which are formed in the outer tubular portion 440 of the first bracket 3044, are coupled to the cover member 30 among the integrated components 20, 30, 50, 60, so that the assembling of the adjusting mechanism 3040 is completed as shown in FIG. 32F (coupling step).

Then, the integrated components 20, 30, 50, 60 and the adjusting mechanism 3040 are inserted into the fuel tank 2, and the flange 10, which is connected to the support shaft 41, is installed to the fuel tank 2, so that the manufacturing of the fuel supply apparatus 3001 is completed (installing step). At this time, a relative position of the integrated components 20, 30, 50, 60, which is urged by the resilient member 43, relative to the flange 10 in the axial direction changes until the subtank 20 contacts the bottom portion 2c of the fuel tank 2. Therefore, the installation position of the integrated components 20, 30, 50, 60 in the inside of the fuel tank 2 can be determined regardless of the installation position of the flange 10 by the adjustment of the coupling angle cp and the connecting angle θ in the circumferential direction and by the positional change of the resilient member 43 in the axial direction toward the restoring force application side. Furthermore, in the case where the amount of fitting of the second bracket 3045 to the support shaft 41 is kept constant by the engagement between the connecting holes 3450e and the connecting claws 3412, the length of the resilient member 43 can be kept constant by changing only the length of the support shaft 41. In this way, the versatility of the fuel supply apparatus 3001 can be further improved.

Furthermore, in the fuel supply apparatus 3001, which is constructed in the above-described manner, the relative positional change of the integrated components 20, 30, 50 60 relative to the single support shaft 41 in the circumferential direction is limited by the intermediate member 3042. Therefore, the installation position of the integrated components 20, 30, 50, 60 in the inside of the fuel tank 2 is less likely deviated in the circumferential direction. Thereby, the relative positional change of the integrated components 20, 30, 50, 60 relative to the support shaft 41 in the circumferential direction can be reliably limited. Furthermore, in the fuel supply apparatus 3001, the outer tubular portion 450 of the second bracket 3045 of the intermediate member 3042 is fitted into the support shaft 41, so that it is possible to limit the tilting of the support shaft 41, which is guided by the outer tubular portion 450. In this way, the installation position of the integrated components 20, 30, 50, 60, which are connected to the support shaft 41, is stabilized, and thereby it is possible to ensure the required fuel delivery performance of the pump unit 50 and the required sensing performance of the remaining fuel quantity sensing device 60 in addition to the implementation of the versatility of the fuel supply apparatus 3001 discussed above.

Furthermore, even in the fuel supply apparatus 3001, the support shaft 41, which is made of the metal material, and the intermediate member 3042, which includes the second bracket 3045 made of the resin material, are provided. Therefore, in a manner similar to that of the first embodiment, it is possible to limit generation of noises.

Seventh Embodiment

Now, a characteristic structure of a fuel supply apparatus according to a seventh embodiment of the present invention will be described with reference to the accompanying drawings.

Figure 33:
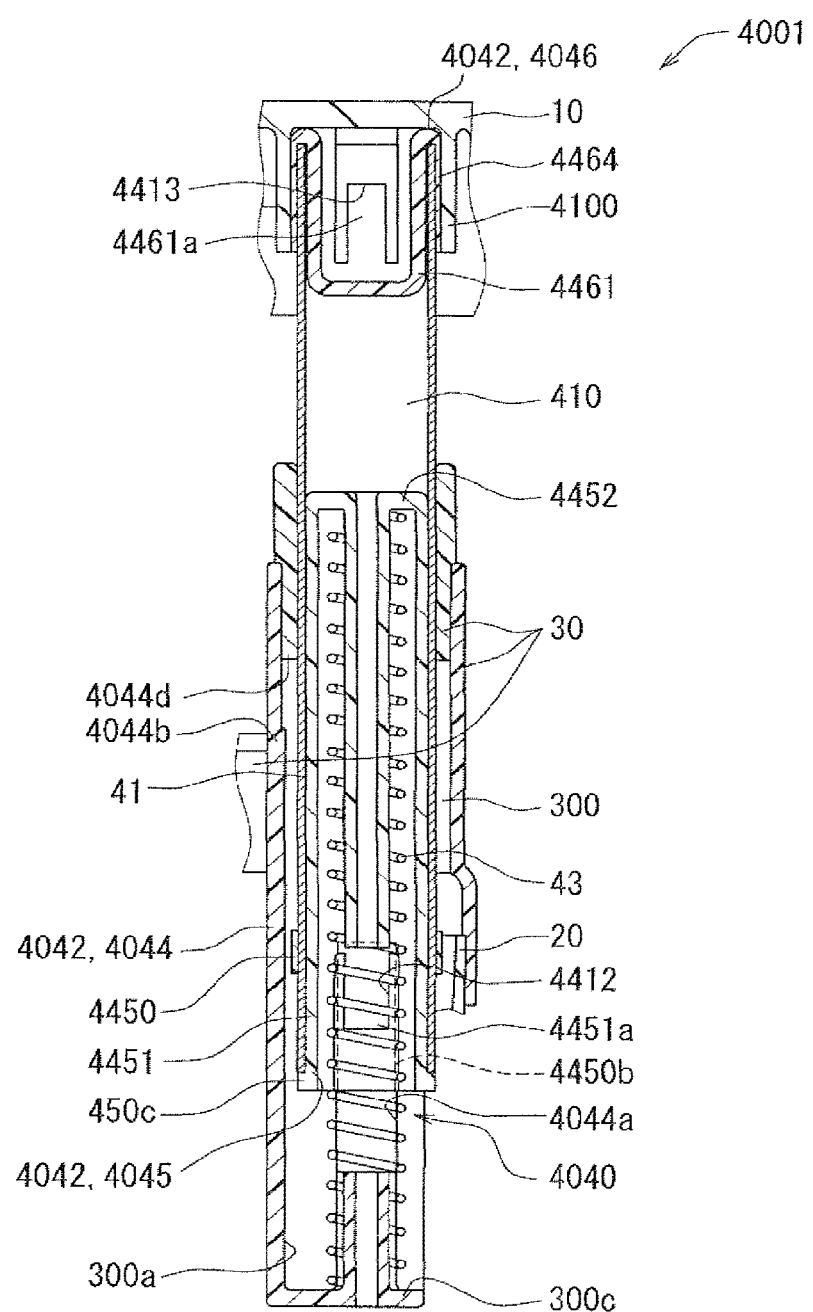
FIG. 33 is a cross-sectional view taken along line XXXIII-XXXIII in FIG. 35, showing a structure of a fuel supply apparatus according to seventh embodiment of the present invention.
Figure 34:
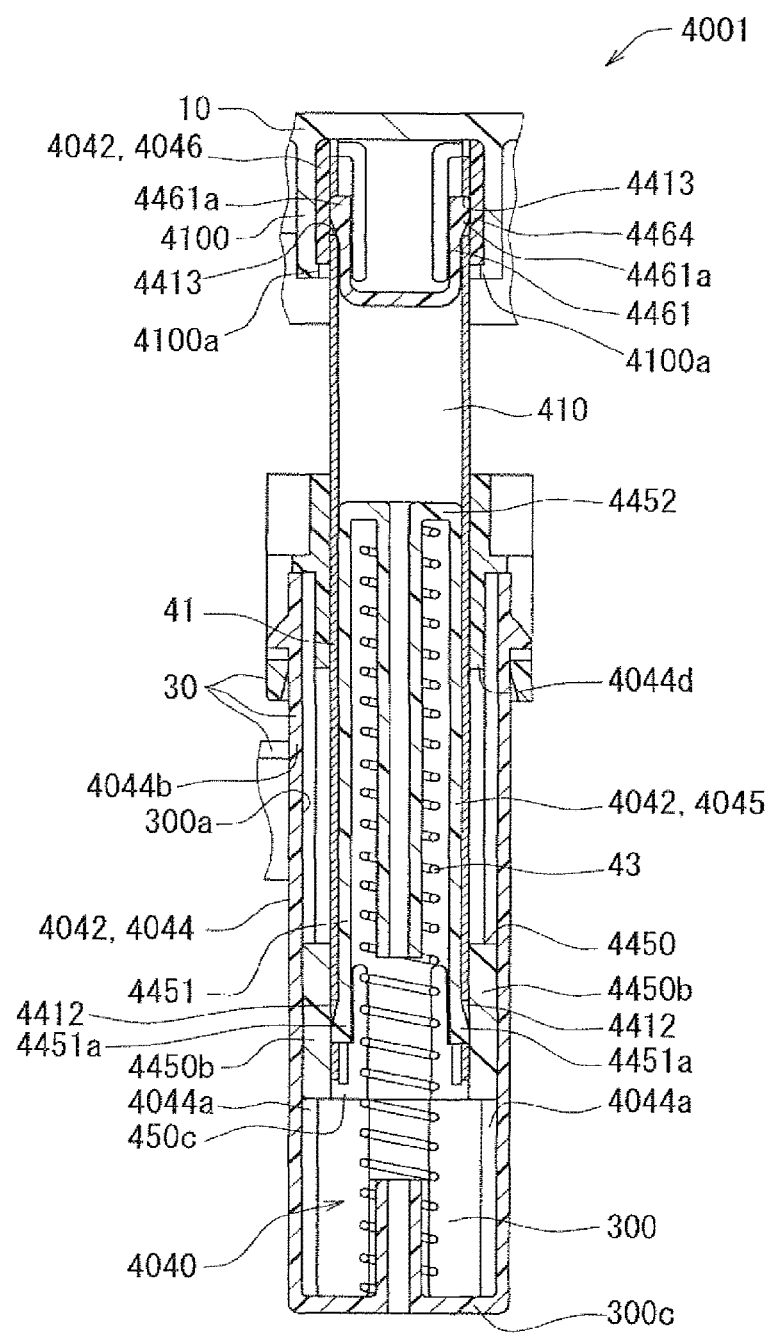
FIG. 34 is a cross-sectional view taken along line XXXIV-XXXIV in FIG. 35, showing the structure of the fuel supply apparatus of the seventh embodiment.
Figure 35:
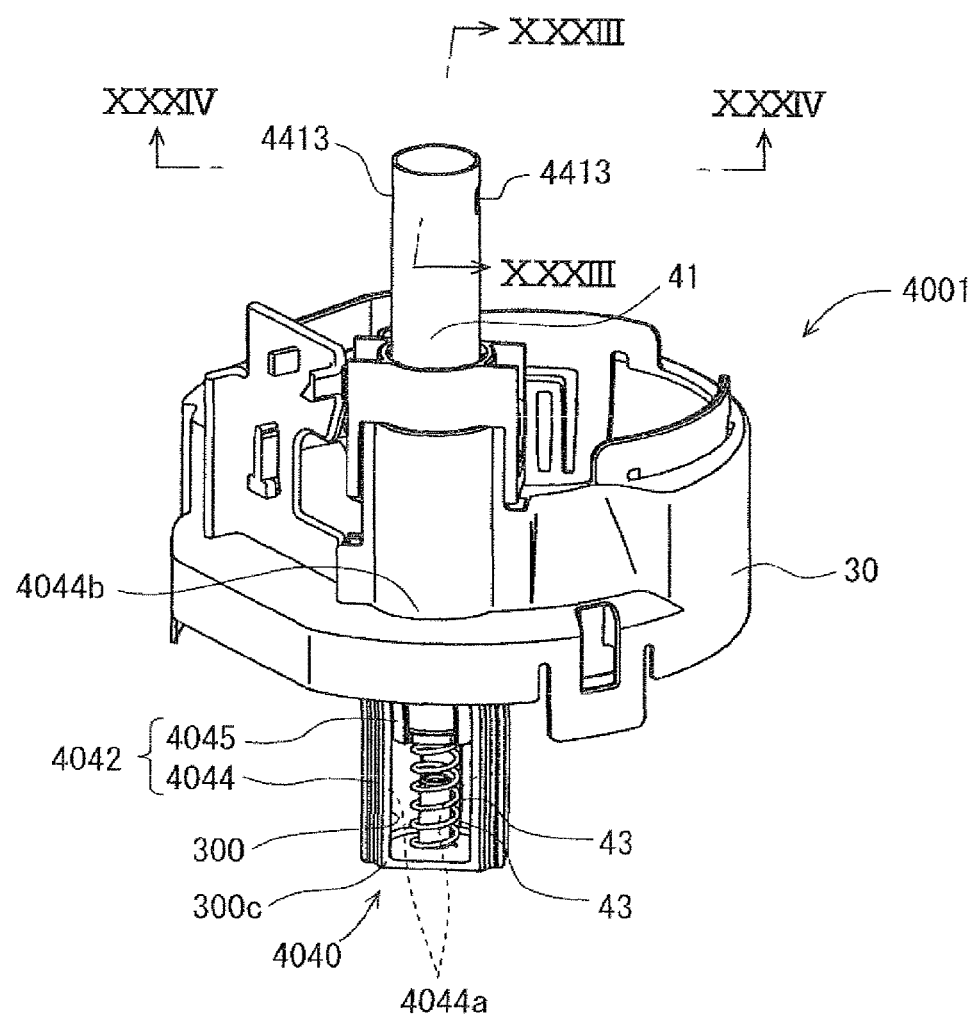
FIG. 35 is a perspective view showing a main feature of the fuel supply apparatus of the seventh embodiment.
Figure 36:
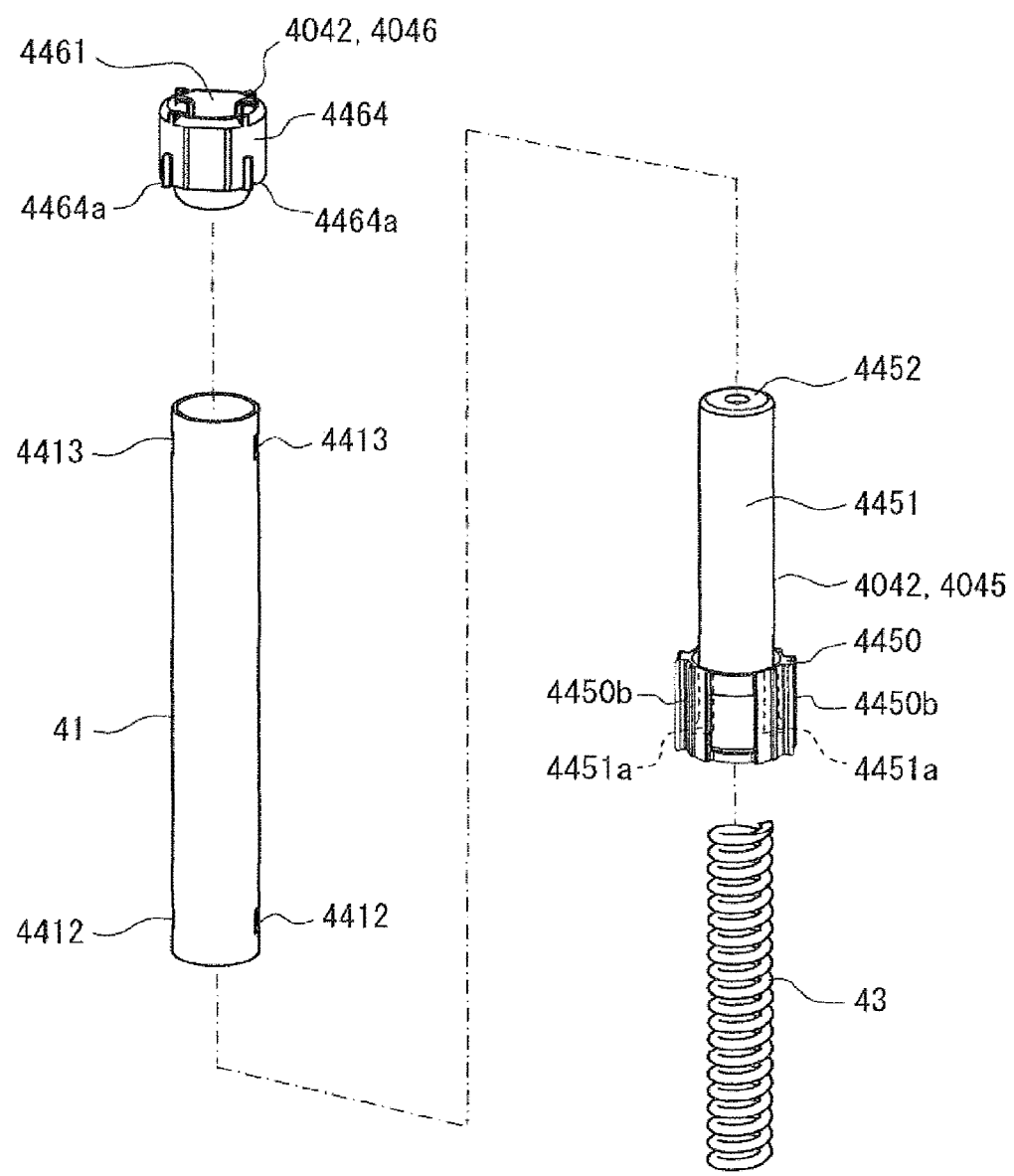
FIG. 36 is an exploded perspective view showing an adjusting mechanism of the fuel supply apparatus of the seventh embodiment.
Figure 37:
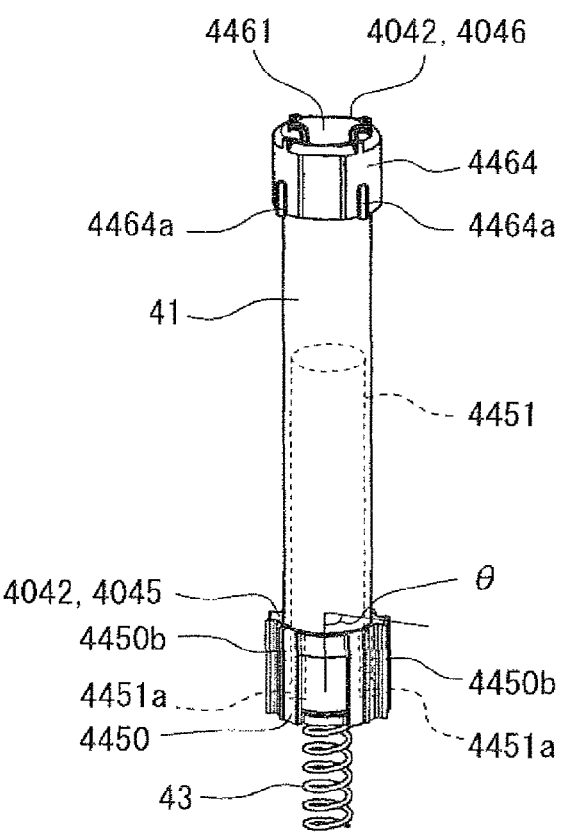
FIG. 37 is a perspective view showing the adjusting mechanism of the fuel supply apparatus of the seventh embodiment.

With reference to FIGS. 33 to 35, the seventh embodiment is a modification of the sixth embodiment. In an adjusting mechanism 4040 of the seventh embodiment, a first bracket 4044, which is made of a resin material and is a component of an intermediate member 4042, is configured as a cup-shaped body and is formed integrally with a corresponding portion of the cover member 30, which forms the opening 300. Thereby, the first bracket 4044 has a coupling portion 4044b, which is coupled to an upper portion of the cover member 30. Thus, the cover member 30, which is formed integrally with the first bracket 4044, limits a relative positional change between the first bracket 4044 and the cover member 30 in both of the axial direction and the circumferential direction, i.e., limits both of relative axial displacement between the first bracket 4044 and the cover member 30 and relative circumferential rotation between the first bracket 4044 and the cover member 30.

The first bracket 4044 receives the support shaft 41, which is placed coaxially with the support shaft 41, such that the support shaft 41 is rotatable relative to the first bracket 4044 in the circumferential direction. The first bracket 4044, which surrounds the support shaft 41, has two longitudinal grooves 4044a, which are formed at two circumferential locations, respectively, of the first bracket 4044 and extend in the axial direction.

In the adjusting mechanism 4040, a second bracket 4045, which is made of a resin material and cooperates with the first bracket 4044 to form the intermediate member 4042, is placed radially inward of the first bracket 4044 such that the second bracket 4045 is generally coaxial with the support shaft 41. As shown in FIGS. 33, 34, 36 and 37, two connecting claws 4451a are formed at two circumferential locations of the inner tubular portion 4451 of the second bracket 4045, which is fitted into the support shaft 41 from the lower side thereof. Two connecting holes 4412 are formed at two circumferential locations, respectively, of the support shaft 41. The connecting claws 4451a, which are placed one after another at generally equal intervals in the circumferential direction, are snap fitted into the connecting holes 4412, respectively, of the support shaft 41, so that the inner tubular portion 4451 and the support shaft 41 are connected with each other. Thus, the support shaft 41 is positioned relative to the second bracket 4045, and the relative circumferential rotation between the second bracket 4045 and the support shaft 41 and the relative axial displacement between the second bracket 4045 and the support shaft 41 are both limited.

Two fitting portions 4450b, which radially outwardly project, are formed at two circumferential locations, respectively, of an outer tubular portion 4450 of the second bracket 4045. As shown in FIGS. 33 and 34, each fitting portion 4450b is slidably fitted into a corresponding one of the longitudinal grooves 4044a of the first bracket 4044. With the axial slide fitting of the fitting portions 4450b into the longitudinal grooves 4044a, respectively, the second bracket 4045 is connected to the first bracket 4044 such that the first bracket 4044 and the second bracket 4045 are displaceable relative to each other in the axial direction, along which each longitudinal groove 4044a extends, but are not displaceable relative to each other in the circumferential direction, in which each of the fitting portions 4450b of the second bracket 4045 contacts the opposed circumferential side walls of the corresponding one of the longitudinal grooves 4044a. Furthermore, according to the present embodiment, when the outer tubular portion 4450 of the second bracket 4045 contacts a removal limiting portion 4044d, which is a part of the cover member 30 and is fixed to the first bracket 4044, removal of the second bracket 4045 from the first bracket 4044 is limited.

In the adjusting mechanism 4040, a third bracket 4046, which is made of a resin material and cooperates with the first and second brackets 4044, 4045 to form the intermediate member 4042, is configured into a double cylindrical tubular body, which is coaxial with the support shaft 41 and the flange 10, as shown in FIGS. 33 and 34. In the third bracket 4046, two connecting claws 4461a, which project radially outward, are formed at two circumferential locations, respectively, of an inner tubular portion 4461 of the third bracket 4046, which is fitted into the upper end portion of the support shaft 41. As shown in FIGS. 33 and 34, two connecting holes 4413 are formed at two circumferential locations, respectively, of the support shaft 41. The connecting claws 4461a of the inner tubular portion 4461, which are placed one after another at generally equal intervals in the circumferential direction, are snap fitted into and are engaged with the connecting holes 4413, respectively, of the support shaft 41, so that the inner tubular portion 4461 and the support shaft 41 are connected with each other. Thus, the support shaft 41 is positioned relative to the third bracket 4046, and the relative circumferential rotation between the third bracket 4046 and the support shaft 41 and the relative axial displacement between the third bracket 4046 and the support shaft 41 are both limited.

Figure 38:
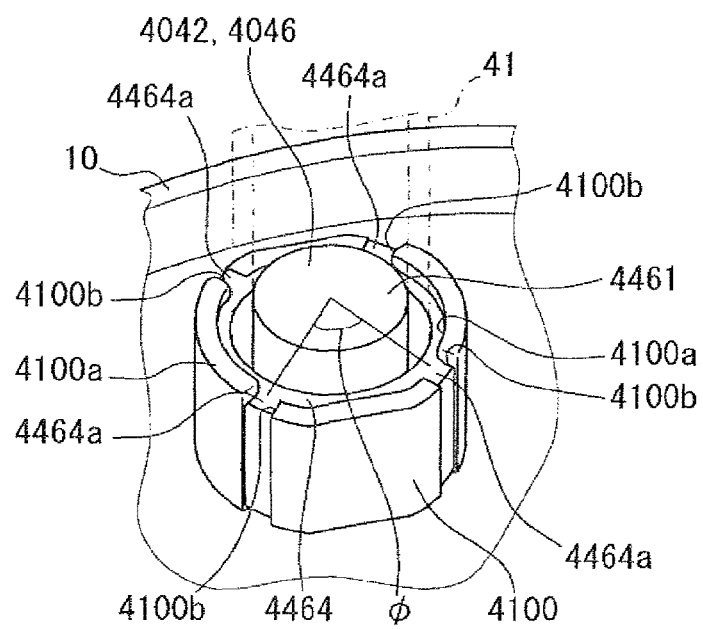
FIG. 38 is a perspective view showing a third bracket and a connecting portion of the fuel supply apparatus of the seventh embodiment.

As shown in FIGS. 33, 34 and 38, an outer tubular portion 4464 of the third bracket 4046 is located on a radially outer side of the inner tubular portion 4461 such that the support shaft 41 is held between the inner tubular portion 4461 and the outer tubular portion 4464. The outer tubular portion 4464 of the third bracket 4046 is connected coaxially to a cylindrical connecting portion 4100, which projects downward from the flange 10. Here, as shown in FIG. 38, four slits 4100b are formed in the connecting portion 4100 at four circumferential locations, respectively, to equally divide the connecting portion 4100 into four sections, each of which is provided with a hook portion 4100a (see also FIG. 34) at a distal end portion thereof to engage with the outer tubular portion 4464 of the third bracket 4046. The hook portions 4100a of the connecting portion 4100 are snap fitted to the outer tubular portion 4464 of the third bracket 4046 to implement the engagement therebetween. Furthermore, four connecting claws 4464a (see also FIGS. 36 and 37) radially outwardly project at four circumferential locations, respectively, of the outer tubular portion 4464 of the third bracket 4046. The connecting claws 4464a are fitted into the slits 4100b, respectively, of the connecting portion 4100. Thus, the flange 10 is positioned relative to the third bracket 4046, and the relative circumferential rotation between the third bracket 4046 and the flange 10 and the relative axial displacement between the third bracket 4046 and the flange 10 are both limited.

With the above described construction, it is possible to make a change in the fitting position between the longitudinal grooves 4044a of the first bracket 4044, which is formed integrally with the cover member 30, and the fitting portions 4450b of the second bracket 4045, which is positioned relative to the support shaft 41, and thereby it is possible to make relative displacement between the first bracket 4044 and the support shaft 41 in the axial direction. Here, the support shaft 41 and the flange 10 are positioned relative to the third bracket 4046 in the axial direction. Thereby, the relative positional change of the integrated components 20, 30, 50, 60 relative to the support shaft 41 and the flange 10 in the axial direction is reliably enabled.

In contrast, the circumferential contact between each of the longitudinal grooves 4044a of the first bracket 4044, which is formed integrally with the cover member 30, and the corresponding one of the fitting portions 4450b of the second bracket 4045, which is positioned relative to the support shaft 41, limits the relative rotation between the first bracket 4044 and the support shaft 41. Here, the support shaft 41 and the flange 10 are positioned relative to the third bracket 4046 in the circumferential direction. Thereby, the relative positional change of the integrated components 20, 30, 50, 60 relative to the support shaft 41 and the flange 10 in the circumferential direction is reliably limited.

Furthermore, in the seventh embodiment, as shown in FIGS. 33 to 37, the resilient member 43 is coaxially received at radially inward of the inner tubular portion 4451 of the second bracket 4045. An upper end portion of the resilient member 43 is engaged with a top wall portion 4452 of the inner tubular portion 4451 of the second bracket 4045 in the inside of the support shaft 41. A lower end portion of the resilient member 43 is engage with a bottom portion 300c of the cover member 30, which is formed by the first bracket 4044 at the outside of the support shaft 41. In this way, the resilient member 43, which is axially interposed between the second bracket 4045 and the cover member 30, exerts the restoring force such that the resilient member 43 not only urges the integrated components 20, 30, 50, 60 toward the bottom portion 2c of the fuel tank 2 (i.e., in the downward direction) but also urges the second bracket 45 in the inserting direction of the second bracket 4045 toward the inside of the support shaft 41 (i.e., in the upward direction).

The manufacturing of the fuel supply apparatus 4001 is performed as follows. First of all, as shown in FIG. 39A, the inner tubular portion 4451 of the second bracket 4045 is fitted into the support shaft 41, so that the inner tubular portion 4451 is connected to the support shaft 41 (connecting step). At this time, the support shaft 41 is rotated to adjust the connecting angle θ (see FIG. 37) of each connecting claw 4451a of the second bracket 4045 relative to the support shaft 41 by 180 degree span, i.e., by 180 degree increment/decrement in the circumferential direction, and then the second bracket 4045 is connected to the support shaft 41 at this adjusted angle θ.

Next, as shown in FIG. 39B, the flange 10 and the support shaft 41 are positioned relative to and are connected to the third bracket 4046 (connecting step). At this time, the third bracket 4046, which is connected to the support shaft 41, is rotated relative to the flange 10, so that a coupling angle φ (see FIG. 38) between the flange 10 and the support shaft 41 through the third bracket 4046 is adjusted by 90 degree span, i.e., by 90 degree increment/decrement in the circumferential direction, and then the flange 10 and the support shaft 41 are connected together at this adjusted angle through the third bracket 4046.

Next, as shown in FIG. 39C, the resilient member 43 is inserted into the inner tubular portion 4451 of the second bracket 4045. Next, as shown in FIG. 39D, the fitting portions 4450b of the second bracket 4045 are axially slidably fitted into the longitudinal grooves 4044a, respectively, of the first bracket 4044. The first bracket 4044 of the present embodiment is coupled to the cover member 30 at an integrally molding step (coupling step), which is executed prior to the step of FIG. 39A to integrally mold the first bracket 4044 with the cover member 30, so that the manufacturing of the adjusting mechanism 3040 is completed upon the slide fitting of the fitting portions 4450b of the second bracket 4050 into the longitudinal grooves 4044a, respectively, of the first bracket 4044, as shown in FIG. 39E.

Then, the integrated components 20, 30, 50, 60 and the adjusting mechanism 4040 are inserted into the fuel tank 2, and the flange 10, which is connected to the support shaft 41, is installed to the fuel tank 2, so that the manufacturing of the fuel supply apparatus 4001 is completed (installing step). At this time, a relative position of the integrated components 20, 30, 50, 60, which is urged by the resilient member 43, relative to the flange 10 in the axial direction, changes until the subtank 20 contacts the bottom portion 2c of the fuel tank 2. Therefore, the installation position of the integrated components 20, 30, 50, 60 in the inside of the fuel tank 2 can be determined regardless of the installation position of the flange 10 by the adjustment of the coupling angle φ and the connecting angle θ in the circumferential direction and by the positional change of the resilient member 43 in the axial direction toward the restoring force application side. Furthermore, in the case where the amount of fitting of the second bracket 4045 to the support shaft 41 is kept constant by the engagement between the connecting claws 4451a and the connecting holes 4412, the length of the resilient member 43 can be kept constant by changing only the length of the support shaft 41. In this way, the versatility of the fuel supply apparatus 4001 can be further improved.

Furthermore, in the fuel supply apparatus 4001, which is constructed in the above-described manner, the relative positional change of the integrated components 20, 30, 50 60 relative to the single support shaft 41 in the circumferential direction is limited by the intermediate member 4042. Therefore, the installation position of the integrated components 20, 30, 50, 60 in the inside of the fuel tank 2 is less likely deviated in the circumferential direction after the installation thereof. Thereby, the relative positional change of the integrated components 20, 30, 50, 60 relative to the support shaft 41 in the circumferential direction can be reliably limited. Furthermore, in the fuel supply apparatus 4001, the inner tubular portion 4451 of the second bracket 4045 of the intermediate member 4042 is fitted into the support shaft 41, so that it is possible to limit the tilting of the support shaft 41, which is guided by the outer inner tubular portion 4451. In this way, the installation position of the integrated components 20, 30, 50, 60, which are connected to the support shaft 41, is stabilized, and thereby it is possible to ensure the required fuel delivery performance of the pump unit 50 and the required sensing performance of the remaining fuel quantity sensing device 60 in addition to the implementation of the versatility of the fuel supply apparatus 4001 discussed above.

Furthermore, even in the fuel supply apparatus 4001, the support shaft 41, which is made of the metal material, and the intermediate member 4042, which includes the second bracket 4045 made of the resin material, are provided. Therefore, in a manner similar to that of the first embodiment, it is possible to limit generation of noises.

Eighth Embodiment

Now, a characteristic structure of a fuel supply apparatus according to an eighth embodiment of the present invention will be described with reference to the accompanying drawings.

Figure 40:
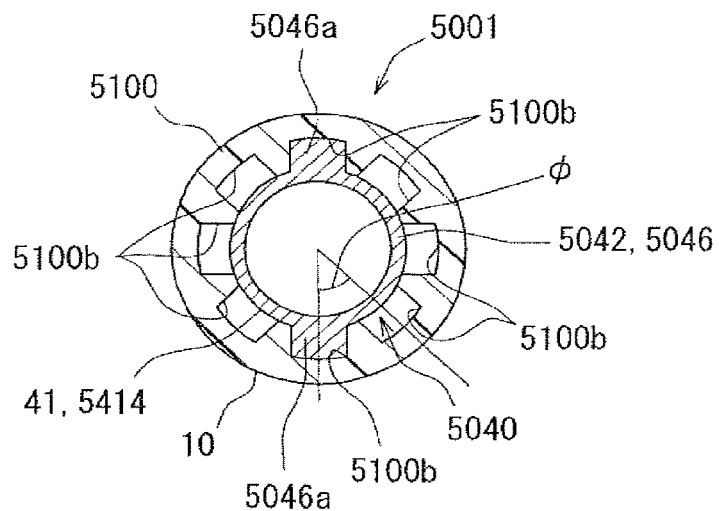
FIG. 40 is a cross-sectional view showing an adjusting mechanism of a fuel supply apparatus according to an eighth embodiment of the present invention.
Figure 41:
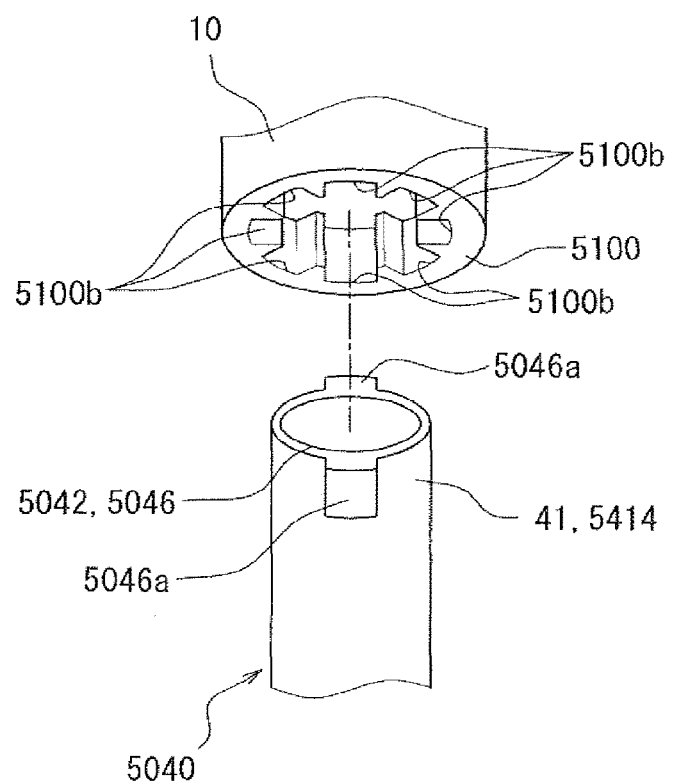
FIG. 41 is an exploded perspective view showing the adjusting mechanism of the fuel supply apparatus of the eighth embodiment.

With reference to FIGS. 40 and 41, the eighth embodiment is a modification of the seventh embodiment. In the adjusting mechanism 5040 of the eighth embodiment, a third bracket 5046, which is made of a metal material and is a component of an intermediate member 5042, is formed integrally with a cylindrical upper end portion 5414 of the support shaft 41. Thereby, the third bracket 5046 is connected to the support shaft 41 in a positioned state, in which the third bracket 5046 is positioned relative to the support shaft 41.

The third bracket 5046 is connected coaxially to a cylindrical connecting portion 5100, which projects downward from the flange 10. In the third bracket 5046, two connecting claws 5046a, which project radially outward, are formed at two circumferential locations, respectively. Eight connecting grooves 5100b, which extend in the axial direction, are formed at eight circumferential locations, respectively, of the connecting portion 5100, which are placed one after another at generally equal intervals in the circumferential direction. Each of the connecting claws 5046a is connected to a corresponding one of the connecting grooves 5100b in a press fitted state, in which the connecting claw 5046a is press fitted into the corresponding connecting groove 5100b. Thus, the flange 10 is positioned relative to the third bracket 5046, and the relative circumferential rotation between the third bracket 5046 and the flange 10 and the relative axial displacement between the third bracket 5046 and the flange 10 are both limited.

Figure 42:
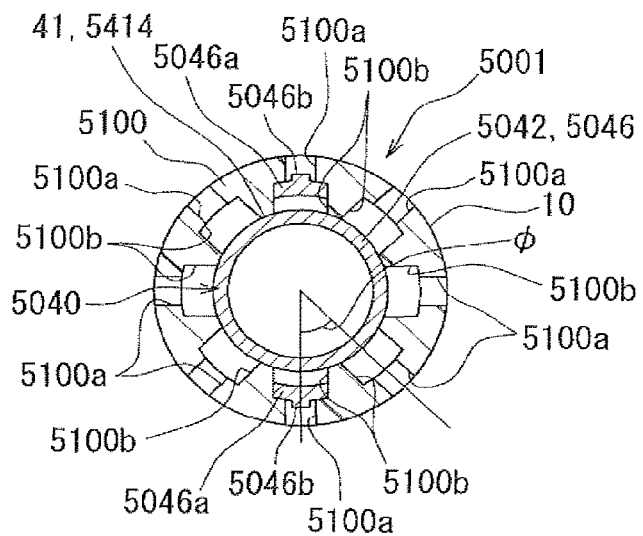
FIG. 42 is a cross-sectional view showing a modification the adjusting mechanism of the fuel supply apparatus of the eighth embodiment.
Figure 43:
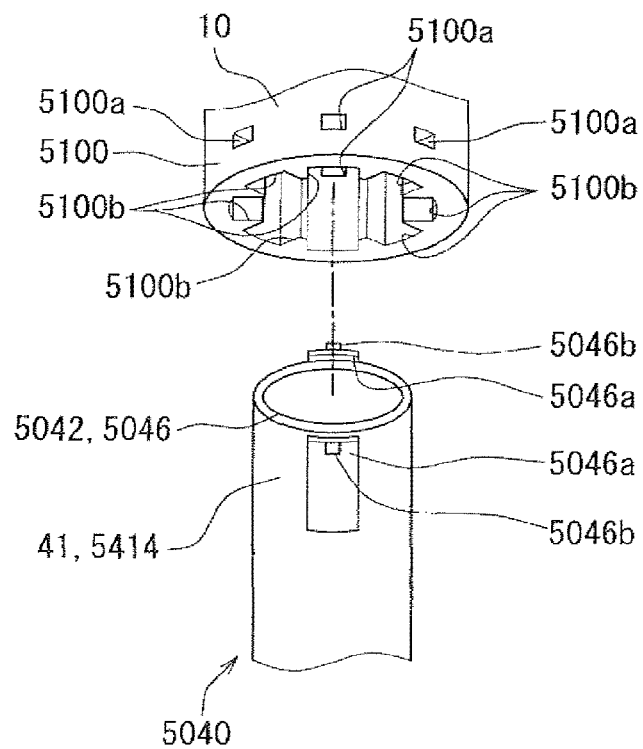
FIG. 43 is an exploded perspective view showing the modification of the adjusting mechanism of the fuel supply apparatus of the eighth embodiment.

The eighth embodiment may be modified in a manner shown in FIGS. 42 and 43. Specifically, in the modification shown in FIGS. 42 and 43, each of the connecting claws 5046a has a hook portion 5046b at a distal end portion of the connecting claw 5046a. Also, each of the connecting grooves 5100b has a connecting hole 5100a, which radially inwardly extends from an outer peripheral surface of the connecting portion 5100 and opens at a radially outer groove bottom of the connecting groove 5100b. Each connecting claw 5046a is fitted into the corresponding one of the connecting grooves 5100b such that the hook portion 5046b of the connecting claw 5046a is snap fitted into the connecting hole 5100a of the corresponding connecting groove 5100b. In this way, the axial displacement between the third bracket 5046 and the flange 10 can be reliably limited.

The fuel supply apparatus 500 of the eighth embodiment or of the modification thereof is manufactured in a manner similar to that of the seventh embodiment except that the support shaft 41, which is pre-connected (pre-joined, i.e., formed together) to the third bracket 5046, is connected to the flange 10, and the coupling angle φ (see FIGS. 40 and 42) between the flange 10 and the support shaft 41 is adjusted by 45 degree span, i.e., by 45 degree increment/decrement in the circumferential direction. Therefore, even in the eighth embodiment and the modification thereof, advantages, which are similar to those of the seventh embodiment, can be achieved.

Ninth Embodiment

Now, a characteristic structure of a fuel supply apparatus according to a ninth embodiment of the present invention will be described with reference to the accompanying drawings.

Figure 44:
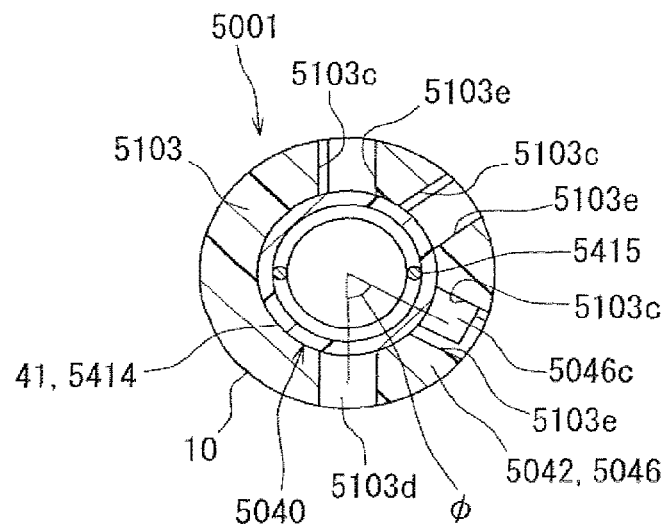
FIG. 44 is a cross-sectional view showing an adjusting mechanism of a fuel supply apparatus according to a ninth embodiment of the present invention.
Figure 45:
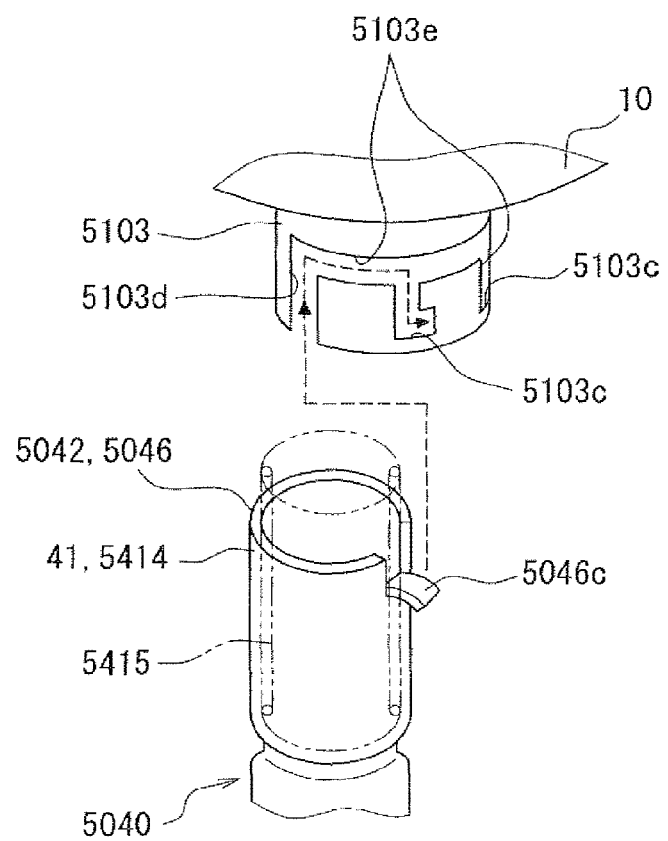
FIG. 45 is an exploded perspective view showing the adjusting mechanism of the fuel supply apparatus of the ninth embodiment.

With reference to FIGS. 44 and 45, the ninth embodiment is a modification of the eighth embodiment. In a third bracket 5046 of the ninth embodiment, one circumferential part of the cylindrical upper end portion 5414 of the support shaft 41 is radially outwardly bent to form a connecting claw 5046c. Three lateral grooves 5103c are arranged one after another at generally equal intervals in the circumferential direction in one half circumferential section (180 degree circumferential range) of a cylindrical connecting portion 5103, which downwardly projects from the flange 10. The connecting claw 5046c is inserted into a corresponding one of the lateral grooves 5103c.

Each lateral groove 5103c arcuately extends in the circumferential direction and is connected to a guide groove 5103d, which opens to a lower end of the connecting portion 5103, through a corresponding one of connecting grooves 5103e. Furthermore, in the present embodiment, the upper end portion 5414 of the support shaft 41 holds a coil spring 5415, which is made of a metal material, such that the coil spring 5415 is held between the upper end portion 5414 and the connecting portion 5103. Thereby, the connecting claw 5046c is inserted from the guide groove 5103d into a corresponding one of the lateral grooves 5103c, which corresponds to the coupling angle $\phi$ (see FIG. 44), through the corresponding connecting groove 5103e and is urged against the corresponding lateral groove 5103c by the restoring force of the coil spring 5415. Therefore, the flange 10 is connected to the third bracket 5046 in the positioned state (locked state), in which the relative axial displacement between the flange 10 and the third bracket 5046 and the relative circumferential rotation between the flange 10 and the third bracket 5046 are limited.

In the ninth embodiment, the fuel supply apparatus 5001 is manufactured in a manner similar to that of the seventh embodiment except that the support shaft 41, which is pre-connected (pre-joined, i.e., formed together) to the third bracket 5046, is connected to the flange 10, and the coupling angle $\phi$ between the flange 10 and the support shaft 41 is adjusted by 60 degree span, i.e., by 60 degree increment/decrement in the circumferential direction. Therefore, even in the ninth embodiment, advantages, which are similar to those of the seventh embodiment, can be achieved.

Tenth Embodiment

Now, a characteristic structure of a fuel supply apparatus according to a tenth embodiment of the present invention will be described with reference to the accompanying drawings.

Figure 46:
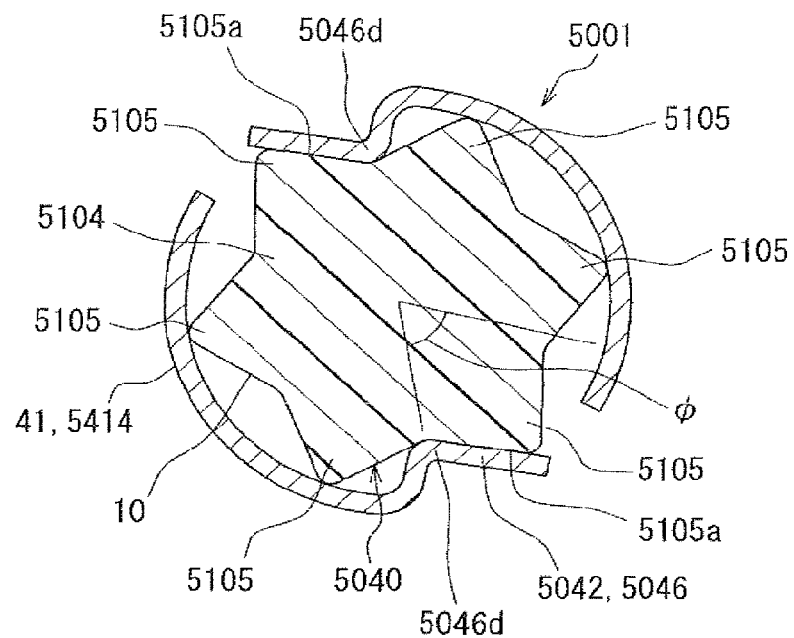
FIG. 46 is a cross-sectional view showing an adjusting mechanism of a fuel supply apparatus according to a tenth embodiment of the present invention.
Figure 47:
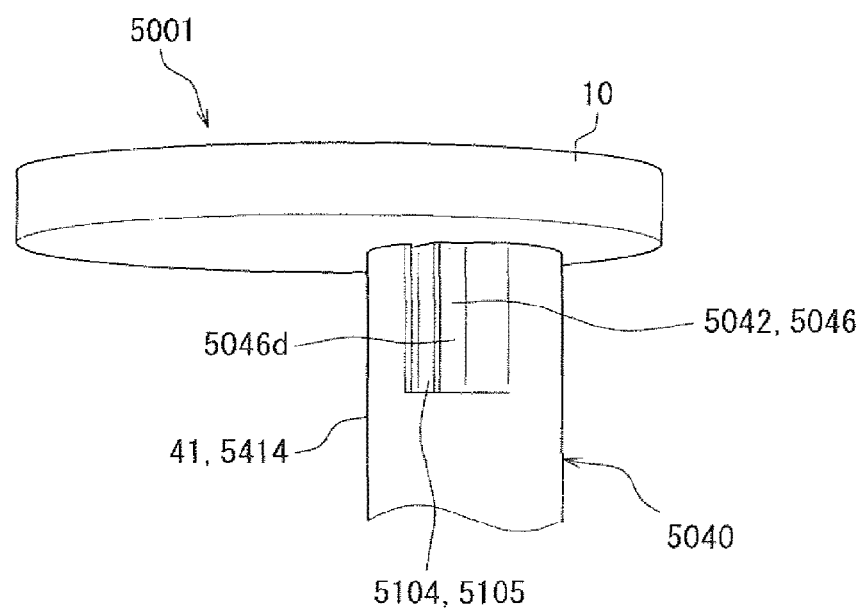
FIG. 47 is a perspective view showing the adjusting mechanism of the fuel supply apparatus of the tenth embodiment.

With reference to FIGS. 46 and 47, the tenth embodiment is a modification of the eighth embodiment. In a third bracket 5046 of the tenth embodiment, two circumferential parts of the cylindrical upper end portion 5414 of the support shaft 41 are radially inwardly recessed to form two connecting projections 5046d. The cylindrical connecting portion 5104, which projects downward from the flange 10, includes six connecting claws 5105, which are arranged one after another at generally equal intervals in the circumferential direction. Each of the connecting projections 5046d is engaged with a corresponding one of the connecting claws 5105.

In the present embodiment, each connecting claw 5105 radially outwardly projects in a mountain form (i.e., a form of a radially outwardly projecting ridge) to have two side surfaces 5105a in a cross section of the connecting portion 5104 seen in the axial direction. Each connecting projection 5046d, which is radially inwardly recessed in a mountain form in a cross section of the upper end portion 5414, is snap fitted to and is thereby urged against one of the side surfaces 5105a of the corresponding one of the connecting claws 5105. Therefore, the flange 10 is connected to the third bracket 5046 in the positioned state (locked state), in which the relative circumferential rotation between the flange 10 and the third bracket 5046 and the relative axial displacement between the flange 10 and the third bracket 5046 are limited.

In the tenth embodiment, the fuel supply apparatus 5001 is manufactured in a manner similar to that of the seventh embodiment except that the support shaft 41, which is pre-connected (pre-joined, i.e., formed together) to the third bracket 5046, is connected to the flange 10, and the coupling angle cp (see FIG. 46) between the flange 10 and the support shaft 41 is adjusted by 60 degree span, i.e., by 60 degree increment/decrement in the circumferential direction. Therefore, even in the tenth embodiment, advantages, which are similar to those of the seventh embodiment, can be achieved.

Eleventh Embodiment

Now, a characteristic structure of a fuel supply apparatus according to an eleventh embodiment of the present invention will be described with reference to the accompanying drawings.

With reference to FIGS. 48A to 49B, the eleventh embodiment is a modification of the second embodiment. Although not depicted in the drawings, in a fuel supply apparatus 6001 of the eleventh embodiment, the return conduit 1013 and the return passage 1047 are not provided like in the first embodiment, and the pressure regulator 54 is provided to the pump unit 1050 like in the first embodiment.

Figure 48A:
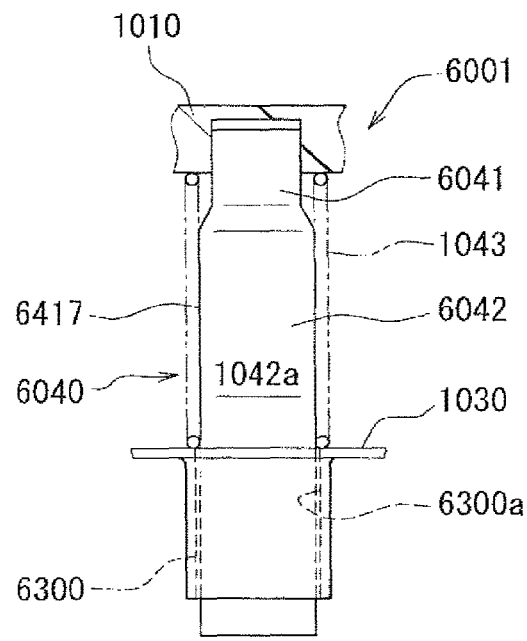
FIG. 48A is a front view showing an adjusting mechanism of a fuel supply apparatus according to an eleventh embodiment of the present invention.
Figure 48B:
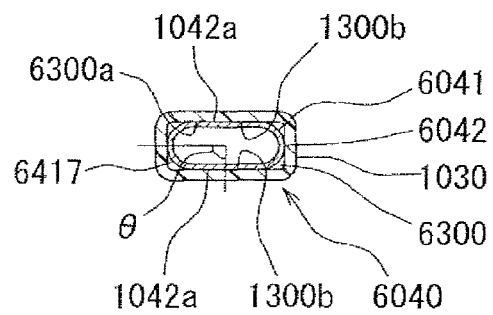
FIG. 48B is a lateral cross-sectional view of the adjusting mechanism of the fuel supply apparatus of the eleventh embodiment.
Figure 49A:
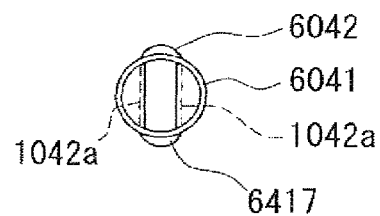
FIG. 49A is a top view showing an intermediate member of the fuel supply apparatus of the eleventh embodiment.
Figure 49B:
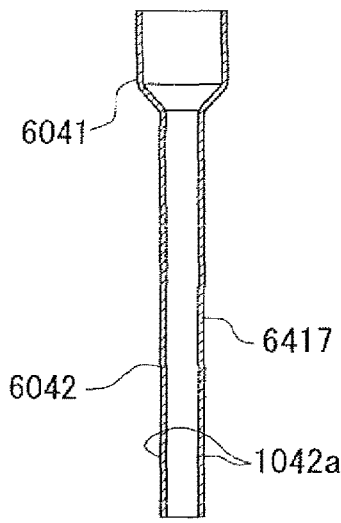
FIG. 49B is a longitudinal cross-sectional view of the intermediate member of the fuel supply apparatus of the eleventh embodiment.

In an adjusting mechanism 6040 of the eleventh embodiment, an intermediate member 6042 is integrated with a support shaft 6041, which is made of a metal material and is configured into a cylindrical tubular form, such that the support shaft 6041 is flattened in the radial direction to form a flat portion 6417 except an upper end portion of the support shaft 6041, which is securely press fitted into the flange 1010. The intermediate member 6042 forms two coupling portions 1042a, which are planar and are parallel to each other to form a double sided portion (i.e., a portion having two planar sides, which are diametrically opposed to each other) in the flat portion 6417. In response to this configuration of the intermediate member 6042, as shown in FIGS. 48A and 48B, the pump bracket 1030 has an opening 6300, which is formed as an elongated hole and in which the support shaft 6041 is coaxially fitted. An inner peripheral surface 6300a of the opening 6300 has two planar portions 1300b, which are generally parallel to each other. Each of the coupling portions 1042a is engaged to a corresponding one of the planar portions 1300b of the inner peripheral surface 6300a of the opening 6300 and makes surface-to-surface contact therebetween. Through the surface-to-surface contact between each coupling portion 1042a and the corresponding planar portion 1300b, the relative axial displacement between the pump bracket 1030 and the intermediate member 6042 is enabled, and the relative circumferential rotation between the pump bracket 1030 and the intermediate member 6042 is limited.

Therefore, it is possible to make the axial relative displacement between the pump bracket 1030, which forms the planar portions 1300b, and the support shaft 6041, which is integrated with the intermediate member 6042 having the coupling portions 1042a by axially changing the engaging position of the coupling portions 1042a to the planar portions 1300b. Thereby, the relative positional change of the integrated components 1030, 1050, 1060 relative to the support shaft 6041 in the axial direction is reliably enabled.

Furthermore, the relative rotation is limited between the support shaft 6041, which is integrated with the intermediate member 6042 having the coupling portions 1042*a*, and the pump bracket 1030, which forms the planar portions 1300*b*, by making the surface-to-surface contact between each of the coupling portions 1042*a* and the corresponding one of the planar portions 1300*b* in the circumferential direction. Thereby, the relative positional change of the integrated components 1030, 1050, 1060 relative to the support shaft 6041 in the circumferential direction is reliably limited.

The fuel supply apparatus 6001 of the eleventh embodiment described above is manufactured in a manner similar to that of the second embodiment except the following two points. The first difference of the manufacturing method of the eleventh embodiment relative to the manufacturing method of the second embodiment is as follows. Specifically, at the time of inserting the support shaft 6041, to which the intermediate member 6042 is integrally formed in advance, into the opening 6300 of the pump bracket 1030, each corresponding one of the planar portions 1300*b* to be coupled with the corresponding one of the coupling portions 1042*a* is selected (coupling step). In this way, the connecting angle θ (see FIG. 48B) between the intermediate member 6042 and the pump bracket 1030 is adjusted by 180 degree span, i.e., by 180 degree increment/decrement in the circumferential direction, and then the intermediate member 6042 is fitted into the pump bracket 1030. Furthermore, the second difference of the manufacturing method of the eleventh embodiment relative to the manufacturing method of the second embodiment is as follows. Specifically, the pump unit 1050, which includes the pressure regulator 54, is installed to the pump bracket 1030 together with the remaining fuel quantity sensing device 1060.

According to the eleventh embodiment, in which the fuel supply apparatus 6001 is manufactured in the above described manner, advantages similar to those of the second embodiment are achieved except the advantages associated with the pressure regulator 1054.

Twelfth Embodiment

Now, a characteristic structure of a fuel supply apparatus according to a twelfth embodiment of the present invention will be described with reference to the accompanying drawings.

Figure 50:
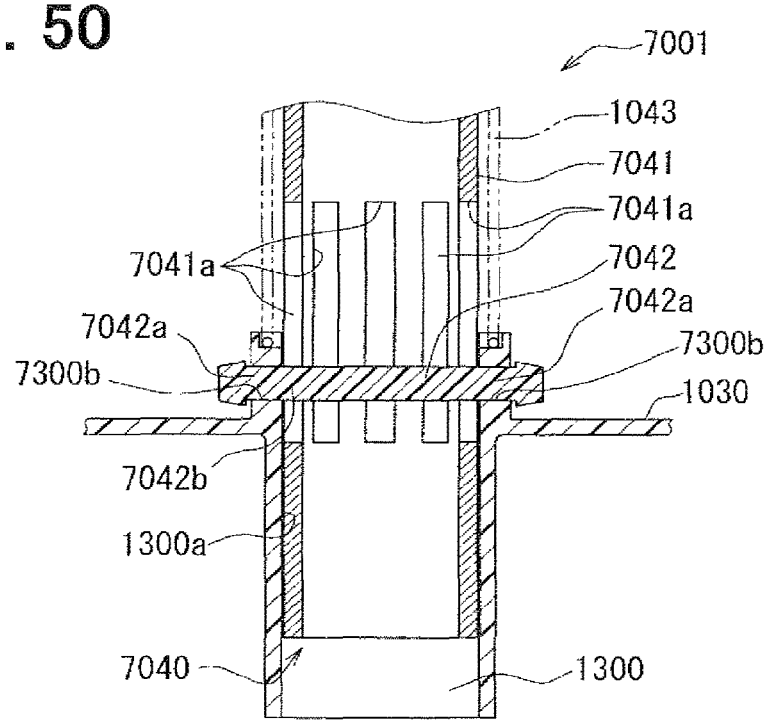
FIG. 50 is a partial longitudinal cross-sectional view showing an adjusting mechanism of a fuel supply apparatus according to a twelfth embodiment of the present invention.
Figure 51A:
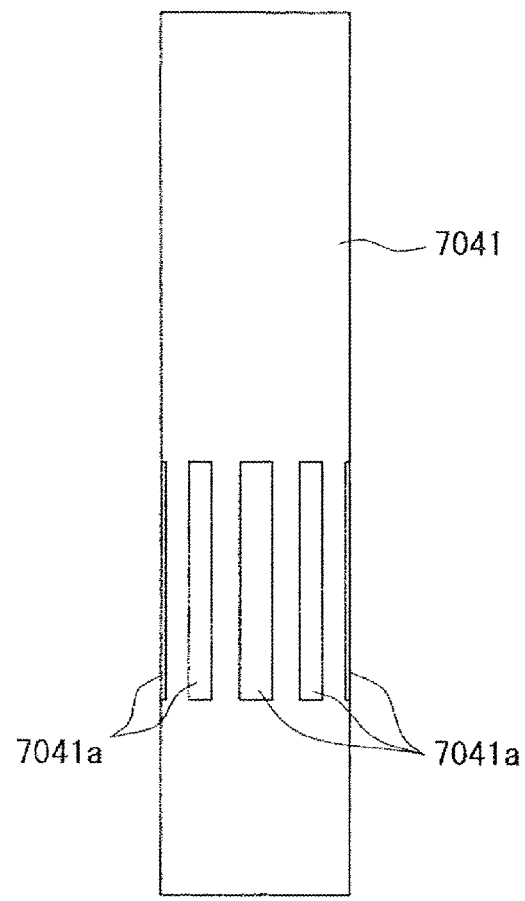
FIG. 51A is a front view showing a support shaft of the fuel supply apparatus of the twelfth embodiment.
Figure 51B:
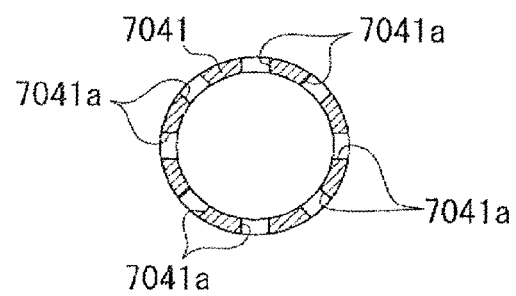
FIG. 51B is a lateral cross-sectional view of the support shaft of the fuel supply apparatus of the twelfth embodiment.

With reference to FIGS. 50 and 51, the twelfth embodiment is a modification of the second embodiment. Although not depicted in the drawings, in a fuel supply apparatus 7001 of the twelfth embodiment, the return conduit 1013 and the return passage 1047 are not provided like in the first embodiment, and the pressure regulator 54 is provided to the pump unit 1050 like in the first embodiment.

In an adjusting mechanism 7040 of the twelfth embodiment, a support shaft 7041, which is made of a metal material and is configured into a cylindrical tubular body, is inserted coaxially into the opening 1300 of the pump bracket 1030. The support shaft 7041 has eight longitudinal grooves 7041*a*, each of which is formed as a slit that extends in the axial direction.

With reference to FIG. 50, in the adjusting mechanism 7040, two engaging holes 7300*b* are formed at two circumferential locations of a portion of the pump bracket 1030, which surrounds the opening 1300, and an intermediate member 7042, which is made of a resin material and is configured into a cylindrical rod, is inserted through the engaging holes 7300*b*. Two end portions of the intermediate member 7042 form two coupling portions 7042*a*, respectively, which are engaged to and are thereby coupled to the engaging holes 7300*b*, respectively. A fitting portion 7042*b* is formed between the coupling portions 7042*a* in the intermediate member 7042 and is fitted into each of corresponding two of the longitudinal grooves 7041*a*, which are radially opened to the engaging holes 7300*b*, respectively, so that the fitting portion 7042*b* is circumferentially fitted with two opposed circumferential side walls of each of the corresponding two of the longitudinal grooves 7041*a*. The fitting portion 7042*b* implements the connected state relative to the support shaft 7041 such that the relative axial displacement between the fitting portion 7042*b* and the support shaft 7041 is enabled, and the relative circumferential rotation between the fitting portion 7042*b* and the support shaft 7041 is limited due to the contact between the fitting portion 7042*b* and the circumferential side walls of each corresponding one of the longitudinal grooves 7041*a* in the circumferential direction.

With the above-described construction, it is possible to make the relative axial displacement between the support shaft 7041 and the pump bracket 1030 by axially changing the fitting position of the fitting portion 7042*b* of the intermediate member 7042 to the corresponding two of the longitudinal grooves 7041*a* of the support shaft 7041, which correspond to the engaging holes 7300*b*, respectively, of the pump bracket 1030. Thereby, the relative positional change of the integrated components 1030, 1050, 1060 relative to the support shaft 7041 in the axial direction is reliably enabled.

Furthermore, the relative circumferential rotation between the support shaft 7041 and the pump bracket 1030 is limited by the circumferential contact between the fitting portion 7042*b* of the intermediate member 7042, which is engaged to the pump bracket 1030, and the corresponding two of the longitudinal grooves 7041*a* of the support shaft 7041, which correspond to the engaging holes 7300*b*, respectively, of the pump bracket 1030. Thereby, the relative positional change of the integrated components 1030, 1050, 1060 relative to the support shaft 7041 in the circumferential direction is reliably limited.

The fuel supply apparatus 7001 of the twelfth embodiment described above is manufactured in a manner similar to that of the second embodiment except the following two points. The first difference of the manufacturing method of the twelfth embodiment relative to the manufacturing method of the second embodiment is as follows. Specifically, at the time of inserting the support shaft 7041 into the opening 1300 of the pump bracket 1030 and then fitting the intermediate member 7042 into the engaging holes 7300*b*, the corresponding two of the longitudinal grooves 7041*a*, into which the fitting portion 7 is filled, is selected (fitting step). Thereby, the connecting angle θ (not shown) between the intermediate member 7042 and the support shaft 7041 is adjusted by 45 degree span, i.e., by 45 degree increment/decrement in the circumferential direction, and then the intermediate member 7042 is connected to the support shaft 7041 at the adjusted angle θ. Furthermore, the second difference of the manufacturing method of the twelfth embodiment relative to the manufacturing method of the second embodiment is as follows. Specifically, the pump unit 1050, which includes the pressure regulator 54, is installed to the pump bracket 1030 together with the remaining fuel quantity sensing device 1060.

According to the twelfth embodiment, in which the fuel supply apparatus 7001 is manufactured in the above described manner, advantages similar to those of the second embodiment are achieved except the advantages associated with the pressure regulator 1054.

Thirteenth Embodiment

Now, a characteristic structure of a fuel supply apparatus according to a thirteenth embodiment of the present invention will be described with reference to the accompanying drawings.

Figure 52:
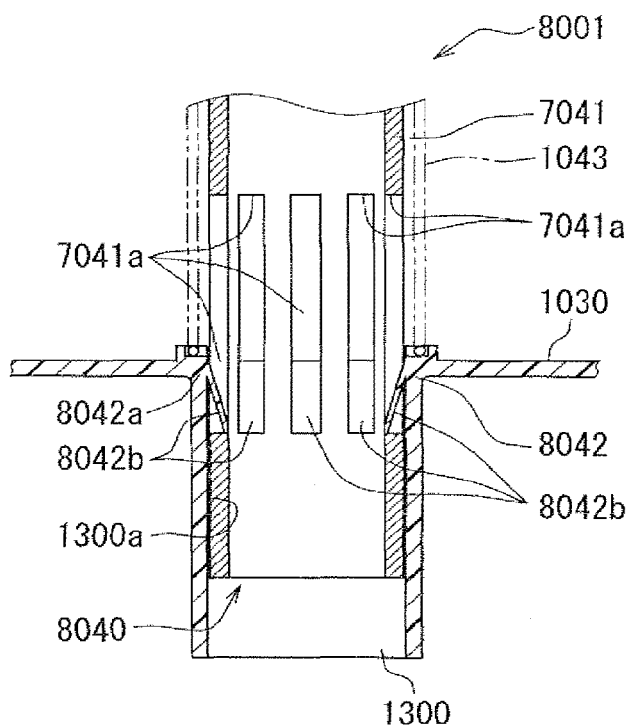
FIG. 52 is a partial longitudinal cross-sectional view showing an adjusting mechanism of a fuel supply apparatus according to a thirteenth embodiment of the present invention.
Figure 53:
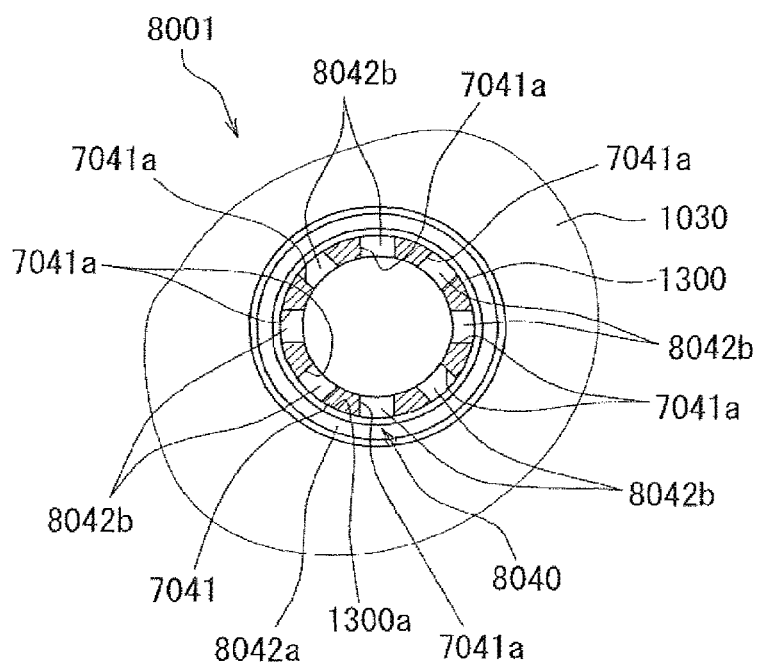
FIG. 53 is a lateral cross-sectional view showing the adjusting mechanism of the fuel supply apparatus of the thirteenth embodiment.

With reference to FIGS. 52 and 53, the thirteenth embodiment is a modification of the twelfth embodiment. In an adjusting mechanism 8040 of the thirteenth embodiment, an intermediate member 8042, which is made of a resin material, is formed integrally with the pump bracket 1030 by the corresponding portion of the pump bracket 1030, which forms the opening 1300, so that the intermediate member 8042 has coupling portions 8042a, which are coupled to the upper portion of the pump bracket 1030. Furthermore, the intermediate member 8042 has eight fitting claws 8042b that project radially inward and are provided at eight circumferential locations, respectively, which are arranged one after another at generally equal intervals in the circumferential direction. Each of the fitting claws 8042b is circumferentially fitted with two opposed circumferential side walls of a corresponding one of the longitudinal grooves 7041a, which corresponds to the connecting angle θ (not shown). The fitting claws 8042b implement the connected state relative to the support shaft 7041 such that the relative axial displacement between the fitting claims 8042b and the support shaft 7041 is enabled, and the relative circumferential rotation between the fitting claws 8042b and the support shaft 7041 is limited due to the contact between each of the fitting claws 8042b and the circumferential side walls of the corresponding one of the longitudinal grooves 7041a in the circumferential direction.

The fuel supply apparatus 8001 of the thirteenth embodiment described above is manufactured in a manner similar to that of the second embodiment except the following two points. The first difference of the manufacturing method of the thirteenth embodiment relative to the manufacturing method of the second embodiment is as follows. Specifically, at the time of inserting the support shaft 7041 into the opening 1300 of the pump bracket 1030, each corresponding one of the longitudinal grooves 7041a, into which the corresponding one of the fitting claws 8042b formed integrally with the pump bracket 1030 is fitted, is selected (fitting step). Thereby, the connecting angle θ between the intermediate member 8042 and the support shaft 7041 is adjusted by 45 degree span, i.e., by 45 degree increment/decrement in the circumferential direction, and then the intermediate member 8042 is connected to the support shaft 7041 at the adjusted angle θ. Furthermore, the second difference of the manufacturing method of the twelfth embodiment relative to the manufacturing method of the second embodiment is as follows. Specifically, the pump unit 1050, which includes the pressure regulator 54, is installed to the pump bracket 1030 together with the remaining fuel quantity sensing device 1060.

According to the thirteenth embodiment, in which the fuel supply apparatus 8001 is manufactured in the above described manner, advantages similar to those of the second embodiment are achieved except the advantages associated with the pressure regulator 1054.

Fourteenth Embodiment

Now, a characteristic structure of a fuel supply apparatus according to a fourteenth embodiment of the present invention will be described with reference to the accompanying drawings.

Figure 54:
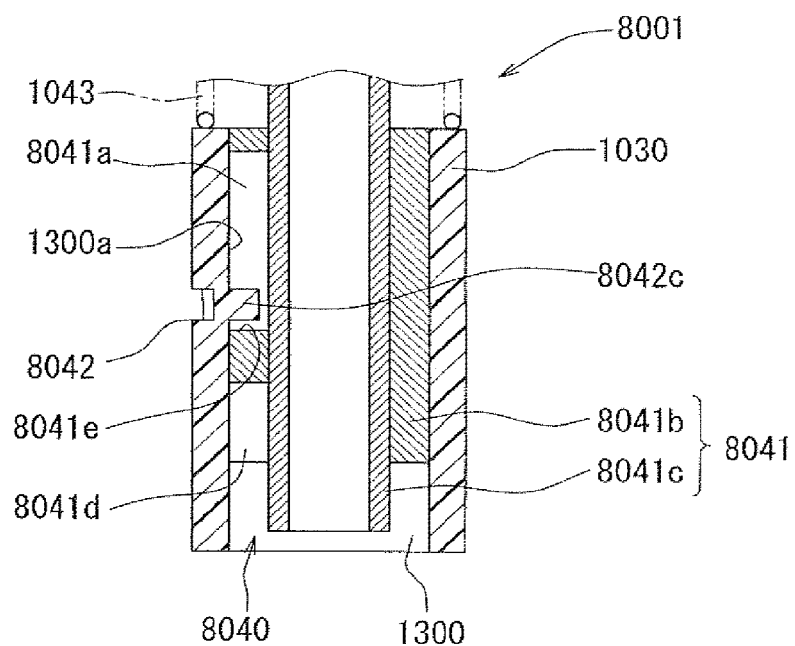
FIG. 54 is a partial longitudinal cross-sectional view showing an adjusting mechanism of a fuel supply apparatus according to a fourteenth embodiment of the present invention.
Figure 55:
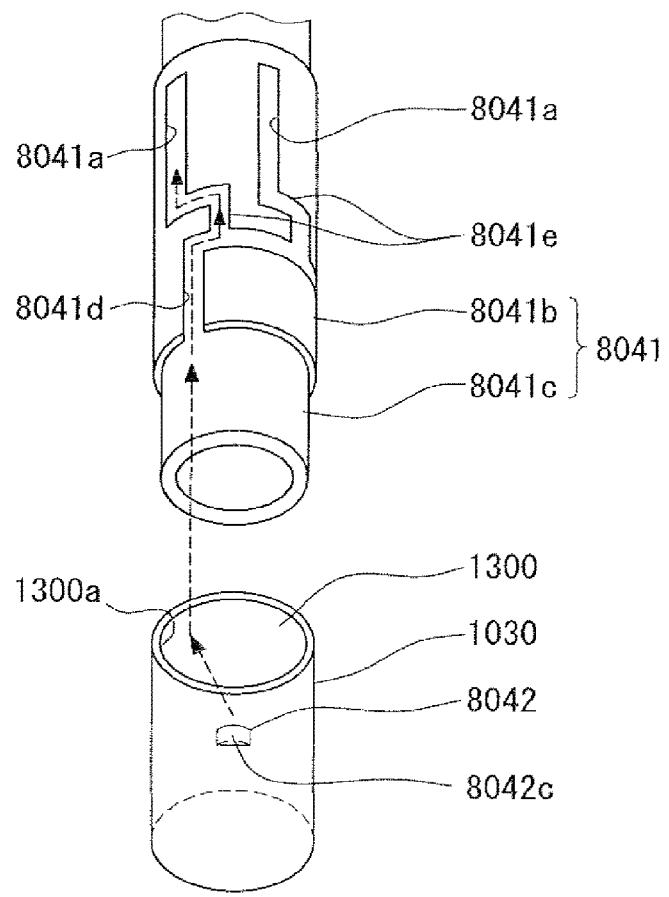
FIG. 55 is an exploded perspective view showing the adjusting mechanism of the fuel supply apparatus of the fourteenth embodiment.

With reference to FIGS. 54 and 55, the fourteenth embodiment is a modification of the thirteenth embodiment. In the adjusting mechanism 8040 of the fourteenth embodiment, a support shaft 8041, which is made of a metal material and is configured into a cylindrical tubular body, is fitted coaxially into the opening 1300 of the pump bracket 1030. Three longitudinal grooves 8041a, which extend in the axial direction, are arranged one after another at generally equal intervals in the circumferential direction in one half circumferential section (180 degree circumferential range) of the support shaft 8041. Each of the longitudinal grooves 8041a is connected to a guide groove 8041d, which opens to the lower end portion of the support shaft 8041, through a corresponding one of connecting grooves 8041e. The support shaft 8041 is formed by inserting and securing a support shaft main body 8041c into a support shaft sleeve 8041b that has the grooves 8041a, 8041d, 8041e by, for example, press-fitting.

The intermediate member 8042 of the adjusting mechanism 8040 includes a fitting claw 8042c, which projects radially inward from one circumferential location in the intermediate member 8042. The fitting claw 8042c is inserted from the guide groove 8041d into a corresponding one of the longitudinal grooves 8041a, which corresponds to a connecting angle θ (not shown), through the corresponding connecting groove 8041e, so that the fitting claw 8042c is circumferentially fitted with two opposed circumferential side walls of the corresponding longitudinal groove 8041a. Thereby, the fitting claw 8042c is connected to the support shaft 8041 in the connected state (locked state), in which the relative axial displacement between the fitting claw 8042c and the corresponding longitudinal groove 8041a is enabled, and the relative circumferential rotation between the fitting claw 8042c and the corresponding longitudinal groove 8041a is limited.

According to the fourteenth embodiment, the fuel supply apparatus 8001 is manufactured in a manner similar to that of the thirteenth embodiment except the following point. Specifically, at the time of inserting the support shaft 8041 into the opening 1300 of the pump bracket 1030, the corresponding one of the longitudinal grooves 8041a, into which the fitting claw 8042c is fitted, is selected in order to adjust the connecting angle θ between the intermediate member 8042 and the support shaft 8041 by 60 degree span, i.e., by 60 degree increment/decrement in the circumferential direction. Therefore, even in the fourteenth embodiment, advantages, which are similar to those of the second embodiment, can be achieved.

Fifteenth Embodiment

Now, a characteristic structure of a fuel supply apparatus according to a fifteenth embodiment of the present invention will be described with reference to the accompanying drawings.

Figure 56:
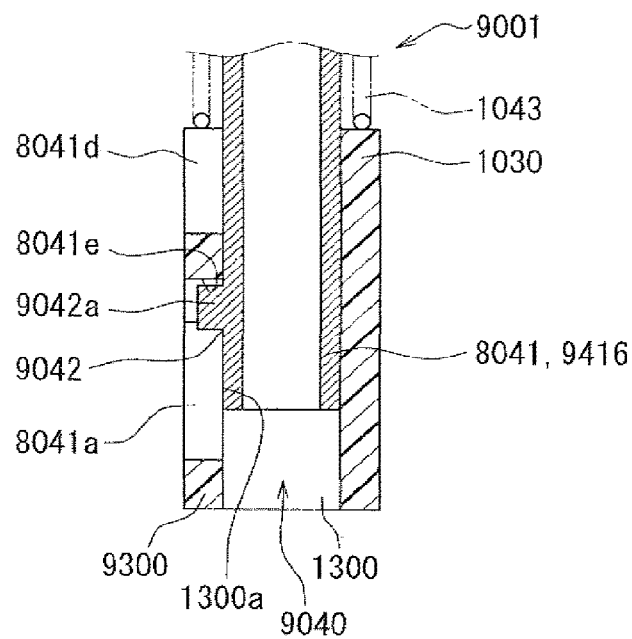
FIG. 56 is a partial longitudinal cross-sectional view showing an adjusting mechanism of a fuel supply apparatus according to a fifteenth embodiment of the present invention.
Figure 57:
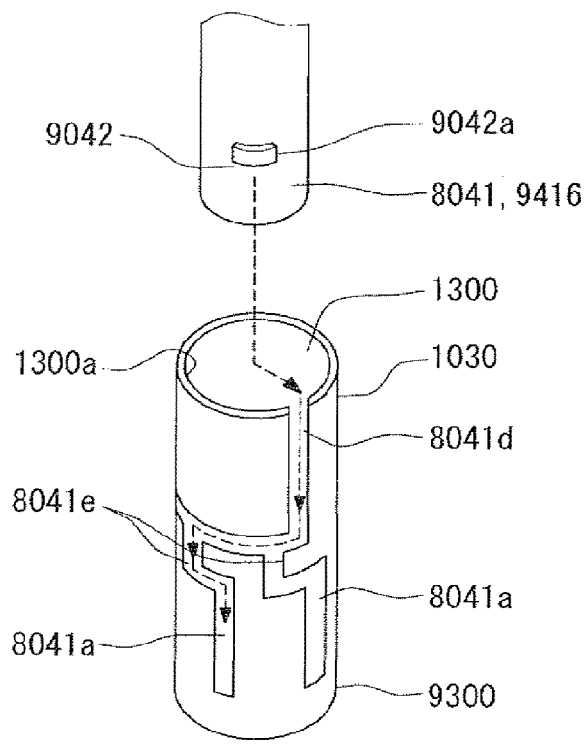
FIG. 57 is an exploded perspective view showing the adjusting mechanism of the fuel supply apparatus of the fifteenth embodiment.

With reference to FIGS. 56 and 57, the fifteenth embodiment is a modification of the fourteenth embodiment. In an adjusting mechanism 9040 of the fifteenth embodiment, the longitudinal grooves 8041a, the guide groove 8041d and the connecting grooves 8041e are not formed in the support shaft 8041 but are formed in a tubular wall portion 9300 of the pump bracket 1030, which forms the opening 1300 therein. The guide groove 8041d opens in an upper end of the tubular wall portion 9300 rather than in the lower end of the support shaft 8041.

In the adjusting mechanism 9040, an intermediate member 9042 is formed integrally in a cylindrical lower end portion 9416 of the support shaft 8041, so that the intermediate member 9042 is connected to the support shaft 8041 in a positioned state, in which the intermediate member 9042 is positioned relative to the support shaft 8041. The fifteenth embodiment may be modified in a manner shown in FIG. 58. Specifically, in the modification shown in FIG. 58, an annular intermediate member 9042 is securely fitted to an outer peripheral surface of a cylindrical lower end portion 9416 of the support shaft 8041, so that the intermediate member 9042 is connected to the support shaft 8041 in a positioned state, in which the intermediate member 9042 is positioned relative to the support shaft 8041.

Figure 58:
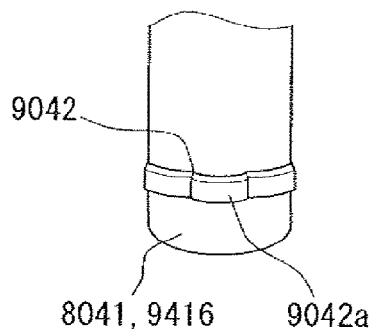
FIG. 58 is a perspective view showing an intermediate member of a modification of the fuel supply apparatus of the fifteenth embodiment.

With reference to FIGS. 56 to 58, in the fifteenth embodiment and the modification thereof, the intermediate member 9042 has a coupling claw 9042a, which serves as a coupling portion and projects radially outward from one circumferential location of the intermediate member 9042. The coupling claw 9042a is inserted from the guide groove 8041d into a corresponding one of the longitudinal grooves 8041a, which corresponds to a connecting angle θ (not shown), through the corresponding connecting groove 8041e, so that the coupling claw 9042a is circumferentially fitted with two opposed circumferential side walls of the corresponding longitudinal groove 8041a. Thereby, the coupling claw 9042a is connected to the pump bracket 1030 in the coupled state (locked state), in which the relative axial displacement between the coupling claw 9042a and the corresponding longitudinal groove 8041a is enabled, and the relative circumferential rotation between the coupling claw 9042a and the corresponding longitudinal groove 8041a is limited.

According to the fifteenth embodiment and the modification thereof, the fuel supply apparatus 9001 is manufactured in a manner similar to that of the thirteenth embodiment except the following point. Specifically, at the time of inserting the support shaft 8041 into the opening 1300 of the pump bracket 1030, the corresponding one of the longitudinal grooves 8041a, into which the coupling claw 9042a is fitted, is selected in order to adjust the connecting angle θ between the intermediate member 9042 and the pump bracket 1030 by 120 degree span, i.e., by 120 degree increment/decrement in the circumferential direction. Therefore, even in the fifteenth embodiment, advantages, which are similar to those of the second embodiment, can be achieved.

Sixteenth Embodiment

Figure 59:
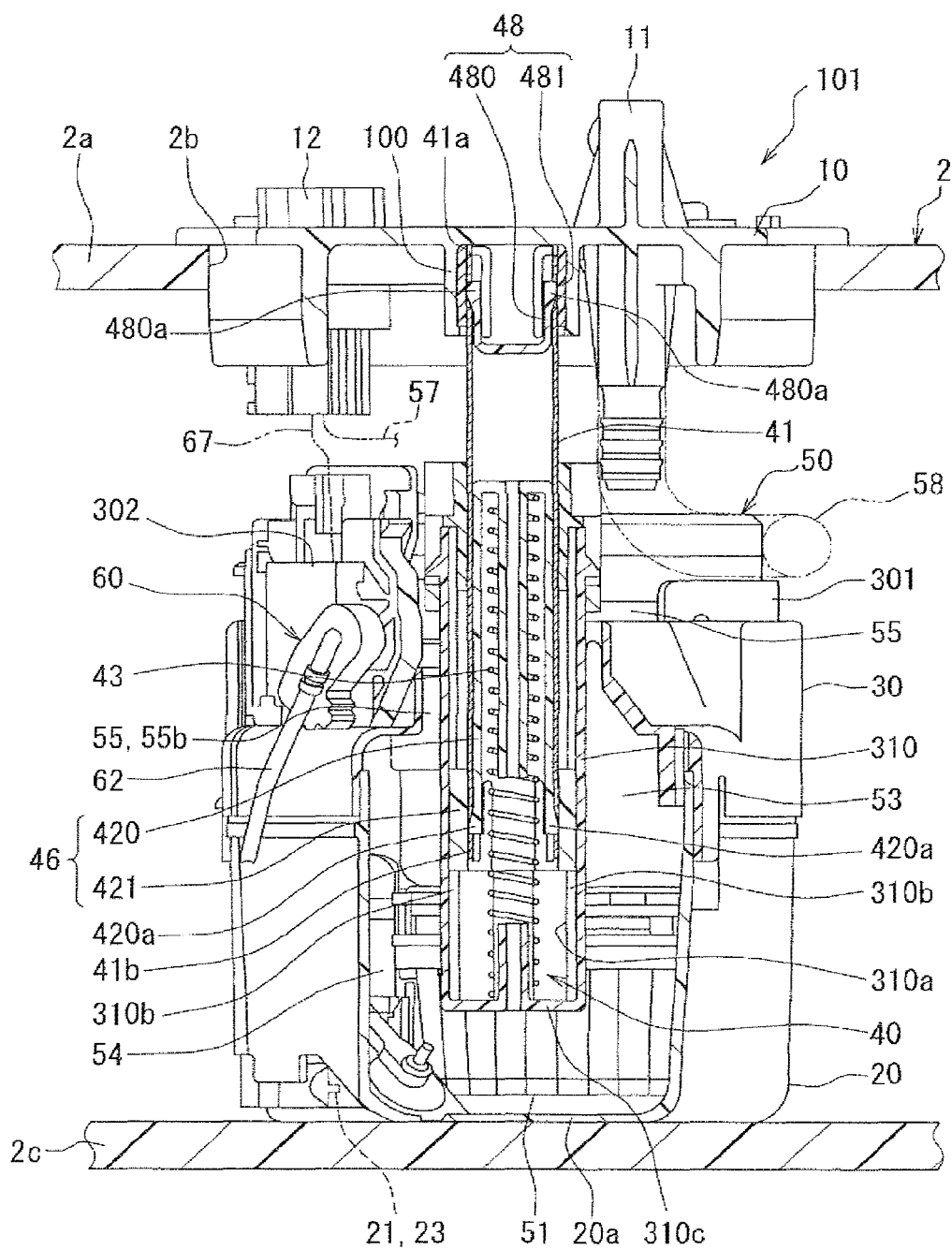
FIG. 59 is a cross-sectional view taken along line LIX-LIX in FIG. 61, showing a structure of a fuel supply apparatus according to a sixteenth embodiment of the present invention.
Figure 60:
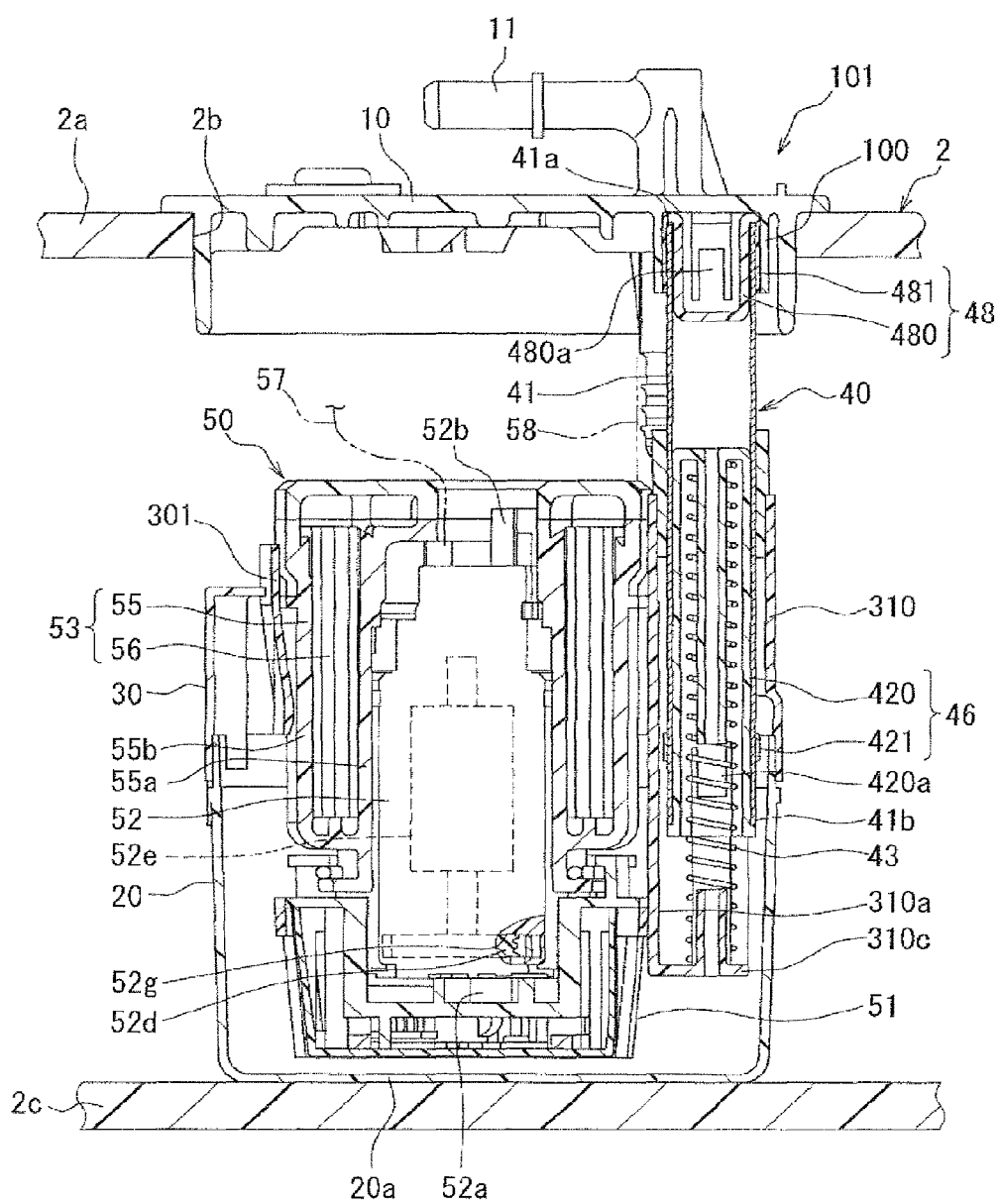
FIG. 60 is a cross-sectional view taken along line LX-LX in FIG. 61, showing the structure of the fuel supply apparatus of the sixteenth embodiment.

FIGS. 59 and 60 show a fuel supply apparatus 101 according to a sixteenth embodiment of the present invention. The fuel supply apparatus 101 is installed to the fuel tank 2 of the vehicle (e.g., an automobile) and supplies fuel out of the fuel tank 2. A top-to-bottom direction in FIGS. 59 and 60, which indicate the installation of the fuel supply apparatus 101 to the fuel tank 2, substantially coincides with a vertical direction of the vehicle.

First of all, a basic structure of the fuel supply apparatus 101 will be described. The fuel supply apparatus 101 includes the flange 10, the sub-tank 20, the cover member 30, the adjusting mechanism 40, the pump unit 50 and the remaining fuel quantity sensing device 60. The above-described components 20, 30, 40, 50, 60 of the fuel supply apparatus 101 other than the flange 10 are placed in a predetermined location in an inside of the fuel tank 2.

Figure 61:
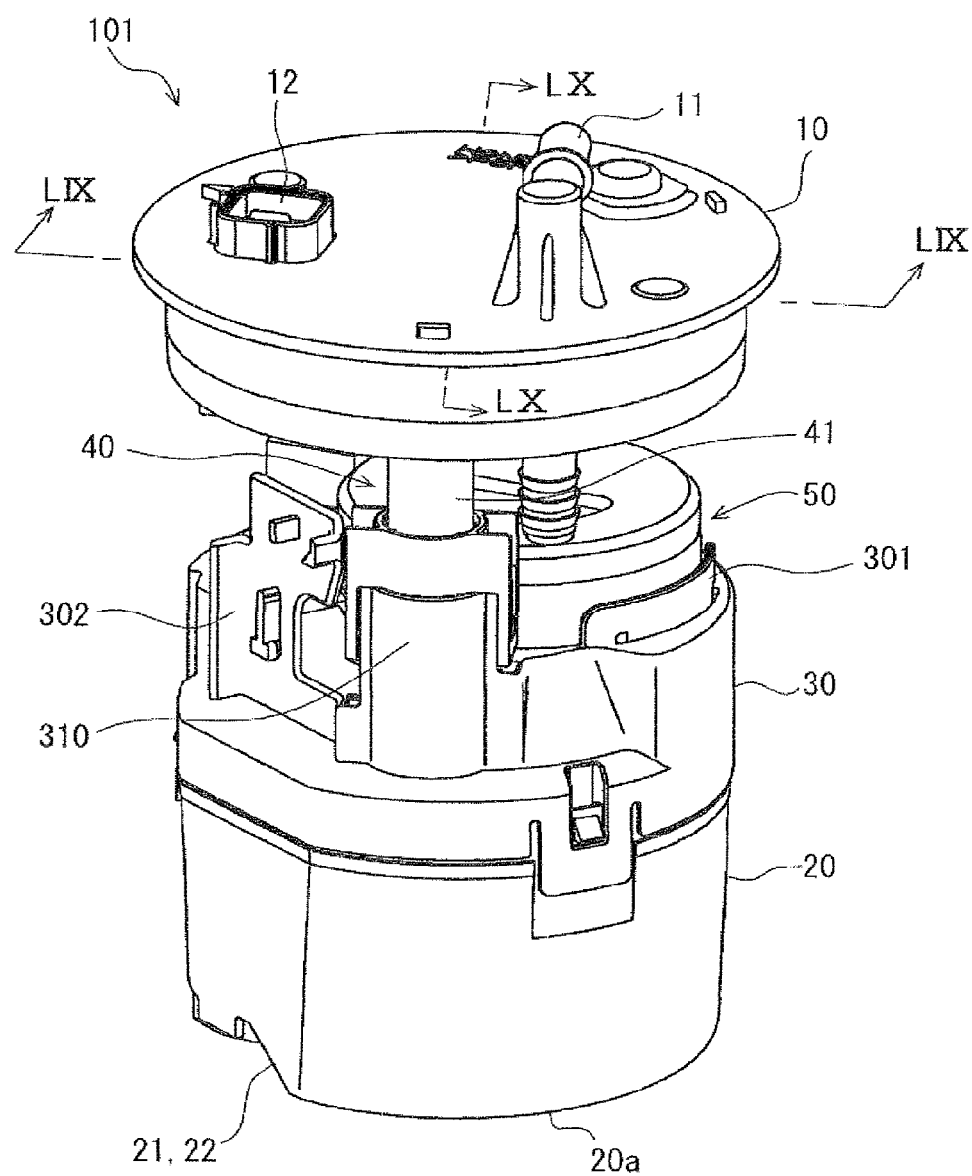
FIG. 61 is a perspective view of the fuel supply apparatus of the sixteenth embodiment.

The flange 10 is made of a resin material and is configured into a circular disk body. The flange 10 is fitted to and closes the through-hole 2b, which extends through the top plate portion 2a of the fuel tank 2. The flange 10 includes a fixing tubular portion 100, which is configured into a tubular body and projects downward. Furthermore, as shown in FIGS. 59 to 61, the flange 10 includes a fuel supply conduit 11 and the electric connector 12. The fuel supply conduit 11 supplies the fuel, which is discharged from the pump unit 50, to the outside of the fuel tank 2. The electric connector 12 has terminals (not shown), which electrically connect the pump unit 50 and the remaining fuel quantity sensing device 60 to an external device. In this way, an electric power is supplied to a fuel pump 52 of the pump unit 50 through the electric connector 12 to drive the fuel pump 52, and a remaining fuel quantity measurement signal, which indicates a remaining fuel quantity of the fuel tank 2, is outputted from the remaining fuel quantity sensing device 60 through the electric connector 12.

The sub-tank 20 is made of a resin material and is configured into a cup-shaped body (a cylindrical tubular body with a closed bottom). The sub-tank 20 is received in the fuel tank 2 and is placed on the bottom portion 2c of the fuel tank 2. The jet pump 21 is provided at the bottom portion 20a of the sub-tank 20. The jet pump 21 includes an inlet passage 22 and a jet nozzle 23. The inlet passage 22 communicates between the inside of the fuel tank 2 and the inside of the sub-tank 20. The jet nozzle 23 injects excessive fuel, which is outputted from the pressure regulator 54 of the pump unit 50, into the inlet passage 22. A negative pressure, which is lower than the atmospheric pressure, is generated in the inlet passage 22 by the fuel injection from the jet nozzle 23, so that the fuel in the fuel tank 2 is drawn into the inlet passage 22 and is then conducted to the sub-tank 20. The sub-tank 20 stores the fuel, which is supplied to the sub-tank 20 in the above-described manner.

The cover member 30 is made of a resin material and is configured into an inverted cup-shaped body (an inverted cylindrical tubular body with a closed bottom). A peripheral portion of an opening of the cover member 30 is coaxially fitted to a peripheral portion of an opening of the sub-tank 20. In this way, the cover member 30 is received in the fuel tank 2 and closes the opening 24 of the sub-tank 20. The cover member 30 includes holding portions 301, 302 and a receiver (also referred to as opening) 310. The holding portions 301, 302 hold the pump unit 50 and the remaining fuel quantity sensing device 60, respectively, in the fuel tank 2. The receiver 310 is configured into a cup-shaped body and receives the support shaft 41 of the adjusting mechanism 40.

As shown in FIGS. 59 and 60, the adjusting mechanism 40 includes the support shaft 41, two intermediate members, i.e., first and second intermediate members 46, 48 and the resilient member 43. The support shaft 41 is made of a metal material and is configured into an elongated cylindrical tubular body. The support shaft 41 is received in the receiver 310 of the cover member 30 and axially slidable relative to the receiver 310 in a coaxial manner.

The first intermediate member 46 is made of a resin material and is configured into a double cylindrical tubular body (i.e., a body having two cylindrical tubular portions, i.e., an inner tubular portion 420 and an outer tubular portion 421 which are arranged one after another in a radial direction thereof). The first intermediate member 46 is coaxially received in the receiver 310 such that the support shaft 41 is received between the inner tubular portion 420 and the outer tubular portion 421 of the first intermediate member 46. Engaging claws 420a, which radially project from the inner tubular portion 420, are engaged with the support shaft 41, so that the first intermediate member 46 is fixed to a lower end portion 41b of the support shaft 41. The first intermediate member 46 is slidably fitted to two longitudinal grooves 310b of the receiver 310, which are provided in an inner peripheral surface 310a of the receiver 310 and extend in the axial direction, so that relative circumferential rotation between the first intermediate member 46 and the receiver 310 is limited, and relative axial displacement between the first intermediate member 46 and the receiver 310 is enabled. In the present embodiment, the sub-tank 20, the cover member 30, the pump unit 50 and the remaining fuel quantity sensing device 60 are integrated together and will be hereinafter simply referred to as integrated components 20, 30, 50, 60. These integrated components 20, 30, 50, 60 are not rotatable relative to the support shaft 41 in the circumferential direction but are displaceable relative to the support shaft 41 in the axial direction.

Figure 63:
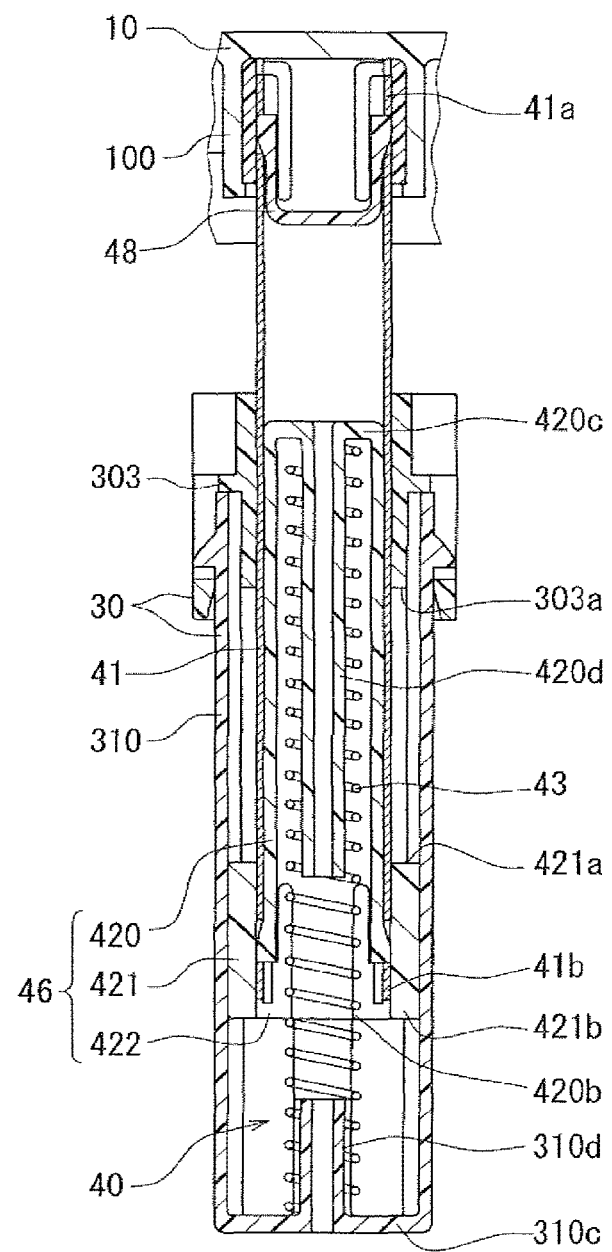
FIG. 63 is an enlarged cross-sectional view showing an adjusting mechanism of the fuel supply apparatus of the sixteenth embodiment shown in FIG. 59.
Figure 64:
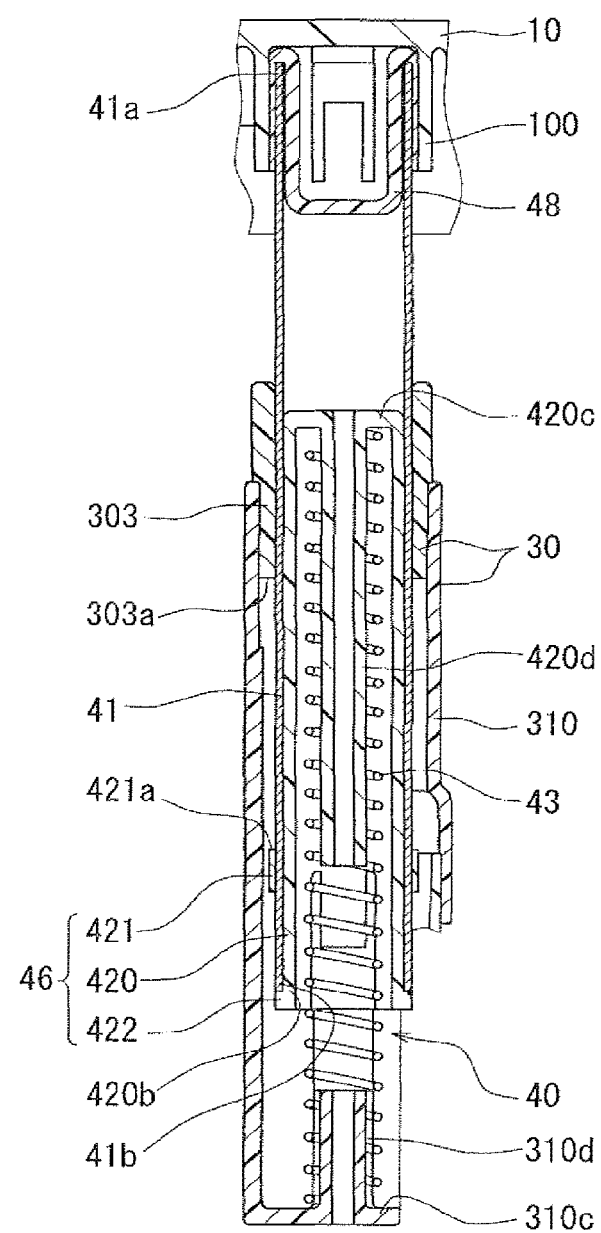
FIG. 64 is an enlarged cross-sectional view showing the adjusting mechanism of the fuel supply apparatus of the sixteenth embodiment shown in FIG. 60.
Figure 65:
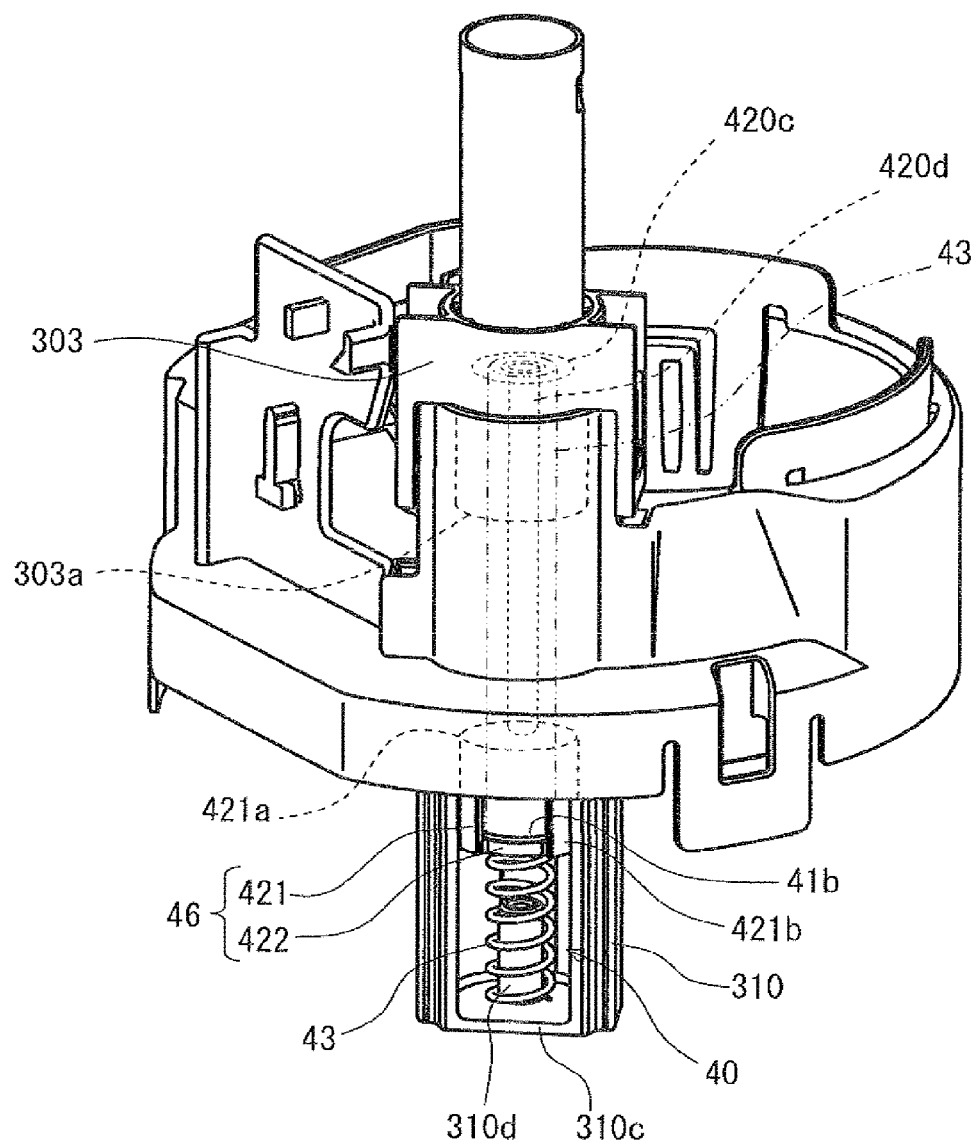
FIG. 65 is a perspective view showing the adjusting mechanism of the fuel supply apparatus of the sixteenth embodiment.

The second intermediate member 48 is made of a resin material and is configured into a double cylindrical tubular body (i.e., a body having two cylindrical tubular portions, i.e., an inner tubular portion 480 and an outer tubular portion 481, which are arranged one after another in a radial direction thereof). In a state where the support shaft 41 is inserted between the inner tubular portion 480 and the outer tubular portion 481 of the second intermediate member 48, the second intermediate member 48 is securely snap fitted to the fixing tubular portion 100 of the flange 10. Engaging claws 480a, which radially outwardly project from the inner tubular portion 480, are engaged to the support shaft 41, so that the second intermediate member 48 is secured to an upper end portion 41a of the support shaft 41 (also see FIGS. 63 and 64). With the above construction, the integrated components 20, 30, 50, 60 are connected to the flange 10 through the single support shaft 41.

In the present embodiment, the resilient member 43 is a coil spring and is interposed between the first intermediate member 46 and a bottom portion 310c of the receiver 310. The resilient member 43 exerts a restoring force (urging force) in the axial direction of the support shaft 41 to urge the integrated components 20, 30, 50, 60, which include the receiver 310 of the cover member 30, toward the bottom portion 2c of the fuel tank 2. In this way, the bottom portion 20a of the sub-tank 20 among the integrated components 20, 30, 50, 60 is urged against the bottom portion 2c of the fuel tank 2 regardless of differences in the manufacturing specifications, manufacturing tolerances and/or the amount of deformation of the fuel tank. The above-described functions of the resilient member 43 and of the intermediate members 46, 48 enable the stabilization of the installation position of the integrated components 20, 30, 50, 60 relative to the bottom portion 2c of the fuel tank 2.

Figure 62:
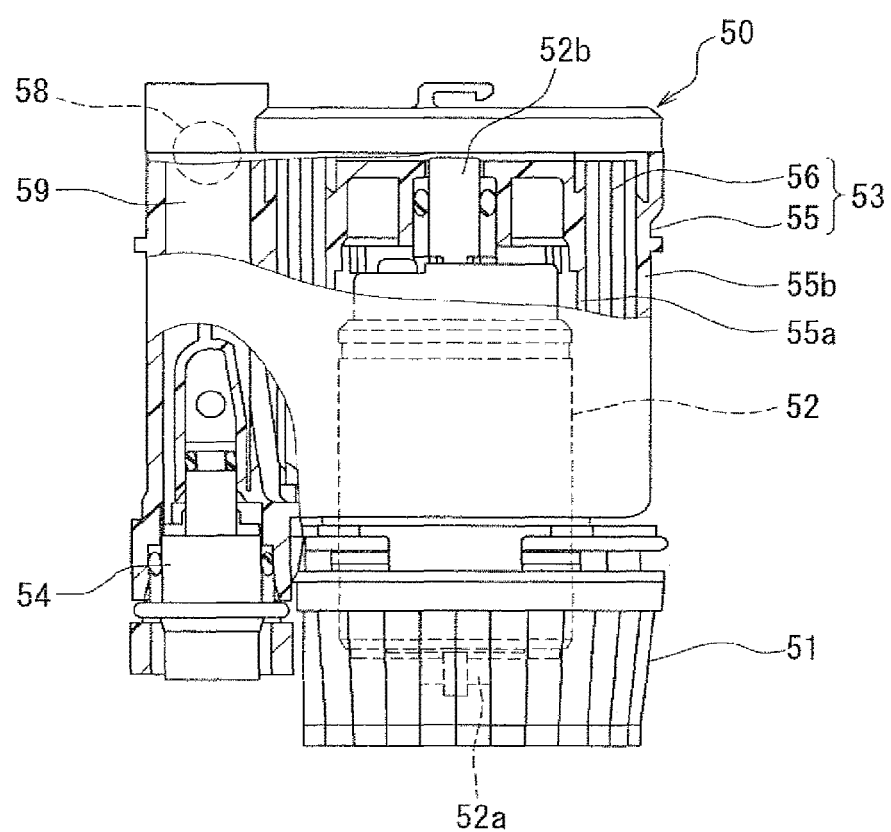
FIG. 62 is a partially fractured lateral view showing a pump unit of the fuel supply apparatus of the sixteenth embodiment.

A lower portion of the pump unit 50 is received in the sub-tank 20, and an upper portion of the pump unit 50 projects upward from the cover member 30. As shown in FIGS. 59, 60 and 62, the pump unit 50 includes the suction filter 51, the fuel pump 52, a flexible electrical line 57, the fuel filter 53, a flexible tube 58 and the pressure regulator 54.

The suction filter is placed at a lowermost portion of the pump unit 50. The suction filter 51, which is connected to the fuel inlet 52a of the fuel pump 52, filters relatively large foreign objects (debris) contained in the fuel, which is drawn by the fuel pump 52 from the sub-tank 20.

The fuel pump 52 is placed on an upper side of the suction filter 51 and has the fuel inlet 52a and the fuel outlet 52b, which are directed downward and upward, respectively. As shown in FIG. 60, the fuel pump 52 has a rotatable member 52d, which is driven by an electric motor 52e and is received in a pump chamber 52g that communicates between the fuel inlet 52a and the fuel outlet 52b. The rotatable member 52d of the present embodiment is an impeller, which is configured into a circular disc body that has a plurality of vane grooves arranged one after another in a circumferential direction of the impeller. The rotatable member 52d is received in the pump chamber 52g in a state where an axial direction of the rotatable member 52d substantially coincides with the top-to-bottom direction. The electric motor 52e is electrically connected to terminals of the electric connector 12 through the flexible electrical line 57, which is flexible and is thereby bendable. The electric motor 52e rotates the rotatable member 52d when an electric power is supplied to the electric motor 52e through the terminals of the electric connector 12. When the rotatable member 52d is rotated by the electric motor 52e, the fuel, which is received in the sub-tank 20, is drawn into the fuel inlet 52a through the suction filter 51. Thereafter, the drawn fuel is pressurized in the pump chamber 52g by the action of the vane grooves of the rotatable member 52d, which is rotated by the electric motor 52e, and is then discharged through the fuel outlet 52b.

As shown in FIGS. 59, 60 and 62, the fuel filter 53 is placed to cover an outer peripheral side and an upper side of the fuel pump 52 in the pump unit 50. A filter case 55 of the fuel filter 53 includes two cylindrical portions, i.e., inner and outer tubular portions 55a, 55b, which are coaxially placed and are made of a resin material. The fuel pump 52 is coaxially placed in a space, which is located radially inward of the inner tubular portion 55a. The filter element 56 of the fuel filter 53 is made of a filter material, which is configured into, for instance, a honeycomb body and is received in a space, which is radially located between the inner tubular portion 55a and the outer tubular portion 55b.

The space, which is radially located between the inner and outer tubular portions 55a, 55b, is communicated with the fuel outlet 52b of the fuel pump 52 and the fuel outlet 59 of the fuel filter 53 located on an upstream side and a downstream side, respectively, of the filter element 56. The fuel outlet 59 is connected to the fuel supply conduit 11 through the flexible tube 58, which is flexible and is thereby bendable. With the above described construction, the fuel, which is supplied from the fuel outlet 52b of the fuel pump 52 into the space between the inner and outer tubular portions 55a, 55b, is filtered through the filter element 56 to filter fine foreign objects (debris) and is then discharged through the fuel outlet 59 of the fuel filter 53 toward the fuel supply conduit 11.

As shown in FIG. 62, the pressure regulator 54 is placed adjacent to the fuel filter 53 on a lateral side of the fuel filter 53 in the pump unit 50. A portion of the fuel, which is directed toward the fuel supply conduit 11 located outside of the sub-tank 20 and of the fuel tank 2, is supplied to the pressure regulator 54, which is connected to the fuel outlet 59 of the fuel filter 53. In this way, the pressure regulator 54 adjusts the pressure of the fuel to be discharged toward the fuel supply conduit 11 and discharges excessive fuel, which becomes excessive at the time of adjusting the pressure of the fuel, to the jet nozzle 23 of the jet pump 21.

As shown in FIG. 59, the remaining fuel quantity sensing device 60 is held on the cover member 30 by the holding portion 302 such that the remaining fuel quantity sensing device 60 is placed outside of the sub-tank 20. In the present embodiment, the remaining fuel quantity sensing device 60 is a sender gauge, which is electrically connected to the terminals of the electric connector 12 through a flexible electrical line 67 that is flexible and is thereby bendable. Upon receiving the electric power through the terminals of the electric connector 12, the remaining fuel quantity sensing device 60 senses a quantity of the remaining fuel in the fuel tank 2 based on a measured rotational angle of the arm 62, which is integrated with a float (not shown) that floats on a top of the fuel in the fuel tank 2.

Next, the structures of the adjusting mechanism 40 and of the cover member 30, which are characteristic features of the fuel supply apparatus 101, will be described in detail. In the adjusting mechanism 40 of FIGS. 63 and 64, the inner tubular portion 420 of the first intermediate member 46, which is coupled integrally with the support shaft 41, is configured into an inverted cup-shaped body (an inverted cylindrical tubular body with a closed bottom) and is placed in the inside of the support shaft 4t A bottom portion 420c of the inner tubular portion 420 serves as an opposing portion, which is axially opposed to the bottom portion (hereinafter also referred to as a receiver bottom portion) 310c of the receiver 310 of the cover member 30 that serves as a holding member that holds the pump unit 50.

As shown in FIGS. 63 to 66, a connecting portion 422, which radially connects between lower ends 420b, 421b of the inner and outer tubular portions 420, 421 of the first intermediate member 46 together, is engaged to the lower end portion 41b of the support shaft 41, which is clamped between the inner tubular portion 420 and the outer tubular portion 421. In the first intermediate member 46, the bottom portion (opposing portion) 420c, which is placed on an upper side of the lower end portion 41b of the support shaft 41, clamps the resilient member 43 in corporation with the bottom portion 310c of the receiver 310, i.e., clamps the resilient member 43 between the bottom portion 310c of the receiver 310 and the bottom portion (opposing portion) 420c. In this way, the resilient member 43, which is the coil spring, is received coaxially in the support shaft 41 and the receiver 310 and exerts the restoring force (urging force) between the support shaft 41 (more specifically, the bottom portion 420c of the inner tubular portion 420 of the first intermediate member 46 that is coupled integrally with the support shaft 41) and the receiver 310 due to the resiliently compressed deformation of the resilient member 43 therebetween. Therefore, the resilient member 43, which is placed between the bottom portion 310c of the receiver 310 and the bottom portion (opposing portion) 420c, exerts the restoring force against the bottom portion 310c of the receiver 310, so that the integrated components 20, 30, 50, 60, which include the bottom portion 310c of the receiver 310 of the cover member 30, are urged toward the bottom portion (also referred to as fuel tank bottom portion) 2c of the fuel tank 2 by the resilient member 43.

The first intermediate member 46 further integrally has a support portion 420d, which is configured into a cylindrical tubular body and projects downward from the bottom portion (opposing portion) 420c located above the resilient member 43. The receiver 310 further includes a support portion 310d, which is integrated in the receiver 310 and projects upward from the bottom portion 310c of the receiver 310 located below the resilient member 43. The support portions 420d, 310d project into the inside of the coil spring, i.e., the resilient member 43, so that the support portions 420d, 310d support the resilient member 43 along the axial direction, i.e., along the length of the resilient member 43.

Figure 66:
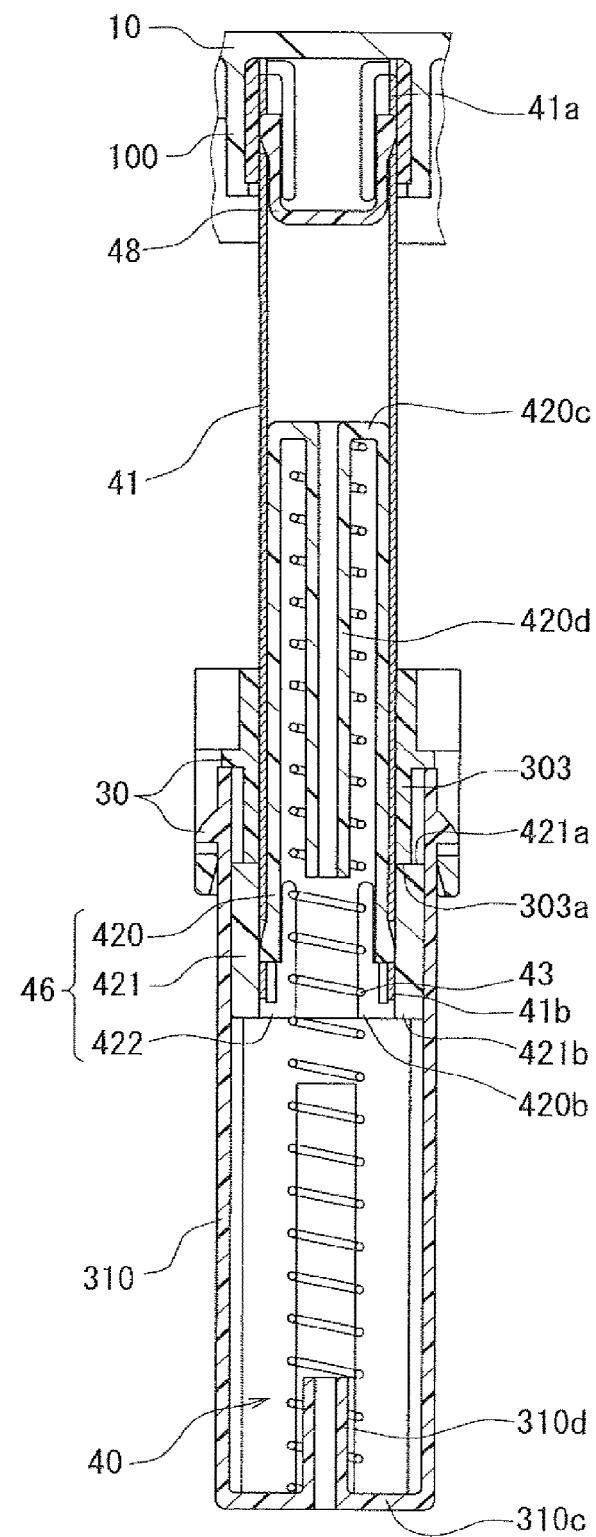
FIG. 66 is a cross-sectional view showing the adjusting mechanism of the fuel supply apparatus of the sixteenth embodiment in a state, which is different from that of FIG. 63.

A shaft stopper 303, which is a portion of the cover member 30 and is fixed to the receiver 310, is made of a resin material and is configured into a cylindrical tubular body. The support shaft 41 is axially slidably received in the shaft stopper 303 in a coaxial manner at a location radially inward of the shaft stopper 303. A lower end portion 303a of the shaft stopper 303 is axially opposed to an upper end portion 421a of the outer tubular portion 421 of the first intermediate member 46, which is moved integrally with the support shaft 41. As shown in FIG. 66, the lower end portion 303a of the shaft stopper 303 serves as an engaging portion and is adapted to engage with the upper end portion 421a of the outer tubular portion 421 of the first intermediate member 46 securely coupled to the support shaft 41 to hold the support shaft 41 when the support shaft 41 is placed to a removing-side movable end thereof upon movement of the support shaft 41 in a removing direction thereof away from the receiver 310.

In the sixteenth embodiment described above, the resilient member 43 exerts the restoring force between the bottom portion (opposing portion) 420c, which is integrated with the support shaft 41, and the bottom portion 310c of the cover member 30, so that the installation position of the integrated components 20, 30, 50, 60 relative to the bottom portion 2c of the fuel tank 2 can be always stabilized. Furthermore, as shown in FIG. 66, the upper end portion 421a of the outer tubular portion 421 of the first intermediate member 46, which is securely coupled to the support shaft 41, is engaged with the lower end portion (engaging portion) 303a of the shaft stopper 303, so that the removal of the support shaft 41 from the receiver 310 is limited. Thereby, the engaged state, which enables the slide movement between the support shaft 41 and the receiver 310, is maintained, and the stabilization of the installation position of the integrated components 20, 30, 50, 60 can be maintained for a long period of time. Thereby, the versatility of the fuel supply apparatus 101 can be improved regardless of the difference in the specifications and manufacturing tolerances of the fuel tank and/or the amount of deformation of the fuel tank.

The resilient member 43, which aids in the stabilization of the installation position of the integrated components 20, 30, 50, 60, is received not only in the support shaft 41 but also in the receiver 310, in which the support shaft 41 is received. Thereby, the resilient member 43 is entirely covered by the support shaft 41 and the receiver 310, so that the exposure of the resilient member 43 in the inside of the fuel tank 2 is limited. Furthermore, the support shaft 41 can maintain the engagement of the support shaft 41 relative to the receiver 310 through the engagement of the lower end portion (engaging portion) 303a of the shaft stopper 303 with the upper end portion 421a of the outer tubular portion 421 discussed above. Therefore, the support shaft 41 and the receiver 310 can limit the exposure of the resilient member 43 for a long period of time. Therefore, even when the integrated components 20, 30, 50, 60 are moved relative to the support shaft 41 due to, for example, the deformation of the fuel tank 2, the resilient member 43 will not interfere with, for example, the curved flexible electrical lines 57, 67 and the curved flexible tube 58. Thus, it is possible to limit or reduce the generation of the noises, which would be generated upon occurrence of the interference between the resilient member 43 and the other component(s) of the fuel supply apparatus 101.

Furthermore, the resilient member 43, which is the coil spring, is supported along the axial direction by the support portions 420d, 310d, which project at the upper and lower locations, respectively, of the resilient member 43. Therefore, buckling of the resilient member 43 is limited when the resilient member 43 is resiliently deformed in response to the movement of the pump unit 50 relative to the support shaft 41. Thus, it is possible to limit or reduce generation of the noises, which would be generated upon occurrence of the interference between the resilient member 43, which is received in the support shaft 41 and the receiver 310, and the other component(s) of the fuel supply apparatus 101.

Seventeenth Embodiment

Figure 67:
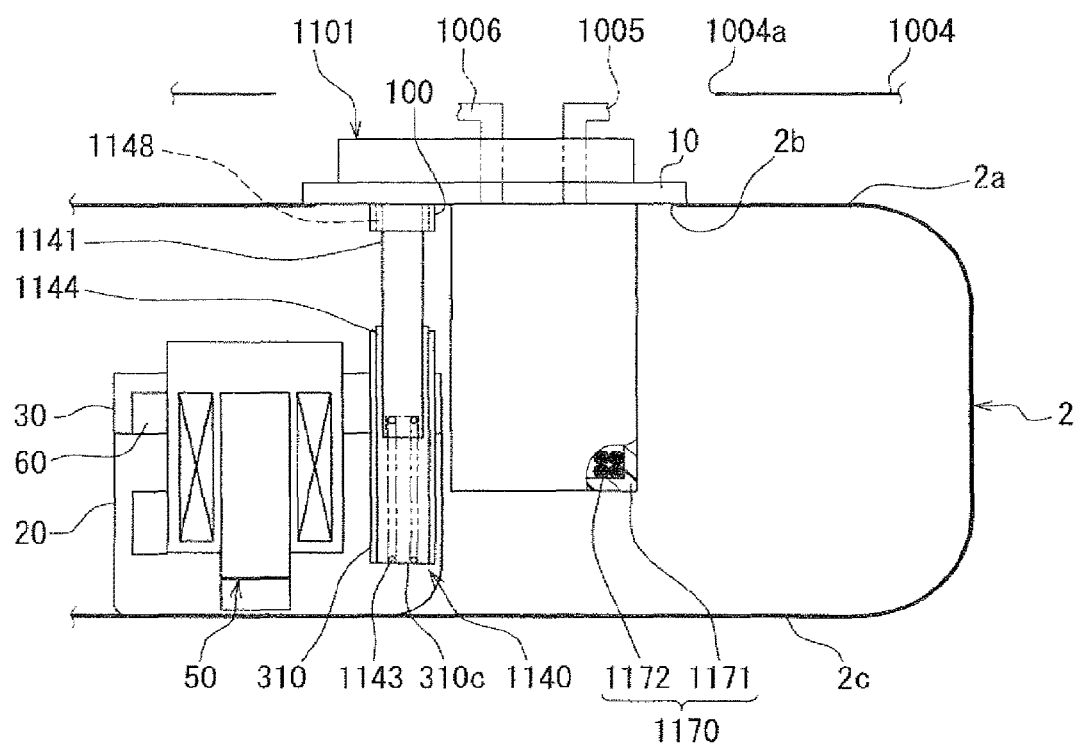
FIG. 67 is a schematic cross-sectional view showing a fuel supply apparatus according to a seventeenth embodiment of the present invention.

A seventeenth embodiment of the present invention is a modification of the sixteenth embodiment. In the seventeenth embodiment, as shown in FIG. 67, the top plate portion 2a of the fuel tank 2 is spaced downward from a floor 1004, which forms a maintenance hole 1004a in the vehicle. Furthermore, the top plate portion 2a of the fuel tank 2 has the through-hole 2b, which serves as an upper opening of the fuel tank 2 and is generally coaxial with the maintenance hole 1004a. In the fuel supply apparatus 1101 of the seventeenth embodiment, which is installed to the fuel tank 2 described above, a canister 1170 is fixed to the flange 10.

The canister 1170 includes an adsorbent material 1172, which is filled in a casing 1171. The casing 1171 is made of a resin material and is configured into a hollow body. The casing 1171 is fixed to the flange 10 such that the casing 1171 is placed within a projected area of the flange 10 located below the flange 10, i.e., is located within a radial extent of the flange 10. An inside of the casing 1171 is communicated with a vapor intake conduit 1005 and a vapor purge conduit 1006, which are exposed at the outside of the fuel tank 2, through the flange 10. The vapor intake conduit 1005 is also communicated with the inside of the fuel tank 2 trough a different point that is different from the through-hole 2b. The vapor intake conduit 1005 guides the fuel vapor, which is generated in the inside of the fuel tank 2, into the casing 1171. The vapor purge conduit 1006 is communicated with an air intake passage (not shown) of the internal combustion engine and purges the fuel vapor from the inside of the casing 1171 into the air intake passage.

The adsorbent material 1172 is, for example, activated carbon and adsorbs the fuel vapor, which is guided from the vapor intake conduit 1005 into the casing 1171. The fuel vapor, which is adsorbed to the adsorbent material 1172, is desorbed from the adsorbent material under the influence of the negative pressure exerted from the air intake passage through the vapor purge conduit 1006 and is thereby drawn into the air intake passage.

Figure 68:
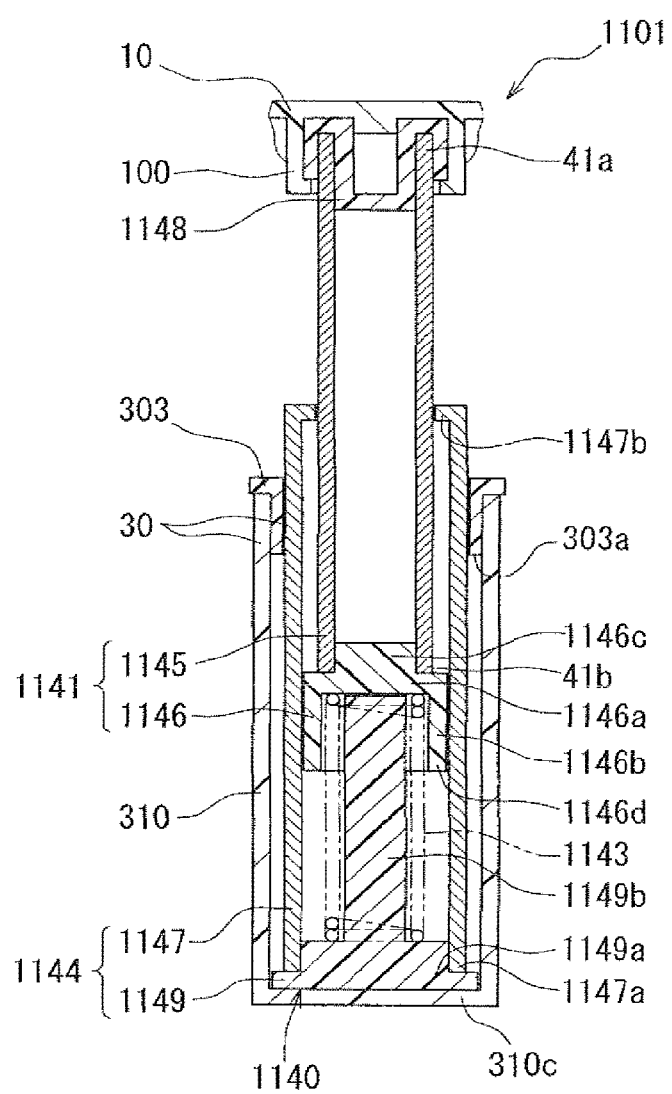
FIG. 68 is a longitudinal cross-sectional view showing an adjusting mechanism of the fuel supply apparatus of the seventeenth embodiment.

As shown in FIGS. 67 and 68, in the fuel supply apparatus 1101 of the seventeenth embodiment, the adjusting mechanism 1140 includes two support shafts, i.e., a lower support shaft 1144 and an upper support shaft 1141, which are coupled to each other, as well as an intermediate member 1148 and a resilient member 1143. Structures of the intermediate member 1148 and the resilient member 1143 are substantially the same as the structures of the second intermediate member 48 and the resilient member 43.

Figure 70:
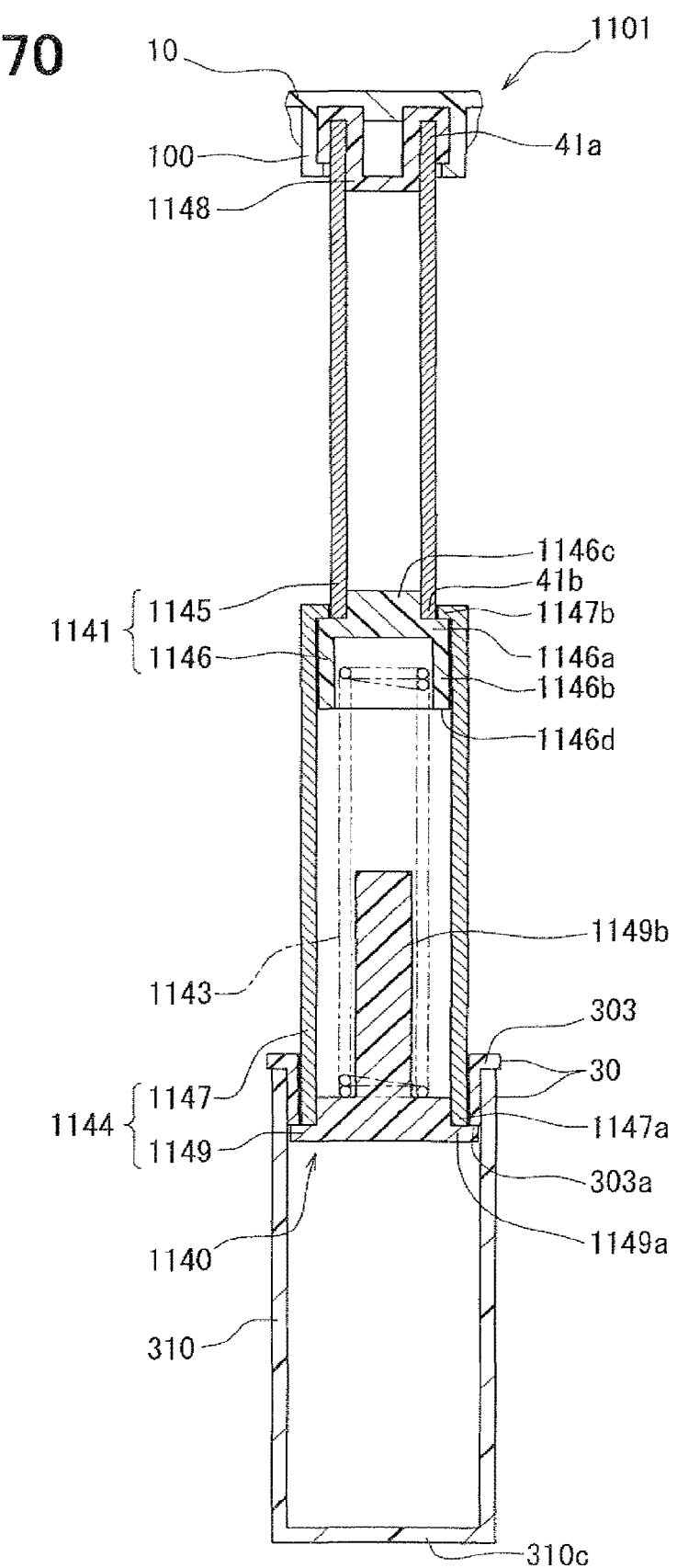
FIG. 70 is a cross-sectional view showing the adjusting mechanism of the fuel supply apparatus of the seventeenth embodiment in a state, which is different from that of FIG. 68.
Figure 72:
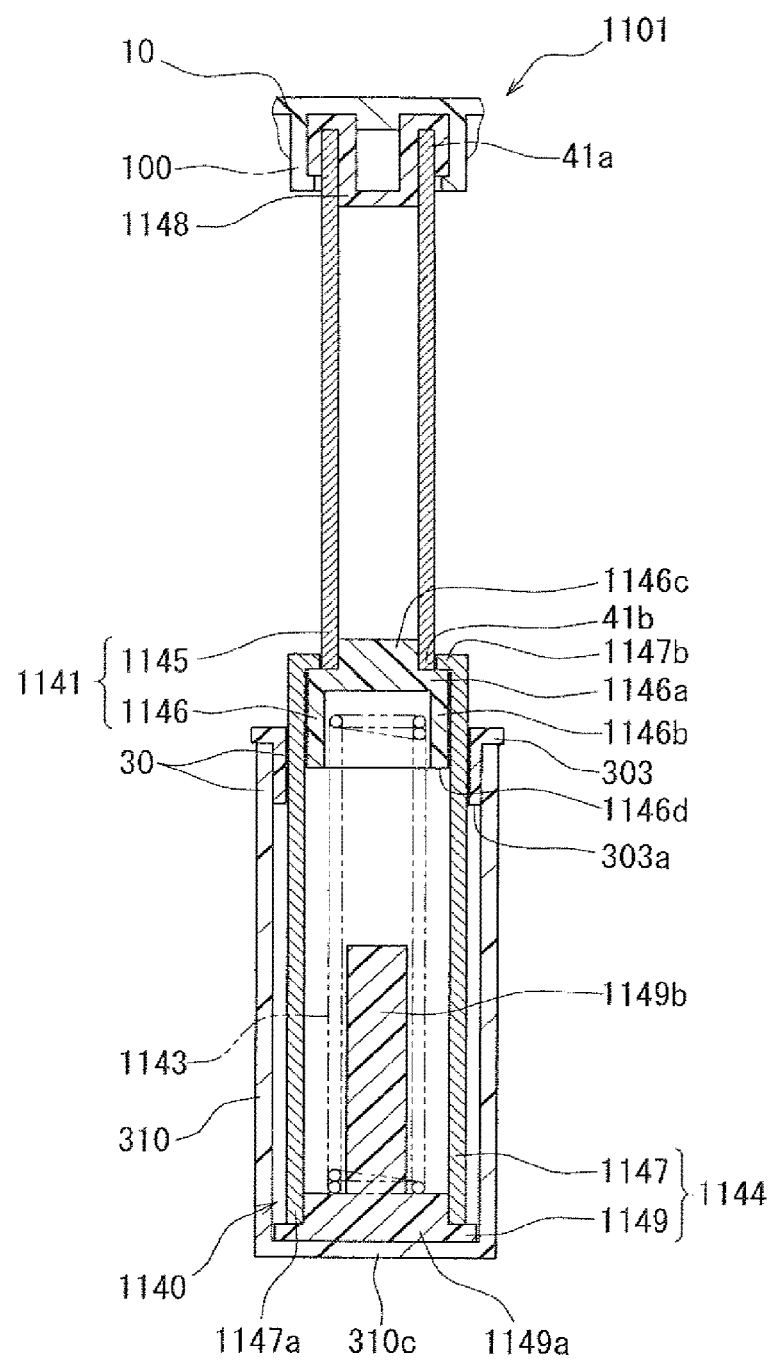
FIG. 72 is a cross-sectional view showing the adjusting mechanism of the fuel supply apparatus of the seventeenth embodiment in a state, which is different from that of FIG. 68 or 70.

As shown in FIGS. 68, 70 and 72, the lower support shaft 1144 includes a lower shaft main body 1147 and a lower cap 1149, which are assembled together. The lower shaft main body 1147 is made of a metal material and is configured into an elongated cylindrical tubular body. The lower shaft main body 1147 is received in the receiver 310 and is axially slidable relative to the receiver 310 in a coaxial manner. The lower cap 1149 is made of a resin material and is received in the receiver 310. In the lower cap 1149, a fixing plate portion 1149a, which is configured into a circular disk plate from, is coaxially fixed to a lower end portion 1147a of the lower shaft main body 1147 by press-fitting or welding. In the lower support shaft 1144, the lower end portion 1147a of the lower shaft main body 1147 is covered with the fixing plate portion 1149a, so that the lower support shaft 1144 is configured into a cup-shaped body (a cylindrical tubular body with a closed bottom), in which the fixing plate portion 1149a serves as a bottom portion of the lower support shaft 1144.

With the above construction, the lower support shaft 1144 is slidably received in the receiver 310. In the lower support shaft 1144, the fixing plate portion 1149a, which is opposed to the bottom portion 310c of the receiver 310, is adapted to engage with the bottom portion 310c of the receiver 310 when the lower support shaft 1144 is placed to an inserting-side movable end thereof upon movement of the lower support shaft 1144 in an inserting direction thereof toward the bottom portion 310c of the receiver 310, as shown in FIGS. 68 and 72.

As shown in FIGS. 68, 70 and 72, the upper support shaft 1141 includes an upper shaft main body 1145 and an upper cap 1146, which are assembled together. The structure of the upper shaft main body 1145 is substantially the same as that of the support shaft 41 of the sixteenth embodiment except that the upper shaft main body 1145 is received into the lower shaft main body 1147 of the lower support shaft 1144. The upper cap 1146 is made of a resin material and is configured into an inverted cup-shaped body (an inverted cylindrical tubular body with a closed bottom), which is partially exposed into and received in the lower shaft main body 1147. A bottom portion 1146a of the upper cap 1146 serves as an opposing portion, which is axially opposed to the fixing plate portion 1149a of the lower cap 1149. In the upper cap 1146, a projection 1146c, which is configured into a cylindrical form and axially projects upward from the bottom portion 1146a of the upper cap 1146, is coaxially fixed to the lower end portion 41b of the upper shaft main body 1145 by press-fitting or welding.

Figure 71:
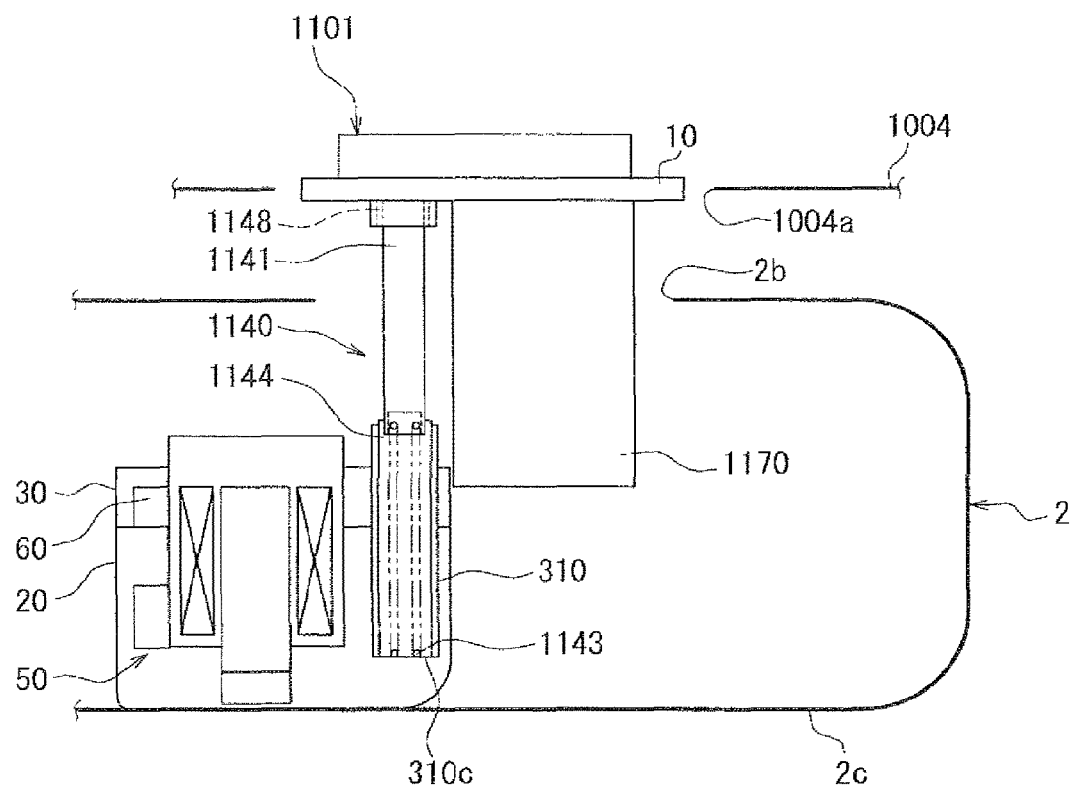
FIG. 71 is a schematic cross-sectional view showing the fuel supply apparatus of the seventeenth embodiment in a state, which is different from that of FIG. 67 or 69.

With the above construction, the upper support shaft 1141 is axially slidably received in the lower support shaft 1144 in a coaxial manner. In the state of FIGS. 68 and 72 where the lower support shaft 1144 is moved to the inserting-side movable end thereof and is thereby engaged with the bottom portion 310c of the receiver 310, the upper support shaft 1141 is received in the receiver 310 through the lower support shaft 1144 and is axially slidable relative to the receiver 310 in a coaxial manner. Here, the states of FIGS. 68 and 72, in which the lower support shaft 1144 is reached to the inserting-side movable end thereof, is achieved when the integrated components 20, 30, 50, 60 are placed in the inside of the fuel tank 2 such that the integrated components 20, 30, 50, 60 laterally outwardly project from the flange 10 on the lower side of the flange 10, as shown in FIGS. 67 and 71. Therefore, the integrated components 20, 30, 50, 60 are placed in the inside of the fuel tank 2 in the state where the lower support shaft 1144 is engaged with the bottom portion 310c of the receiver 310, and the integrated components 20, 30, 50, 60 are axially movable relative to the upper support shaft 1141, which connects between the flange 10 and the integrated components 20, 30, 50, 60.

As shown in FIGS. 68, 70 and 72, the bottom portion (opposing portion) 1146a of the upper cap 1146 is located above a lower end portion 1146d of the upper cap 1146, which corresponding to a lower end portion of the upper support shaft 1141. The bottom portion (opposing portion) 1146a of the upper cap 1146 clamps the resilient member 1143 in corporation with the fixing plate portion 1149a of the lower support shaft 1144, i.e., clamps the resilient member 1143 between the fixing plate portion 1149a and the bottom portion (opposing portion) 1146a. In this way, the resilient member 1143, which is the coil spring, is coaxially received in the upper and lower support shafts 1141, 1144 and exerts the restoring force (urging force) between the upper support shaft 1141 and the lower support shaft 1144 due to the resiliently compressed deformation of the resilient member 43 therebetween. Thus, in the state, in which the lower support shaft 1144 is reached to the inserting-side movable end, as shown in FIG. 68, the resilient member 1143 exerts the restoring force against the bottom portion 310c of the receiver 310 through the fixing plate portion 1149a that is engaged to the bottom portion 310c. Thereby, the integrated components 20, 30, 50, 60, which include the bottom portion 310c of the receiver 310 of the cover member 30, are urged toward the bottom portion 2c of the fuel tank 2.

Furthermore, as shown in FIGS. 68, 70 and 72, the upper cap 1146 of the upper support shaft 1141 has a tubular portion 1146b, which projects downward from the bottom portion (opposing portion) 1146a of the upper cap 1146 that is located above the resilient member 1143. The tubular portion 1146*b* serves as a support portion. The lower cap 1149 of the lower support shaft 1144 integrally has a support portion 1149*b*, which is configured into a cylindrical form and projects upwardly from the fixing plate portion 1149*a* of the lower cap 1149 located on the lower side of the resilient member 1143. The tubular portion (support portion) 1146*b* axially extends at a location radially outward of the coil spring, i.e., the resilient member 1143, and the support portion 1149*b* axially extends at a location radially inward of the coil spring, i.e., the resilient member 1143. Thereby, the tubular portion (support portion) 1146*b* and the support portion 1149*b* support the coil spring, i.e., the resilient member 1143 along the axial direction.

The lower shaft main body 1147 of the lower support shaft 1144 is axially slidably received in the shaft stopper 303, which is the portion of the cover member 30 and is coaxially fixed to the receiver 310 by the press-fitting or welding. The lower end portion 303*a* of the shaft stopper 303 is axially opposed to an outer peripheral part of the fixing plate portion 1149*a* of the lower cap 1149 of the lower support shaft 1144. In this way, as shown in FIG. 70, the lower end portion 303*a* serves as an engaging portion and is adapted to engage with the lower support shaft 1144 (more specifically, the fixing plate portion 1149*a* of the lower cap 1149) when the lower support shaft 1144 is placed to a removing-side movable end thereof upon movement of the lower support shaft 1144 in a removing direction thereof away from the receiver 310 (more specifically, the bottom portion 310*c* of the receiver 310). An upper end portion 1147*b* of the lower shaft main body 1147, which radially inwardly project, is opposed to the bottom portion (opposing portion) 1146*a* of the upper cap 1146 of the upper support shaft 1141. Thereby, as shown in FIGS. 70 and 72, the upper end portion 1147*b* serves as an engaging portion and is adapted to engage with the upper support shaft 1141 (more specifically, the bottom portion 1146*a* of the upper cap 1146) when the upper support shaft 1141 is placed to a removing-side movable end thereof upon movement of the upper support shaft 1141 in a removing direction thereof away from the lower support shaft 1144.

Figure 69:
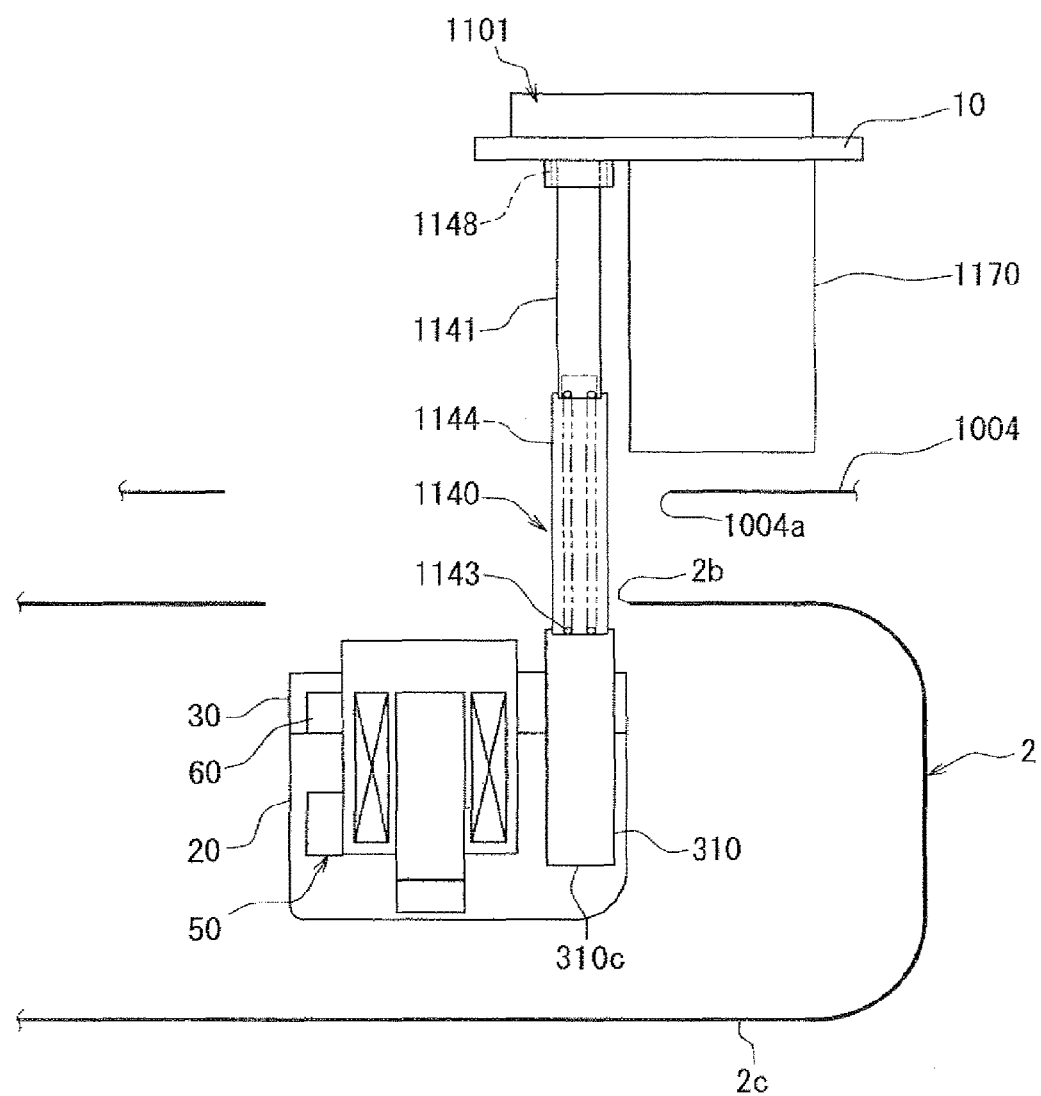
FIG. 69 is a schematic cross-sectional view showing the fuel supply apparatus of the seventeenth embodiment in a state, which is different from that of FIG. 67.

In the seventeenth embodiment, at the time of installing the fuel supply apparatus 1101 to the fuel tank 2, as shown in FIGS. 69 and 70, the lower support shaft 1144 is slid to the removing-side movable end thereof in the removing direction away from the receiver 310, and the upper support shaft 1141 is slid to the removing-side movable end thereof relative to the lower support shaft 1144 in the removing direction away from the lower support shaft 1144. In this way, the integrated components 20, 30, 50, 60 are installed into the inside of the fuel tank 2 through the through-hole 2*b* in the state where the distance of the integrated components 20, 30, 50, 60, which is measured from the flange 10, is maximized.

Then, as shown in FIG. 71, the integrated components 20, 30, 50, 60 are displaced to laterally outwardly project from the flange 10 on the lower side of the flange 10. Furthermore, as shown in FIGS. 71 and 72, the lower support shaft 1144 is inserted into the inside of the receiver 310 by downwardly sliding the lower support shaft 1144. In this way, the canister 1170, which is placed on the lower side of the flange 10, passes through the through-hole 2*b*, and the lower support shaft 1144 and the sub-tank 20 are engaged with the bottom portion 310*c* of the receiver 310 and the bottom portion 2*c* of the fuel tank 2, respectively.

Furthermore, with reference to FIGS. 67 and 68, the flange 10 is installed to the through-hole 2*b* upon inserting the upper support shaft 1141 into the lower support shaft 1144 by downwardly sliding the upper support shaft 1141. Thereby, the canister 1170, which is placed in the inside of the fuel tank 2, is located around the integrated components 20, 30, 50, 60, which laterally outwardly project from the flange 10 on the lower side of the flange 10. Thus, the removing performance for removing the fuel vapor is improved by the operational heat of the fuel pump 52 of the pump unit 50.

In the state where the integrated components 20, 30, 50, 60 are placed in the inside of the fuel tank 2, the lower support shaft 1144, which receives the restoring force from the resilient member 1143 held between the upper support shaft 1141 and the lower support shaft 1144, is engaged with the bottom portion 310*c* of the receiver 310. Therefore, the restoring force of the resilient member 1143 is exerted against the receiver 310 through the lower support shaft 1144, and thereby the installation position of the integrated components 20, 30, 50, 60, which includes the receiver 310 of the cover member 30, is always stabilized relative to the bottom portion 2*c* of the fuel tank 2. Furthermore, as shown in FIG. 70, when the lower support shaft 1144 is engaged with the lower end portion (engaging portion) 303*a* of the shaft stopper 303, removal of the lower support shaft 1144 from the receiver 310 is limited. Furthermore, as shown in FIGS. 70 and 72, when the upper support shaft 1141 is engaged with the upper end portion (engaging portion) 1147*b* of the lower shaft main body 1147, removal of the upper support shaft 1141 from the lower support shaft 1144 is limited. With the above removal limitations, the installation position of the integrated components 20, 30, 50, 60 can be stabilized for a long period of time while maintaining the slidable connection of the lower support shaft 1144 relative to each of the receiver 310 and the upper support shaft 1141. Therefore, even in the seventeenth embodiment, the versatility of the fuel supply apparatus 1101 can be improved.

Furthermore, the resilient member 1143 is received in the upper support shaft 1141 and the lower support shaft 1144, which are inserted into the receiver 310, so that the resilient member 1143 is completely covered with the upper support shaft 1141 and the lower support shaft 1144, and thereby exposure of the resilient member 1143 in the fuel tank 2 is limited. Furthermore, when the upper support shaft 1141 is engaged with the upper end portion (engaging portion) 1147*b* of the lower shaft main body 1147, the removal of the upper support shaft 1141 from the lower support shaft 1144 is limited, and thereby the upper support shaft 1141 and the lower support shaft 1144 can limit the exposure of the resilient member 1143 for a long period of time. Thus, even in the seventeenth embodiment, it is possible to limit or reduce the generation of the noises, which would be generated upon occurrence of the interference between the resilient member 43 and the other component (e.g., the flexible electrical lines 57, 67, the flexible tube 58) of the fuel supply apparatus 1101.

Furthermore, the resilient member 1143, which is the coil spring, is supported along the axial direction by the tubular portion (support portion) 1146*b* and the support portion 1149*b*, which project at the upper and lower locations, respectively, of the resilient member 1143. Therefore, buckling of the resilient member 1143 is limited. Thus, it is possible to limit or reduce generation of the noises, which would be generated upon occurrence of the interference between the upper and lower support shafts 1141, 1144 and the resilient member 1143 received therein.

Eighteenth Embodiment

Figure 73:
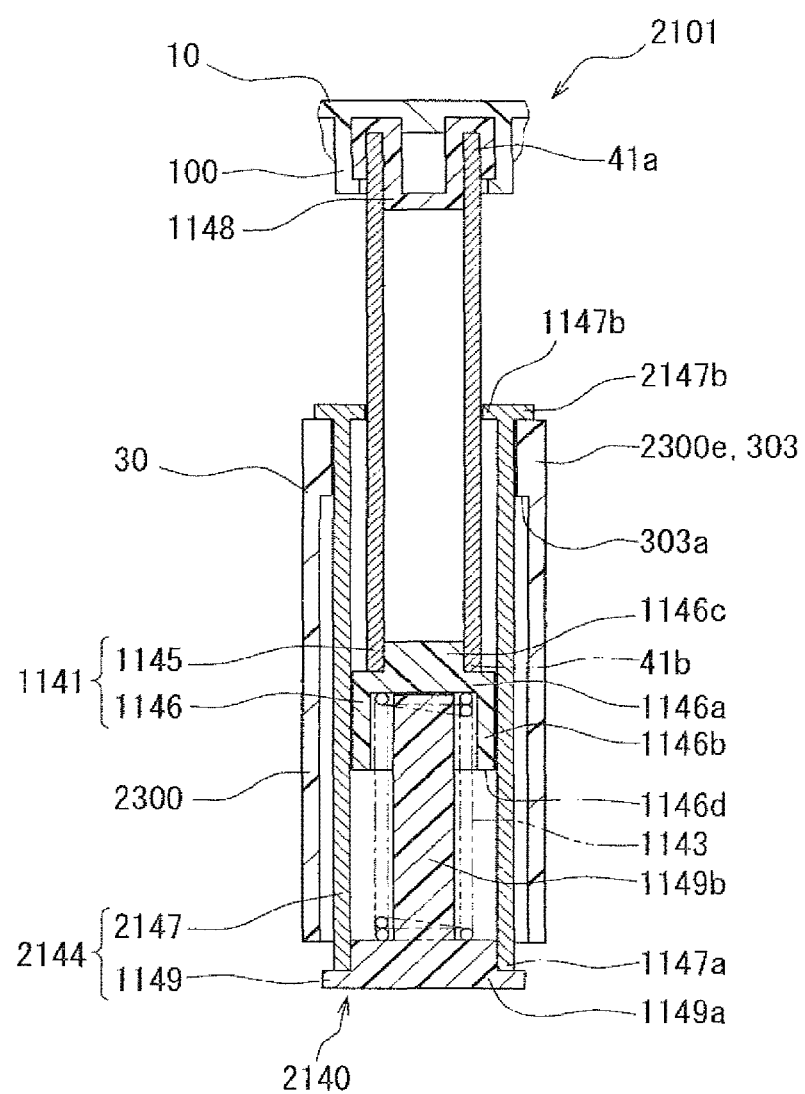
FIG. 73 is a longitudinal cross-sectional view showing an adjusting mechanism of a fuel supply apparatus according to an eighteenth embodiment of the present invention.
Figure 74:
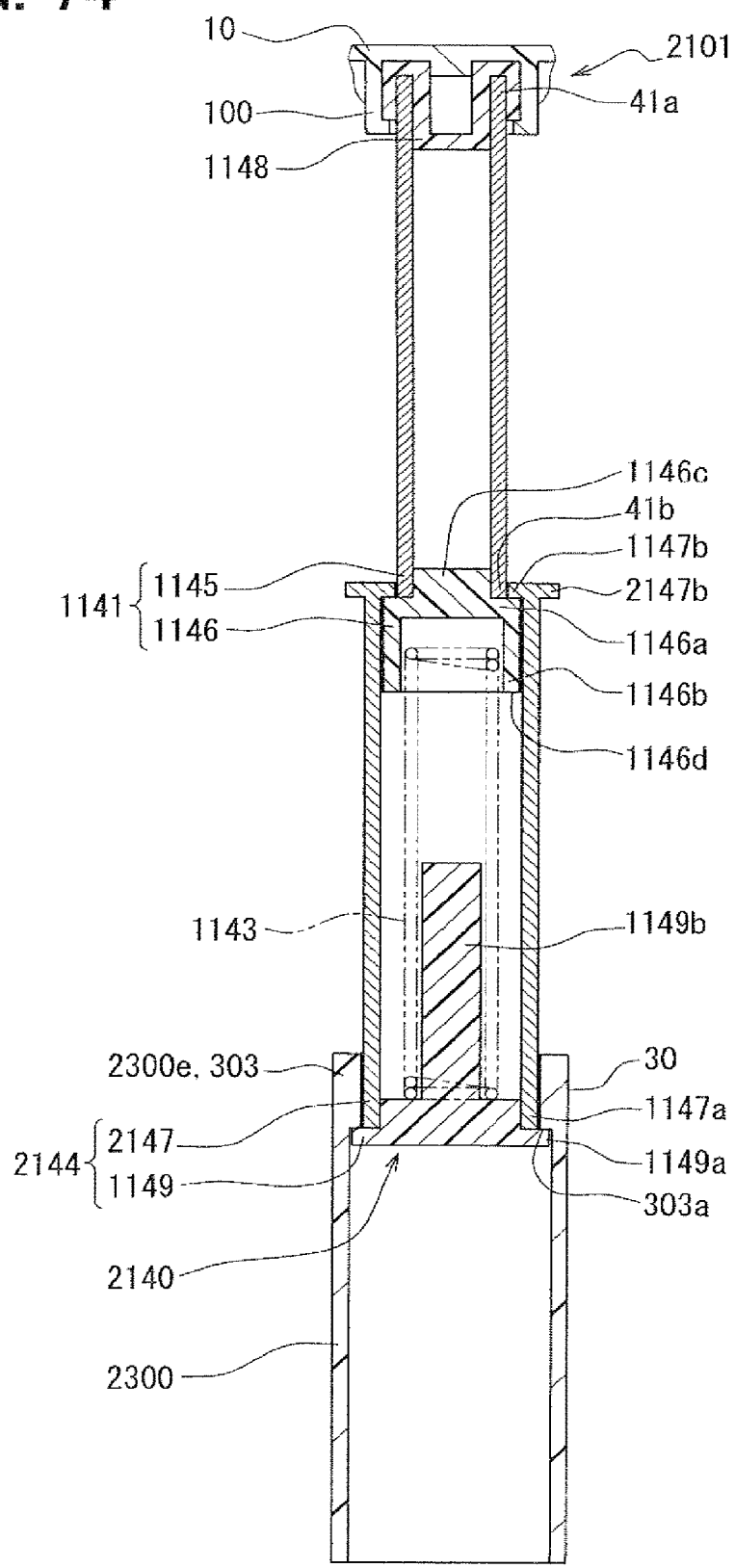
FIG. 74 is a longitudinal cross-sectional view showing the adjusting mechanism of the fuel supply apparatus of the eighteenth embodiment in a state, which is different from that of FIG. 73.
Figure 75:
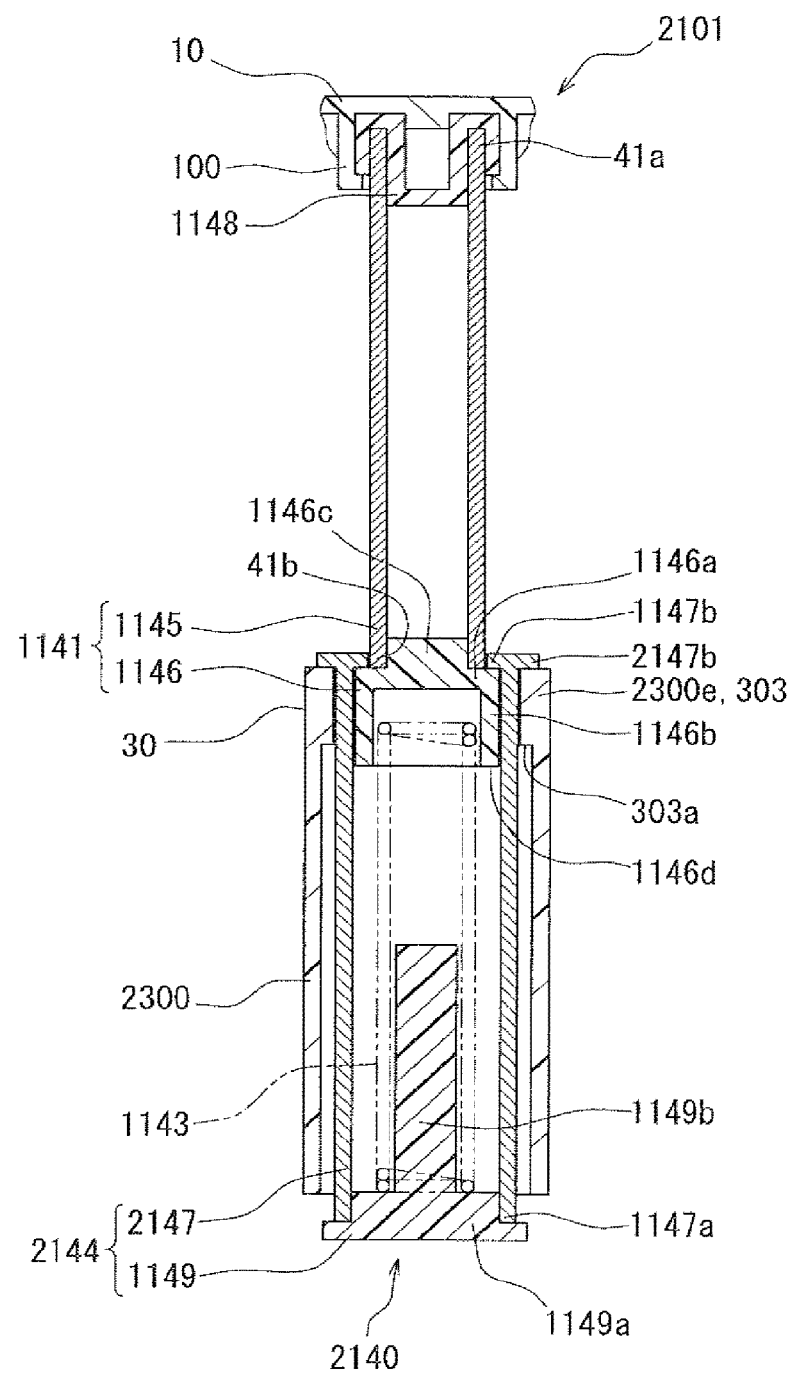
FIG. 75 is a longitudinal cross-sectional view showing the adjusting mechanism of the fuel supply apparatus of the eighteenth embodiment in a state, which is different from that of FIG. 73 or 74.

An eighteenth embodiment of the present invention is a modification of the seventeenth embodiment. As shown in FIGS. 73 to 75, a receiver (also referred to as an opening)

2300 of a fuel supply apparatus 2101 of the eighteenth embodiment is configured into a bottomless cylindrical tubular body without having the bottom portion 310c of the seventeenth embodiment. An upper end portion 2300e of the receiver 2300 forms the shaft stopper 303, which has the lower end portion (engaging portion) 303a. The shaft stopper 303 of the present embodiment can be integrally resin molded together with the receiver 2300, so that it is possible to reduce the number of the components and the costs.

Furthermore, a lower support shaft 2144, which is provided in an adjusting mechanism 2140 of the fuel supply apparatus 2101, has a flange portion 2147b, which radially outwardly projects from the upper end portion 1147b of a lower shaft main body 2147 of the lower support shaft 2144 and is axially opposed to the upper end portion 2300e of the receiver 2300. Thereby, as shown in FIGS. 73 and 75, the flange portion 2147b can be engaged with the upper end portion 2300e when the lower support shaft 2144 is moved in the inserting direction toward the inside of the receiver 2300.

In the eighteenth embodiment, in the installed state where the integrated components 20, 30, 50, 60 are placed in the inside of the fuel tank 2, the lower support shaft 2144, which receives the restoring force from the resilient member 1143 held between the upper support shaft 1141 and the lower support shaft 2144, is engaged to the upper end portion 2300e of the receiver 2300, as shown in FIG. 73. Therefore, the restoring force of the resilient member 1143 is exerted against the receiver 2300 through the lower support shaft 2144, and thereby the installation position of the integrated components 20, 30, 50, 60, which includes the receiver 2300 of the cover member 30, is always stabilized relative to the bottom portion 2c of the fuel tank 2. Furthermore, as shown in FIG. 74, when the lower support shaft 2144 is engaged with the lower end portion (engaging portion) 303a of the shaft stopper 303, removal of the lower support shaft 2144 from the receiver 2300 is limited. Furthermore, as shown in FIGS. 74 and 75, when the upper support shaft 1141 is engaged with the upper end portion (engaging portion) 1147b of the lower support shaft 2144, removal of the upper support shaft 1141 from the lower support shaft 2144 is limited. With the above removal limitations, the installation position of the integrated components 20, 30, 50, 60 can be stabilized for a long period of time while maintaining the slidable connection of the lower support shaft 2144 relative to each of the receiver 2300 and the upper support shaft 1141. Therefore, even in the eighteenth embodiment, the versatility of the fuel supply apparatus 2101 can be improved.

Nineteenth Embodiment

Figure 76:
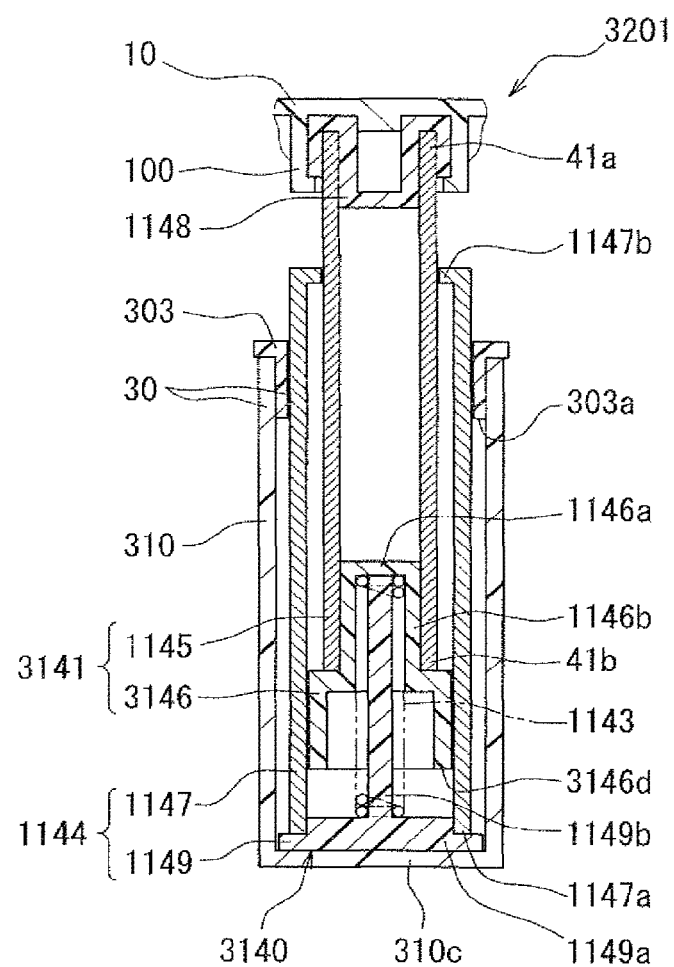
FIG. 76 is a longitudinal cross-sectional view showing an adjusting mechanism of a fuel supply apparatus according to a nineteenth embodiment of the present invention.
Figure 77:
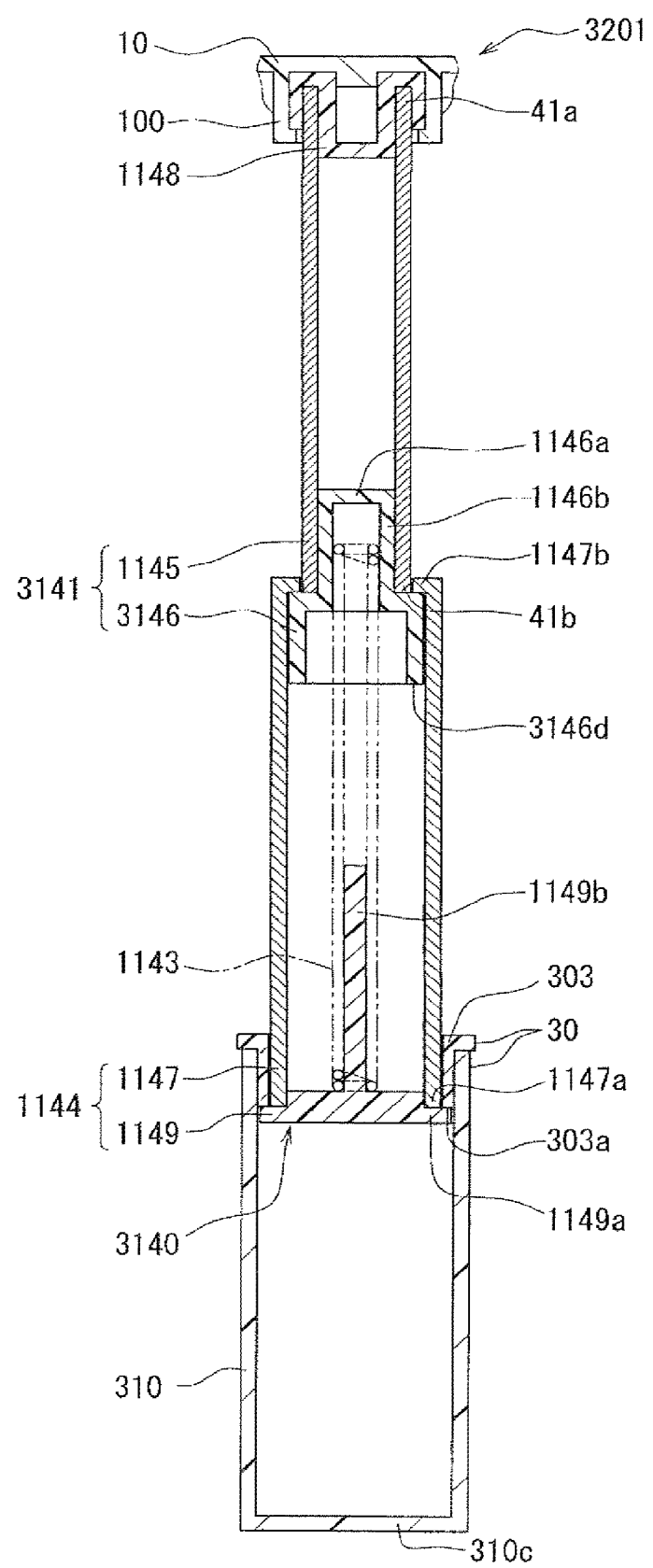
FIG. 77 is a longitudinal cross-sectional view showing the adjusting mechanism of the fuel supply apparatus of the nineteenth embodiment in a state, which is different from that of FIG. 76.
Figure 78:
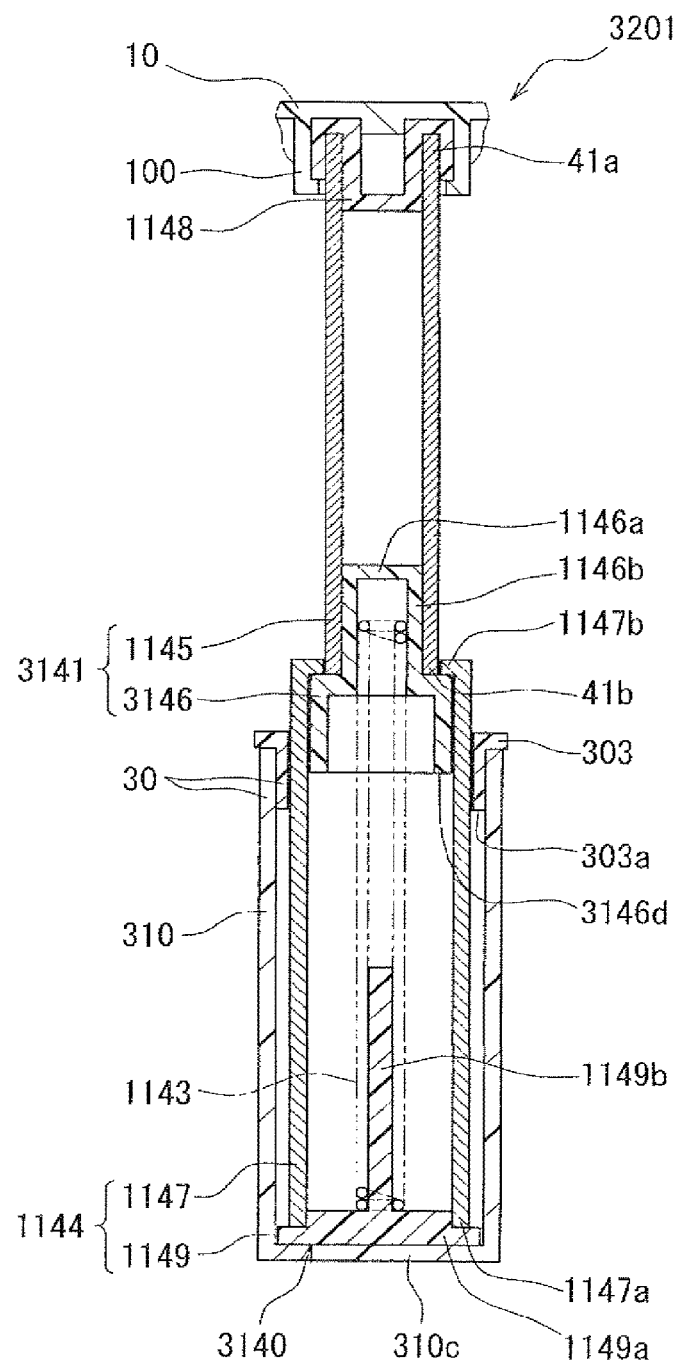
FIG. 78 is a longitudinal cross-sectional view showing the adjusting mechanism of the fuel supply apparatus of the nineteenth embodiment in a state, which is different from that of FIG. 76 or 77.

A nineteenth embodiment of the present invention is a modification of the seventeenth embodiment. As shown in FIGS. 76 to 78, in an upper support shaft 3141, which is provided in an adjusting mechanism 3140 of a fuel supply apparatus 3201 of the nineteenth embodiment, an upper cap 3146, which is configured into an inverted cup-shaped body (a cylindrical tubular body with a closed bottom), has the tubular portion (support portion) 1146b that is coaxially fixed to the upper shaft main body 1145. Thereby, the bottom portion (opposing portion) 1146a of the upper cap 3146 is located above a lower end portion 3146d of the upper cap 3146 (corresponding to the lower end portion of the upper support shaft 3141 in the present embodiment) and also above the lower end portion 41b of the upper shaft main body 1145.

In the nineteenth embodiment, the resilient member 1143, which is directly clamped between the bottom portion (opposing portion) 1146a of the upper cap 3146 and the fixing plate portion 1149a of the lower cap 1149, is largely received in the inside of the upper support shaft 3141, as shown in FIGS. 76 to 78. In this way, a minimum distance from the flange 10 to the integrated components 20, 30, 50, 60 can be reversibly reduced as shown in FIG. 76. Thereby, the fuel supply apparatus 3201 can be reliably applied to the fuel tank 2, which is generally flat and is shallow.

Twentieth Embodiment

Figure 79:
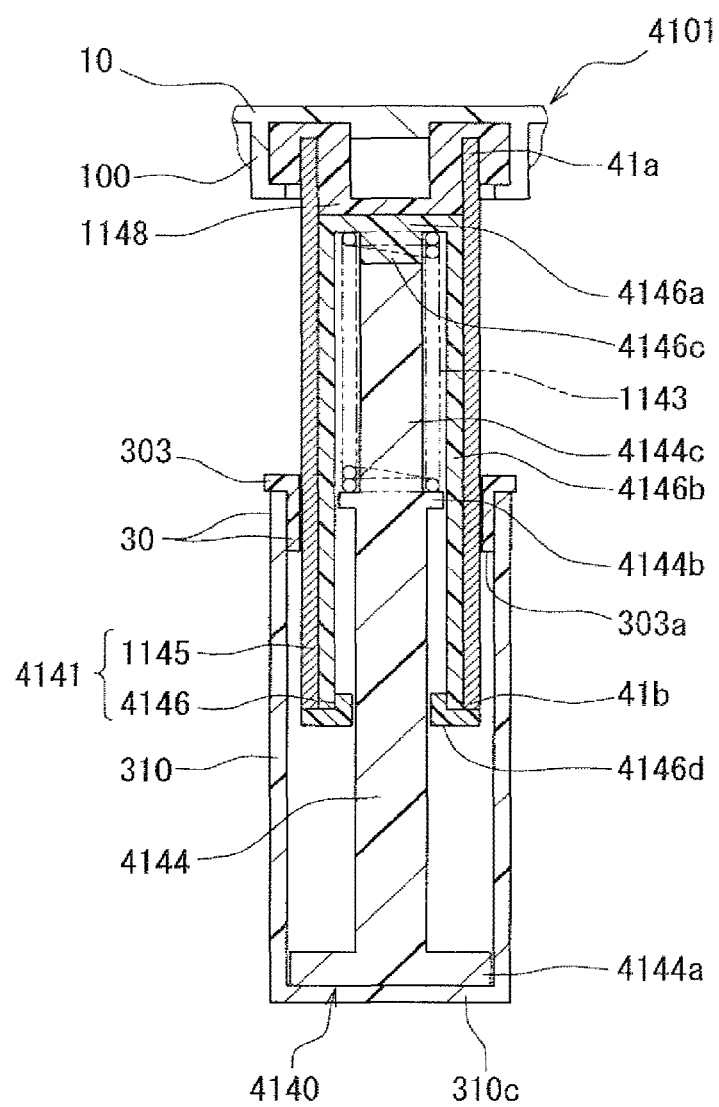
FIG. 79 is a longitudinal cross sectional view showing an adjusting mechanism of a fuel supply apparatus according to a twentieth embodiment of the present invention.
Figure 80:
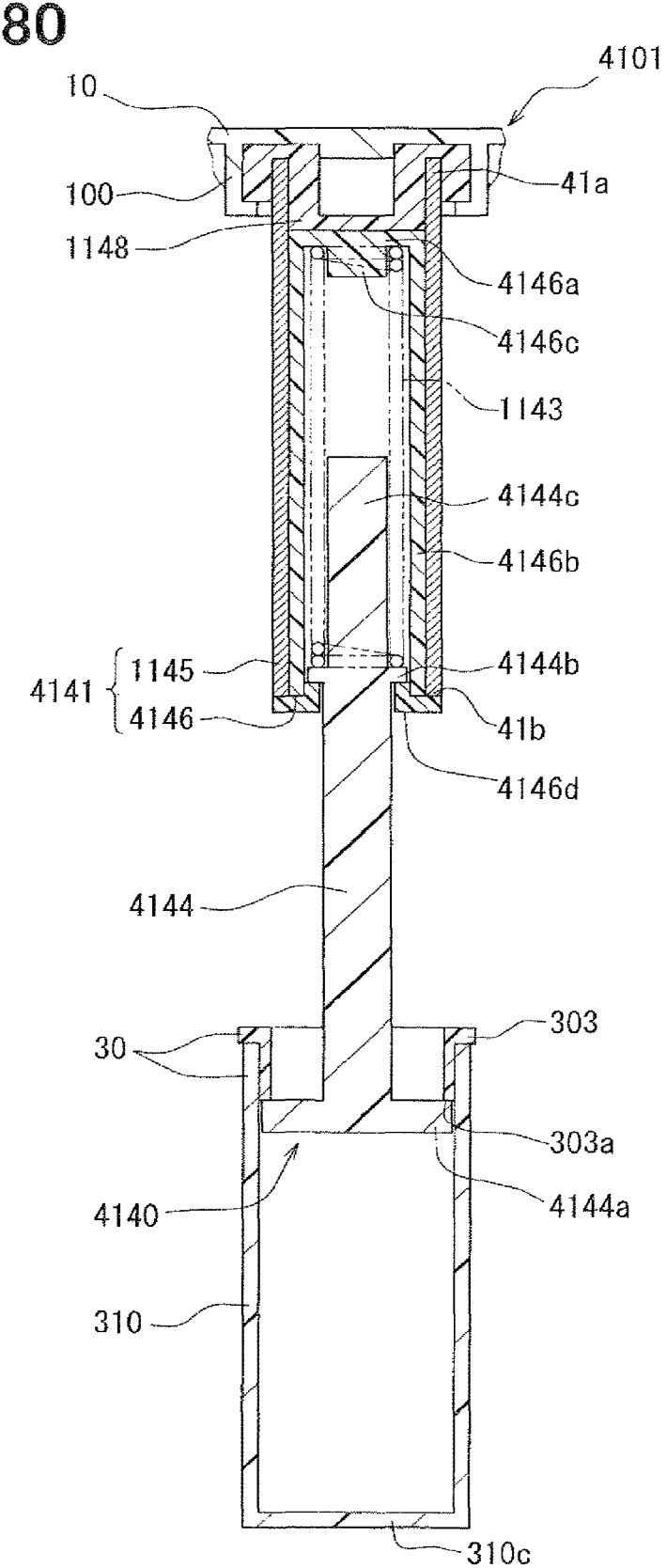
FIG. 80 is a longitudinal cross-sectional view showing the adjusting mechanism of the fuel supply apparatus of the twentieth embodiment in a state, which is different from that of FIG. 79.
Figure 81:
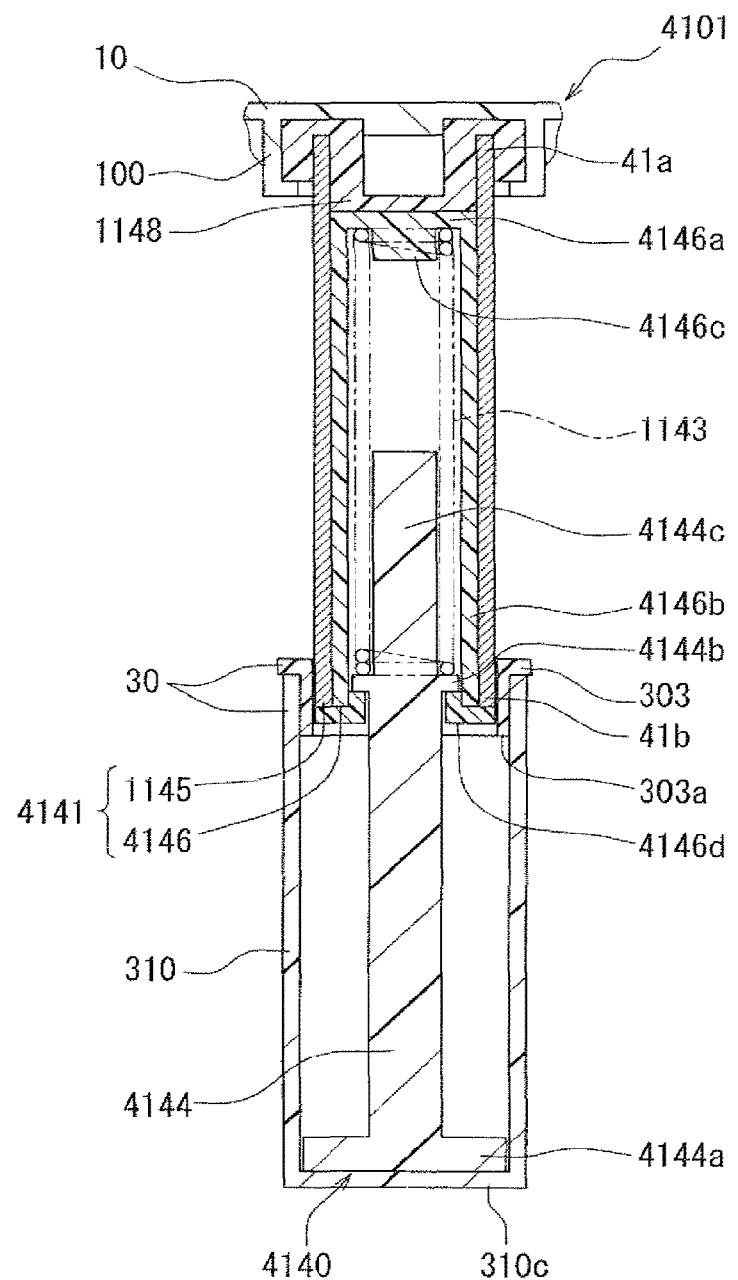
FIG. 81 is a longitudinal cross-sectional view showing the adjusting mechanism of the fuel supply apparatus of the twentieth embodiment in a state, which is different from that of FIG. 79 or 80.

A twentieth embodiment of the present invention is a modification of the seventeenth embodiment. As shown in FIGS. 79 to 81, a lower support shaft 4144, which is provided in an adjusting mechanism 4140 of a fuel supply apparatus 4101 of the twentieth embodiment, is made of a resin material and is configured into an elongated cylindrical body. The lower support shaft 4144 is received in the receiver 310 and is axially slidable relative to the receiver 310 in a coaxial manner. In the lower support shaft 4144, a lower end portion 4144a, which is configured into a radially outwardly projecting flange form and is opposed to the bottom portion 310c of the receiver 310, can be engaged with the bottom portion 310c to limit further movement of the lower support shaft 4144 in the inserting direction, as shown in FIGS. 79 and 81. As shown in FIG. 80, the lower end portion 4144a of the lower support shaft 4144 can be engaged with the lower end portion (engaging portion) 303a of the shaft stopper 303, which is opposed to the lower end portion 4144a of the lower support shaft 4144 in the top-to-bottom direction, when the lower support shaft 4144 is moved to the removing-side movable end thereof in the removing direction away from the receiver 310. Furthermore, a flange portion 4144b is formed in an axial intermediate part of the lower support shaft 4144 and radially outwardly projects.

As shown in FIGS. 79 to 81, in an upper support shaft 4141 of the fuel supply apparatus 4101, a tubular portion 4146b of an upper cap 4146, which is configured into an inverted cup-shaped body (an inverted cylindrical tubular body with a closed bottom), is coaxially fixed to the upper shaft main body 1145, and the lower support shaft 4144 is inserted into the tubular portion 4146b from the lower side thereof. In this way, the lower support shaft 4144 is axially slidably received in the inside of the upper support shaft 4141 in a coaxial manner. In the states of FIGS. 79 and 81 where the lower support shaft 4144 is moved to the inserting-side movable end thereof and is thereby engaged with the bottom portion 310c of the receiver 310, the upper support shaft 4141 is received in the receiver 310 through the lower support shaft 4144 and is axially slidable relative to the receiver 310 in a coaxial manner. Therefore, the integrated components 20, 30, 50, 60, which are received in the inside of the fuel tank 2, are axially movable relative to the upper support shaft 4141, which connects between the flange 10 and the integrated components 20, 30, 50, 60.

As shown in FIGS. 79 to 81, in the upper support shaft 4141, a lower end portion 4146d of the upper cap 4146, which radially inwardly projects, is axially opposed to the flange portion 4144b of the lower support shaft 4144, which is received in the upper cap 4146. In this embodiment, the lower end portion 4146d of the upper cap 4146 is formed separately from a bottom portion 4146a and the tubular portion 4146b of the upper cap 4146 due to a manufacturing convenience. The lower end portion 4146d serves as an engaging portion and is engageable with the flange portion 4144b of the lower support shaft 4144 when the lower support shaft 4144 is moved to a removing-side movable end thereof in a removing direction away from the upper support shaft 4141, as shown in FIGS. 80 and 81. Furthermore, the bottom portion 4146*a* of the upper cap 4146, which is located on an upper side of the lower end portion 4146*d* of the upper cap 4146 of the upper support shaft 4141 and corresponds to the lower end portion of the upper support shaft 4141, serves as an opposing portion, which is axially opposed to the flange portion 4144*b* of the lower support shaft 4144. The resilient member 1143 is directly clamped between the bottom portion (opposing portion) 4146*a* and the flange portion 4144*b*.

With the above construction, the resilient member 1143, which is the coil spring, exerts the restoring force between the upper support shaft 4141 and the lower support shaft 4144 due to the resiliently compressed deformation of the resilient member 1143 therebetween in the state where the resilient member 1143 is received by the upper support shaft 4141 in a coaxial manner on a radially outer side of the lower support shaft 4144. Thus, in the state, in which the lower support shaft 4144 is reached to the inserting-side movable end, as shown in FIG. 79, the resilient member 1143 exerts the restoring force against the bottom portion 310*c* of the receiver 310, to which the lower end portion 4144*a* is engaged. Thereby, the integrated components 20, 30, 50, 60, which include the bottom portion 310*c* of the receiver 310 of the cover member 30, are urged toward the bottom portion 2*c* of the fuel tank 2.

Furthermore, as shown in FIGS. 79 to 81, the upper cap 4146 of the upper support shaft 4141 integrally has a support portion 4146*c*, which is configured into a cylindrical form and projects downward from the bottom portion (opposing portion) 4146*a*, which is located on the upper side of the resilient member 1143. A portion of the lower support shaft 4144, which is configured into a cylindrical form and projects upward from the flange portion 4144*b* located on the lower side of the resilient member 1143, forms a support portion 4144*c*. The support portions 4146*c*, 4144*c* project into the radially inner side of the coil spring, i.e., the resilient member 1143, so that the support portions 4146*c*, 4144*c* support the coil spring, i.e., the resilient member 43 along the axial direction.

In the twentieth embodiment, in the installed state where the integrated components 20, 30, 50, 60 are placed in the inside of the fuel tank 2, the lower support shaft 4144, which receives the restoring force from the resilient member 1143 held between the upper support shaft 4141 and the lower support shaft 4144, is engaged to the bottom portion 310*c* of the receiver 310, as shown in FIG. 79. Therefore, the restoring force of the resilient member 1143 is exerted against the receiver 310 through the lower support shaft 4144, and thereby the installation position of the integrated components 20, 30, 50, 60, which include the receiver 310 of the cover member 30, is always stabilized relative to the bottom portion 2*c* of the fuel tank 2. Furthermore, as shown in FIG. 80, when the lower support shaft 4144 is engaged with the lower end portion (engaging portion) 303*a* of the shaft stopper 303, the removal of the lower support shaft 4144 from the receiver 310 is limited. Also, as shown in FIGS. 80 and 81, when the lower support shaft 4144 is engaged with the lower end portion (engaging portion) 4146*d* of the upper cap 4146, the removal of the lower support shaft 4144 from the upper support shaft 4141 is limited. With the above removal limitations, the installation position of the integrated components 20, 30, 50, 60 can be stabilized for a long period of time while maintaining the slidable connection of the lower support shaft 4144 relative to each of the receiver 310 and the upper support shaft 4141. Therefore, even in the twentieth embodiment, the versatility of the fuel supply apparatus 4101 can be improved.

Furthermore, the resilient member 1143 and the lower support shaft 4144 are received in the upper support shaft 4141, which is inserted into the receiver 310, so that the resilient member 1143 is completely covered with the upper support shaft 4141 and the lower support shaft 4144, and thereby exposure of the resilient member 1143 in the fuel tank 2 is limited. Furthermore, the upper support shaft 4141 can maintain the engaged state between the upper support shaft 4141 and the lower support shaft 4144 through the engagement of the lower end portion (engaging portion) 4146*d* of the upper cap 4146 to the flange portion 4144*b* of the lower support shaft 4144. Therefore, the upper support shaft 4141 and the lower support shaft 4144 can limit the exposure of the resilient member 1143 for a long period of time. Therefore, even in the twentieth embodiment, it is possible to limit or reduce the generation of the noises, which would be generated upon occurrence of the interference between the resilient member 1143 and the other component(s) of the fuel supply apparatus 4101.

Furthermore, the resilient member 1143, which is the coil spring, is supported along the axial direction by the support portions 4146*c*, 4144*c*, which project at the upper and lower locations, respectively, of the resilient member 1143. Therefore, buckling of the resilient member 1143 is limited. Thus, it is possible to limit or reduce generation of the noises, which would be generated upon occurrence of the interference between the upper and lower support shafts 4141, 4144 and the resilient member 1143 received therein.

Twenty-First Embodiment

Figure 82:
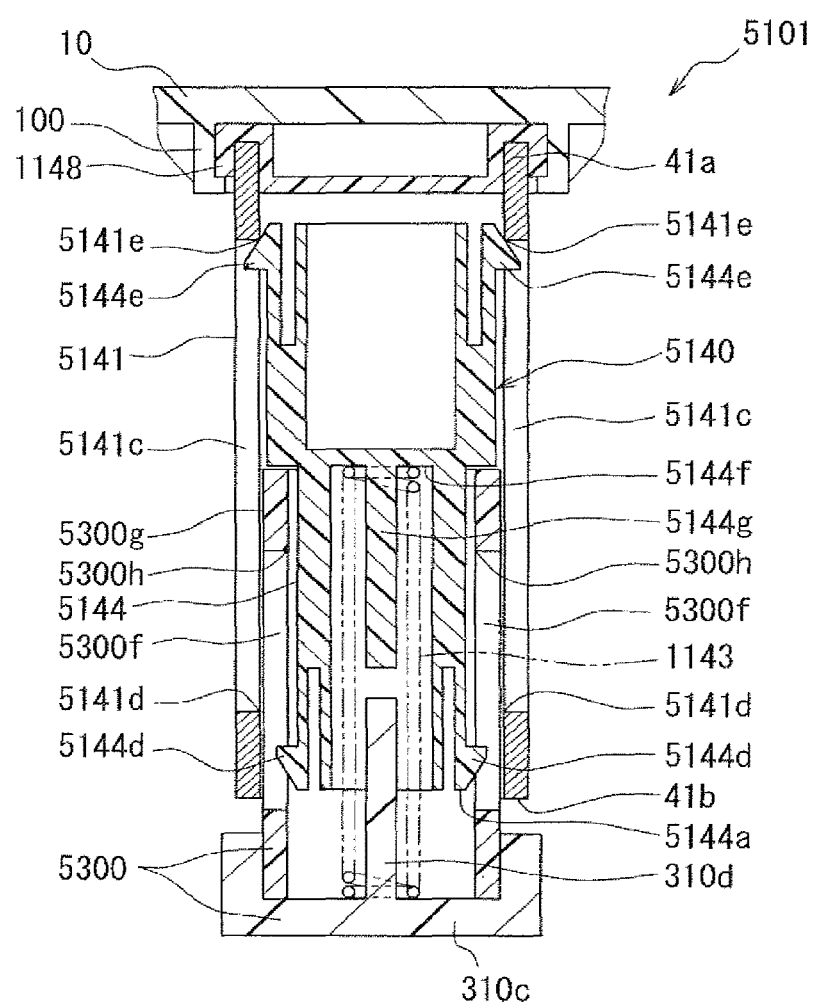
FIG. 82 is a longitudinal cross-sectional view showing an adjusting mechanism of a fuel supply apparatus according to a twenty-first embodiment of the present invention.
Figure 83:
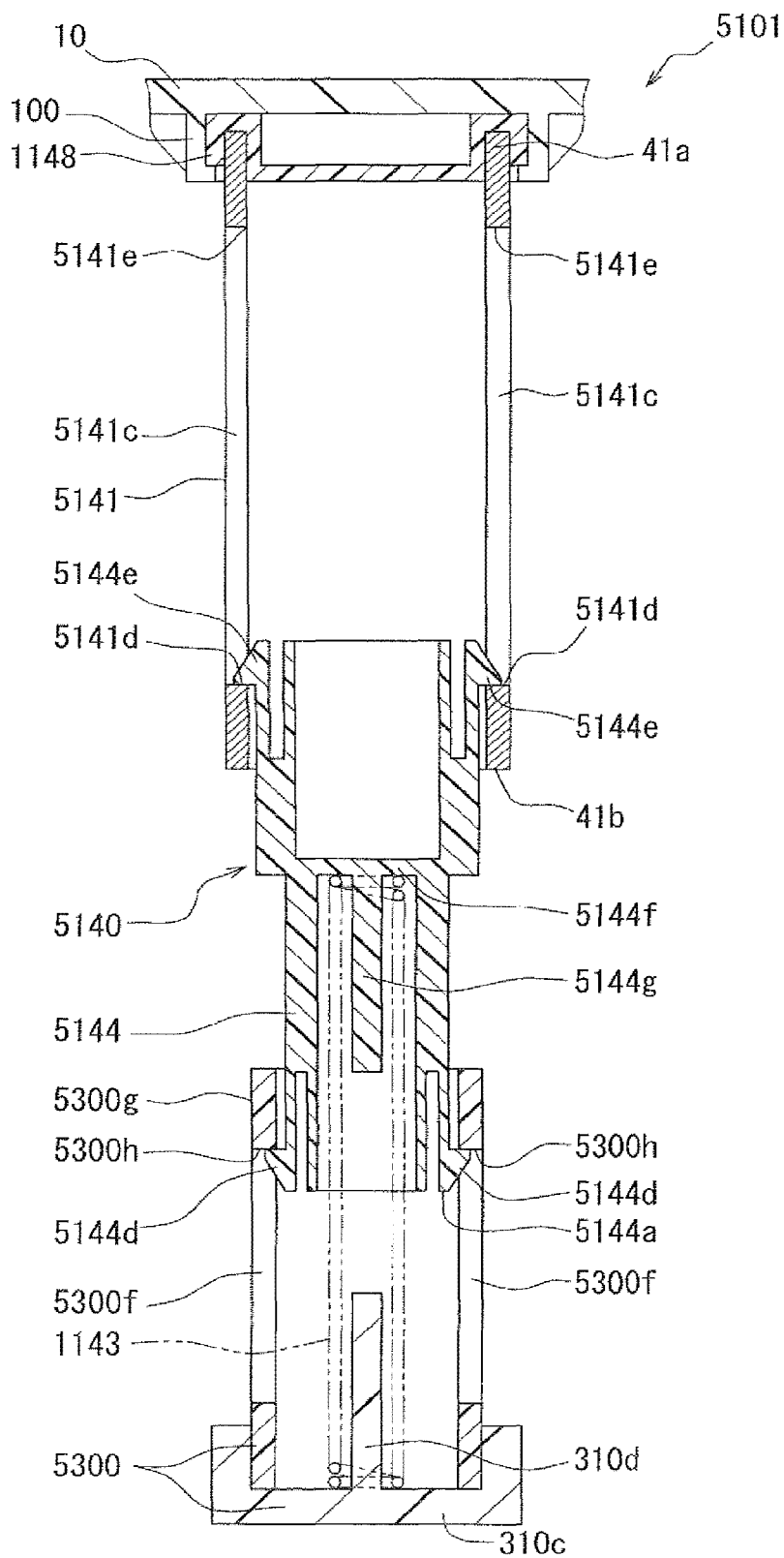
FIG. 83 is a longitudinal cross-sectional view showing the adjusting mechanism of the fuel supply apparatus of the twenty-first embodiment in a state, which is different from that of FIG. 82.
Figure 84:
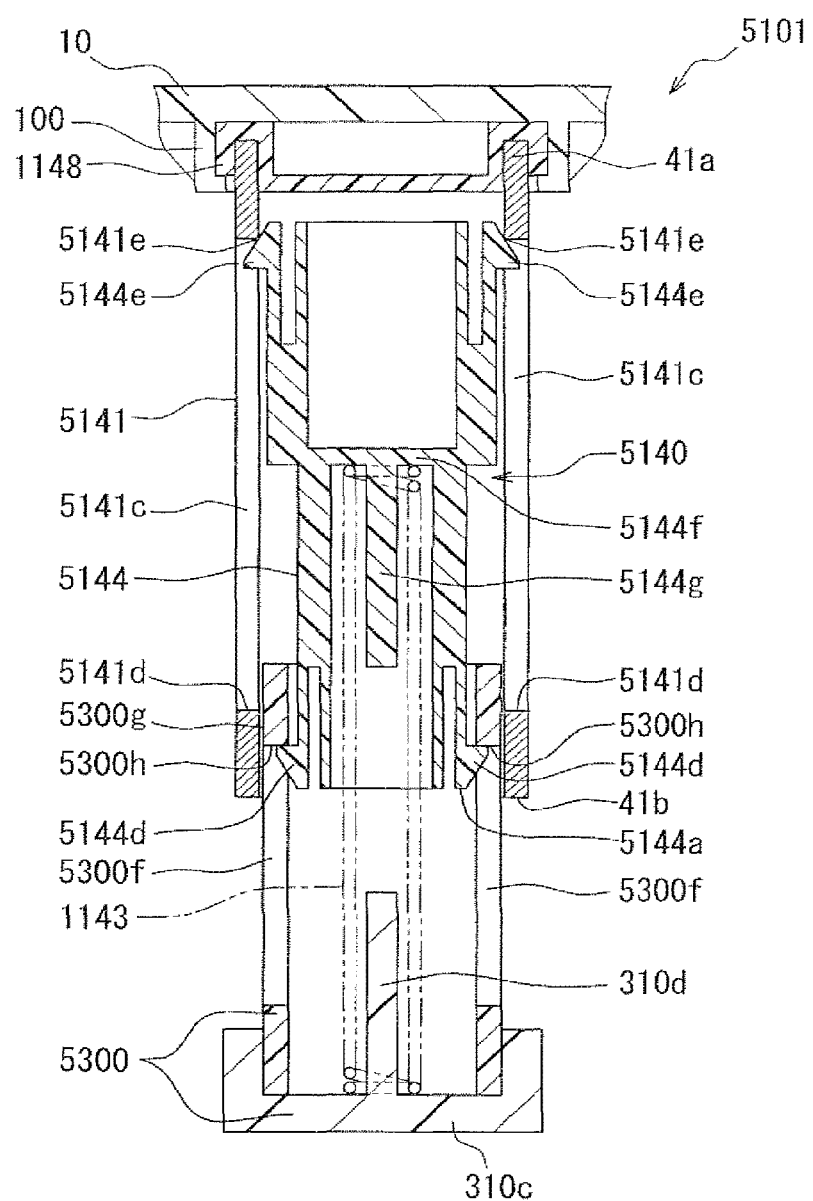
FIG. 84 is a longitudinal cross-sectional view showing the adjusting mechanism of the fuel supply apparatus of the twenty-first embodiment in a state, which is different from that of FIG. 82 or 83.

A twenty-first embodiment of the present invention is a modification of the seventeenth embodiment. As shown in FIGS. 82 to 84, a receiver (also referred to as an opening) 5300 of a fuel supply apparatus 5101 of the twenty-first embodiment includes a plurality of axial slits 5300*f*, which extend in the axial direction and are arranged one after another in the circumferential direction. A structure of an upper support shaft 5141, which is provided in an adjusting mechanism 5140 of the fuel supply apparatus 5101, is substantially the same as that of the support shaft 41 of the sixteenth embodiment except that the upper support shaft 5141 includes a plurality of axial slits 5141*c*, which are arranged one after another in the circumferential direction, and the upper support shaft 5141 is slidable in the axial direction relative to an outer peripheral surface 5300*g* of the receiver 5300.

Furthermore, in the fuel supply apparatus 5101, a lower support shaft 5144 of the adjusting mechanism 5140 is made of a resin material and is configured into an elongated cylindrical tubular body. The lower support shaft 5144 is received in the receiver 5300 and is axially slidable relative to the receiver 5300 in a coaxial manner. A plurality of resilient claws 5144*d* is resiliently deformably formed at a lower portion of the lower support shaft 5144 such that the resilient claws 5144*d* are slidably fitted into the slits 5300*f*, respectively, of the receiver 5300. In this way, an upper inner end portion 5300*h* of each slit 5300*f*, which is axially opposed to the corresponding resilient claw 5144*d* from an upper side thereof, serves as an engaging portion and is adapted to engage with the corresponding resilient claw 5144*d* when the lower support shaft 5144 is placed to a removing-side movable end thereof upon movement of the lower support shaft 5055 in a removing direction thereof away from the receiver 5300, as shown in FIGS. 83 and 84. Each resilient claw 5144*d* can be easily installed to the corresponding slit 5300*f* when the resilient claw 5144*d* is resiliently snap-fitted into the slit 5300*f*.

As shown in FIGS. 82 to 84, a plurality of resilient claws 5144e is resiliently deformably formed at an upper portion of the lower support shaft 5144 such that the resilient claws 5144e are slidably fitted into the slits 5141c, respectively, of the upper support shaft 5141. In this way, a lower inner end portion 5141d of each slit 5141c, which is axially opposed to the corresponding resilient claw 5144e from a lower side thereof, serves as an engaging portion and is adapted to engage with the corresponding resilient claw 5144e when the lower support shaft 5144 is placed to a removing-side movable end thereof upon movement of the lower support shaft 5055 in a removing direction thereof away from the upper support shaft 5141, as shown in FIG. 83.

Furthermore, an upper inner end portion 5141e of each slit 5141c, which is axially opposed to the corresponding resilient claw 5144e from an upper side thereof, is adapted to engage with the corresponding resilient claw 5144e when the lower support shaft 5144 is placed to an inserting-side movable end thereof upon movement of the lower support shaft 5055 in an inserting direction thereof toward the inside of the upper support shaft 5141, as shown in FIGS. 82 and 84. Here, the states of FIGS. 82 and 84, in which the lower support shaft 5144 is reached to the inserting-side movable end thereof toward the inside of the upper support shaft 5141, are achieved when the integrated components 20, 30, 50, 60 are placed in the inside of the fuel tank 2. Therefore, the integrated components 20, 30, 50, 60, which are placed in the fuel tank 2, are axially movable relative to the lower support shaft 5144, which connects between the flange 10 and the integrated components 20, 30, 50, 60, in the state where each resilient claw 5144e is engaged with the upper inner end portion 5141e of the corresponding slit 5141c. Each resilient claw 5144e can be easily installed to the corresponding slit 5141c when the resilient claw 5144e is resiliently snap-fitted into the slit 5141c.

As shown in FIGS. 82 to 84, a partition wall portion 5144f of the lower support shaft 5144, which is placed on an upper side of a lower end portion 5144a of the lower support shaft 5144 to close, i.e., partition the inside of the lower support shaft 5144, serves as an opposing portion, which is axially opposed to the bottom portion 310c of the receiver 5300. The resilient member 1143 is directly clamped between the partition wall portion (opposing portion) 5144f and the bottom portion 310c of the receiver 5300. With the above construction, the resilient member 1143, which is the coil spring, is coaxially received in the lower support shaft 5144 and the receiver 5300 and exerts the restoring force between the lower support shaft 5144 and the receiver 5300 due to the resiliently compressed deformation of the resilient member 1143 therebetween. Thus, in the state, in which the lower support shaft 5144 is reached to the inserting-side movable end in the inserting direction of the lower support shaft 5144 toward the inside of the upper support shaft 5141, as shown in FIG. 82, the resilient member 1143 exerts the restoring force against the bottom portion 310c of the receiver 5300. Thereby, the integrated components 20, 30, 50, 60, which include the bottom portion 310c of the receiver 5300 of the cover member 30, are urged toward the bottom portion 2c of the fuel tank 2.

Furthermore, as shown in FIGS. 82 to 84, the lower support shaft 5144 integrally has a support portion 5144g, which is configured into a cylindrical form and projects downward from the partition wall portion (opposing portion) 5144f that is located on the upper side of the resilient member 1143. The receiver 5300 integrally has the support portion 310d, which is discussed in the sixteenth embodiment. The support portions 5144g, 310d project into the radially inner side space of the coil spring, i.e., the resilient member 1143, so that the support portions 5144g, 310d support the coil spring, i.e., the resilient member 1143 along the axial direction.

In the twenty-first embodiment, at the time of installing the fuel supply apparatus 5101 to the fuel tank 2, as shown in FIG. 83, the lower support shaft 5144 is slid to the removing-side movable end thereof in the removing direction away from the receiver 5300, and the upper support shaft 5141 is slid to the removing-side movable end thereof relative to the lower support shaft 5144 in the removing direction away from the lower support shaft 5144. In this way, the integrated components 20, 30, 50, 60 are installed into the inside of the fuel tank 2 through the through-hole 2b in the state where the distance of the integrated components 20, 30, 50, 60, which is measured from the flange 10, is maximized.

Then, the integrated components 20, 30, 50, 60 are displaced to laterally outwardly project from the flange 10 on the lower side of the flange 10. Furthermore, as shown in FIG. 84, the lower support shaft 5144 is inserted into the inside of the upper support shaft 5141 by sliding the lower support shaft 5144. In this way, the canister 1170, which is placed on the lower side of the flange 10, passes through the through-hole 2b. Then, the resilient claws 5144e are engaged with the slits 5141c, respectively, and the sub-tank 20 is engaged with the bottom portion 2c of the fuel tank 2.

Furthermore, as shown in FIG. 82, the flange 10 is installed to the through-hole 2b upon inserting the lower support shaft 5144 into the receiver 5300 by downwardly sliding the lower support shaft 5144. In this way, in the inside of the fuel tank 2, the canister 1170 is placed around the integrated components 20, 30, 50, 60.

In this installed state, the bottom portion 310c of the receiver 5300 receives the restoring force of the resilient member 1143, which is held between the lower support shaft 5144 and the bottom portion 310c, so that the installation position of the integrated components 20, 30, 50, 60, which include the receiver 5300 of the cover member 30, can be always stabilized relative to the bottom portion 2c of the fuel tank 2. Furthermore, as shown in FIGS. 83 and 84, when each resilient claw 5144d of the lower support shaft 5144 is engaged with the upper inner end portion (engaging portion) 5300h of the corresponding slit 5300f of the receiver 5300, the removal of the lower support shaft 5144 from the receiver 5300 is limited. Also, when each resilient claw 5144e of the lower support shaft 5144 is engaged with the lower inner end portion (engaging portion) 5141d of the corresponding slit 5141c of the upper support shaft 5141, the removal of the lower support shaft 5144 from the upper support shaft 5141 is limited. With the above removal limitations, the installation position of the integrated components 20, 30, 50, 60 can be stabilized for a long period of time while maintaining the slidable connection of the lower support shaft 5144 relative to each of the receiver 5300 and the upper support shaft 5141. Therefore, even in the twenty-first embodiment, the versatility of the fuel supply apparatus 5101 can be improved.

Furthermore, the resilient member 1143 is received in the lower support shaft 5144 and the receiver 5300, into which the lower support shaft 5144 is inserted, so that the resilient member 1143 is completely covered with the lower support shaft 5144 and the receiver 5300, and thereby the exposure of the resilient member 1143 in the inside of the fuel tank 2 is limited. Furthermore, the lower support shaft 5144 can maintain the engagement of the lower support shaft 5144 relative to the receiver 5300 through the engagement of each resilient claw 5144d of the lower support shaft 5144 with the upper inner end portion (engaging portion) 5300h of the corresponding slit 5300f of the receiver 5300. Thereby, the lower support shaft 5144 and the receiver 5300 can limit the exposure of the resilient member 1143 for a long period of time. Therefore, even in the twenty-first embodiment, it is possible to limit or reduce the generation of the noises, which would be generated upon occurrence of the interference between the resilient member 1143 and the other component(s) of the fuel supply apparatus 5101.

Furthermore, the resilient member 1143, which is the coil spring, is supported along the axial direction by the support portions 5144g, 310d, which project at the upper and lower locations, respectively, of the resilient member 1143. Therefore, buckling of the resilient member 1143 is limited. Thus, it is possible to limit or reduce generation of the noises, which would be generated upon occurrence of the interference between the upper and lower support shafts 5141, 5144 and the resilient member 1143 received therein.

The present invention has been described with respect to the various embodiments. However, the present invention is not limited to the above embodiments, and the above embodiments may be modified within a spirit and scope of the present invention.

Specifically, in the first and sixth embodiments, the first bracket 44, 3044 of the intermediate member 42, 3042 may be formed integrally with or may be engaged to the cover member 30, which serves as the holding member. Furthermore, in the first and sixth to tenth embodiments, the second bracket 45, 3045, 4045 of the intermediate member 42, 3042, 4042, 5042 may be formed integrally with or may be engaged to the support shaft 41. Furthermore, in the first, fourth and fifth embodiments, contrary to what is described above, the support shaft 41, 2041 may be press fitted or may be fitted into the second bracket 45, 2045, so that the support shaft 41, 2041 is connected to the second bracket 45, 2045.

In the first, fourth to tenth and twelfth to fifteenth embodiments, the number of the longitudinal groove(s) 441a, 450a, 2044a, 4044a, 7041a, 8041a may be set to any suitable number equal to or larger than one as long as the axial slide fitting is enabled. Furthermore, in the first and sixth embodiments, the number of the longitudinal groove(s) 440a, which circumferentially interrupt the first bracket 44, 3044 as well as the number of the coupling portion(s) 440b, 3440b formed in the first bracket 44, 3044 may be set to any suitable number equal to or larger than one. However, in some cases, the longitudinal grooves 440a may be entirely eliminated. In the first to fifth, seventh, and eleventh to fifteenth embodiments, the bracket 3046 of the sixth embodiment may be provided to implement the coupling structure to enable the change in the coupling angle φ in the circumferential direction. In the first to fifth, and eleventh to fifteenth embodiments, the bracket 4046, 5046 of the seventh to tenth embodiments may be provided to implement the coupling structure to enable the change in the coupling angle φ in the circumferential direction.

In the second and third embodiments, the intermediate member 1042 may be formed integrally or may be engaged to the support shaft 1041. Furthermore, in the second and third embodiments, contrary to what is described above, the intermediate member 1042 may be press fitted into the support shaft 1041 to connect the intermediate member 1042 and the support shaft 1041 together, or alternatively the polygonal outer peripheral surface, which is formed in one of the intermediate member 1042 and the support shaft 1041, may be fitted into the polygonal hole, which is formed in the other one of the intermediate member 1042 and the support shaft 1041, to connect the intermediate member 1042 and the support shaft 1041 together. Furthermore, in the second and third embodiments, the number of the planar portions 1300b of the inner peripheral surface 1300a of the opening 1300 of the pump bracket 1030, which serves as the holding member, and the number of the planar coupling portions 1042a of the intermediate member 1042, which makes the surface-to-surface contact with the planar portions 1300b, respectively, may be set to any suitable number equal to or larger than one.

In the fourth and fifth embodiments, the center hole 2411 of the support shaft 2041 may be formed as a polygonal hole, more specifically, an n-gonal hole with n sides (where n=three or larger natural number), and the outer peripheral surface 2450a, which is fitted into the center hole 2411, may be formed as a polygonal outer peripheral surface, more specifically, an n-gonal outer peripheral surface with n sides (where n being the same as that of the n-gonal hole). Furthermore, in the seventh embodiment, the number of the slits 4100b and the number of the connecting claws 4464a may be set to any suitable number equal to or larger than two. Furthermore, in the eighth embodiment, the connecting claws 5046a may be provided in the connecting portion 5100 of the flange 10, and the connecting grooves 5100b may be provided in the third bracket 5046. Furthermore, in the eighth and ninth embodiments, the number of the grooves 5100b, 5103c may be set to any suitable number equal to or larger than two, and the number of the corresponding connecting claw(s) 5046a, 5046c may be also set to any suitable number equal to or larger than one. Furthermore, in the tenth embodiment, the number of the connecting claws 5105 may be set to any suitable number equal to or larger than two, and the number of the corresponding connecting projection(s) 5046d may be also set to any suitable number equal to or larger than one. Furthermore, in the thirteenth embodiment, the number of the fitting claw(s) 8042b may be set to any suitable number, which is equal to or larger than one and corresponds to the number of the longitudinal groove(s) 7041a, as long as the axial slide fitting can be implemented.

Additional advantages and modifications will readily occur to those skilled in the art. The invention in its broader terms is therefore not limited to the specific details, representative apparatus, and illustrative examples shown and described.

What is claimed is:

1. A fuel supply apparatus comprising:
a flange that is configured to be installed to a fuel tank;
a pump unit that is configured to be installed in an inside of the fuel tank to pump fuel received in the inside of the fuel tank to an outside of the fuel tank;
a support shaft that is configured into a tubular body and connects between the flange and the pump unit;
a resilient member that is received in the support shaft and exerts a restoring force in an axial direction of the support shaft to urge the pump unit, which is movable relative to the support shaft in the axial direction, toward a bottom portion of the fuel tank, and
a holding member that holds the pump unit, wherein:
the holding member includes a receiver, which is configured into a tubular body and axially slidably receives the support shaft;
the restoring force of the resilient member, which is received in the support shaft, is exerted against the receiver;
the support shaft is an upper support shaft, which is fixed to the flange installed to an upper opening of the fuel tank;
the fuel supply apparatus further comprises a lower support shaft, which is received in the receiver;
the resilient member is clamped between the upper support shaft and the lower support shaft;
the lower support shaft is coupled to the receiver and the upper support shaft such that the lower support shaft is slidable in the axial direction relative to the receiver and the upper support shaft; and the lower support shaft is adapted to be engaged with the receiver when the lower support shaft is placed to a movable end of the lower support shaft upon movement of the lower support shaft into the receiver in an inserting direction of the lower support shaft for inserting the lower support shaft into the receiver.

2. The fuel supply apparatus according to claim 1, wherein:
the resilient member is a coil spring;
the fuel supply apparatus further comprises a support portion, which is provided integrally with the support shaft and projects downward from a location above the coil spring; and
the support portion supports the coil spring along the axial direction.

3. The fuel supply apparatus according to claim 1, further comprising an opposing portion, which is provided integrally with the support shaft at a location above a lower end part of the support shaft, wherein:
the receiver includes a bottom portion at a bottom of the tubular body of the receiver;
the opposing portion is opposed to the bottom portion of the receiver in the axial direction; and
the resilient member is placed between the bottom portion of the receiver and the opposing portion.

4. The fuel supply apparatus according to claim 1, wherein the holding member includes an engaging portion, which is adapted to be engaged with the support shaft when the support shaft is placed to a movable end of the support shaft upon movement of the support shaft away from the receiver in a removing direction of the support shaft away from the receiver.

5. The fuel supply apparatus according to claim 1, further comprising an opposing portion, which is provided integrally with the upper support shaft at a location above a lower end part of the upper support shaft, wherein the resilient member is placed between the opposing portion and the lower support shaft, which is opposed to the opposing portion in the axial direction.

6. The fuel supply apparatus according to claim 1, wherein:
the holding member includes an engaging portion, which is adapted to be engaged with the lower support shaft when the lower support shaft is placed to a movable end of the lower support shaft upon movement of the lower support shaft away from the receiver in a removing direction of the lower support shaft away from the receiver; and
the lower support shaft, which receives the upper support shaft, includes an engaging portion, which is adapted to be engaged with the upper support shaft when the upper support shaft is placed to a movable end of the upper support shaft upon movement of the upper support shaft away from the lower support shaft in a removing direction of the upper support shaft away from the lower support shaft.

7. The fuel supply apparatus according to claim 1, wherein:
the holding member includes an engaging portion, which is adapted to be engaged with the lower support shaft when the lower support shaft is placed to a movable end of the lower support shaft upon movement of the lower support shaft away from the receiver in a removing direction of the lower support shaft away from the receiver; and
the upper support shaft, which receives the lower support shaft, includes an engaging portion, which is adapted to be engaged with the lower support shaft when the lower support shaft is placed to a movable end of the lower support shaft upon movement of the lower support shaft away from the upper support shaft in a removing direction of the lower support shaft away from the upper support shaft.

8. The fuel supply apparatus according to claim 1, further comprising a canister that is held by the flange and adsorbs fuel vapor in the inside of the fuel tank in a desorbable manner, wherein:
the pump unit protrudes from the flange in a lateral direction, which is perpendicular to the axial direction, at a location that is on a lower side of the flange; and
the canister is placed on the lower side of the flange in the fuel tank.

9. A fuel supply apparatus comprising:
a flange that is configured to be installed to a fuel tank;
a pump unit that is configured to be installed in an inside of the fuel tank to pump fuel received in the inside of the fuel tank to an outside of the fuel tank;
a support shaft that is configured into a tubular body and connects between the flange and the pump unit;
a resilient member that is received in the support shaft and exerts a restoring force in an axial direction of the support shaft to urge the pump unit, which is movable relative to the support shaft in the axial direction, toward a bottom portion of the fuel tank;
a holding member that holds the pump unit, wherein the holding member includes a receiver, which is configured into a tubular body and axially slidably receives the support shaft, and the restoring force of the resilient member, which is received in the support shaft, is exerted against the receiver; and
an upper support shaft, which is fixed to the flange installed to an upper opening of the fuel tank, wherein:
the support shaft is a lower support shaft, which is received in the receiver;
the resilient member is clamped between the receiver and the lower support shaft; and
the lower support shaft is coupled to the receiver and the upper support shaft such that the lower support shaft is slidable in the axial direction relative to the receiver and the upper support shaft.

10. The fuel supply apparatus according to claim 9, further comprising an opposing portion, which is provided integrally with the lower support shaft at a location above a lower end part of the lower support shaft, wherein:
the receiver includes a bottom portion at a bottom of the tubular body of the receiver;
the resilient member is placed between the opposing portion and the bottom portion of the receiver, which is opposed to the opposing portion in the axial direction.

* * * * *